US012696830B2

(12) United States Patent
Honey et al.

(10) Patent No.: US 12,696,830 B2
(45) Date of Patent: Aug. 4, 2026

(54) AGRICULTURAL IMPLEMENT WITH STABILIZERS

(71) Applicant: HONEY BEE MANUFACTURING LTD., Frontier (CA)

(72) Inventors: Glenn Raymond Honey, Bracken (CA); Lee Glenn Harper, Shaunavon (CA)

(73) Assignee: HONEY BEE MANUFACTURING LTD., Frontier (CA)

( * ) Notice: Subject to any disclaimer, the term of this patent is extended or adjusted under 35 U.S.C. 154(b) by 945 days.

(21) Appl. No.: 17/852,226

(22) Filed: Jun. 28, 2022

(65) Prior Publication Data

US 2023/0413709 A1     Dec. 28, 2023

(51) Int. Cl.
A01D 41/14          (2006.01)
A01B 63/22          (2006.01)

(52) U.S. Cl.
CPC ............ A01B 63/22 (2013.01); A01D 41/141 (2013.01)

(58) Field of Classification Search
CPC ....... A01B 63/22; A01B 79/005; A01B 79/02; A01D 41/141; A01D 41/142; A01D 41/16; A01D 41/127; A01D 41/1226; A01D 41/145; A01F 12/10; B60G 9/02
See application file for complete search history.

(56) References Cited

U.S. PATENT DOCUMENTS

| | | | |
|---|---|---|---|
| 12,750 | A | 4/1855 | Chatfield |
| 524,215 | A | 8/1894 | Quigley |
| 855,519 | A | 6/1907 | Maloney |
| 1,422,002 | A | 7/1922 | Shaw |

(Continued)

FOREIGN PATENT DOCUMENTS

| | | |
|---|---|---|
| CA | 1003310 | 1/1977 |
| CA | 1040438 | 10/1978 |

(Continued)

OTHER PUBLICATIONS

Continental, ContiTech, www.contitech.us/iap, FS 200-10 CI, Single Convolution Air Actuator, Air Spring Systems, Sep. 26, 2019, 1 page.

(Continued)

*Primary Examiner* — Joseph M Rocca
*Assistant Examiner* — Robert E Pezzuto

(57)          ABSTRACT

A stabilizer apparatus may be inter-connected to a transversely extending main frame of an agricultural apparatus, transversely spaced outwards and operable to provide support against downward acting forces. A pneumatic system includes at least one frame gas suspension bag, and at least one stabilizer gas bag may be located proximate the stabilizer apparatus and in pneumatic communication with the at least one frame gas suspension bag. When the at least one gas suspension bag is filled with pressurized gas, and the stabilizer apparatus is subjected to an upwardly directed force, the at least one stabilizer gas bag is compressed increasing pressure of the gas within the at least one stabilizer gas bag. Gas in the at least one stabilizer gas bag may be communicated towards the at least one frame gas suspension bag, to increase the pressure within the at least one frame gas suspension bag, lifting the main frame.

60 Claims, 25 Drawing Sheets

(56) References Cited

U.S. PATENT DOCUMENTS

| | | |
|---|---|---|
| 1,862,101 A | 6/1932 | Pax |
| 1,917,604 A | 7/1933 | Scranton, Jr. |
| 2,235,602 A | 3/1941 | Biesemeyer |
| 2,237,517 A | 4/1941 | Anderson |
| 2,347,365 A | 4/1944 | Paradise |
| 2,413,072 A | 12/1946 | Sage |
| 2,599,438 A | 6/1952 | Downing et al. |
| 2,681,134 A | 6/1954 | White, Jr. |
| 2,685,958 A | 8/1954 | White, Jr. |
| 2,687,209 A | 8/1954 | Rost et al. |
| 2,694,894 A | 11/1954 | Linscheld |
| 2,720,743 A | 10/1955 | Prather |
| 2,795,922 A | 6/1957 | Hume |
| 3,169,633 A | 2/1965 | Baker |
| 3,344,909 A | 10/1967 | Hansen et al. |
| 3,468,109 A | 9/1969 | Reimer |
| 3,472,008 A | 10/1969 | Hurlburt |
| 3,550,366 A | 12/1970 | Gibson |
| 3,771,299 A | 11/1973 | Gradwohl et al. |
| 3,866,400 A | 2/1975 | May |
| 3,927,512 A | 12/1975 | Molzahn |
| 3,945,180 A | 3/1976 | Sinclair |
| 4,038,810 A | 8/1977 | Williams et al. |
| 4,067,177 A | 1/1978 | Tout |
| 4,120,137 A | 10/1978 | Schoenberger et al. |
| 4,127,981 A | 12/1978 | Parrish et al. |
| 4,137,696 A | 2/1979 | Webb |
| 4,156,340 A | 5/1979 | Colgan et al. |
| 4,174,602 A | 11/1979 | Webb et al. |
| 4,177,625 A | 12/1979 | Knight et al. |
| 4,187,664 A | 2/1980 | Meek et al. |
| 4,198,803 A | 4/1980 | Quick et al. |
| 4,199,925 A | 4/1980 | Quick et al. |
| 4,202,154 A | 5/1980 | Waldrop et al. |
| 4,270,338 A | 6/1981 | Halls |
| 4,346,909 A | 8/1982 | Hundeby |
| 4,353,201 A | 10/1982 | Pierce et al. |
| 4,435,948 A | 3/1984 | Jennings |
| 4,441,307 A | 4/1984 | Enzmann |
| 4,512,140 A | 4/1985 | Blakeslee |
| 4,519,190 A | 5/1985 | Blakeslee |
| 4,522,018 A | 6/1985 | Blakeslee |
| 4,541,229 A | 9/1985 | Elijah |
| 4,573,124 A | 2/1986 | Seiferling |
| 4,573,309 A | 3/1986 | Patterson |
| 4,612,757 A | 9/1986 | Halls et al. |
| 4,637,201 A | 1/1987 | Pruitt et al. |
| 4,641,490 A | 2/1987 | Wynn et al. |
| 4,660,361 A | 4/1987 | Remillard et al. |
| 4,662,161 A | 5/1987 | Patterson |
| 4,722,172 A | 2/1988 | Pearce |
| 4,751,809 A | 6/1988 | Fox et al. |
| 4,776,155 A | 10/1988 | Fox et al. |
| 4,833,869 A | 5/1989 | Klein |
| 4,909,026 A | 3/1990 | Molzahn et al. |
| 4,936,082 A | 6/1990 | Majkrzak |
| 4,944,141 A | 7/1990 | Orlando et al. |
| 4,956,966 A | 9/1990 | Patterson |
| 5,005,343 A | 4/1991 | Patterson |
| 5,007,235 A | 4/1991 | Nickel et al. |
| 5,086,613 A | 2/1992 | Fox et al. |
| 5,155,983 A | 10/1992 | Sheehan et al. |
| 5,157,905 A | 10/1992 | Talbot et al. |
| 5,219,064 A | 6/1993 | Roman |
| 5,243,810 A | 9/1993 | Fox et al. |
| 5,261,290 A | 11/1993 | Ramsay et al. |
| 5,359,839 A | 11/1994 | Parsons et al. |
| 5,435,239 A | 7/1995 | Talbot |
| 5,459,986 A | 10/1995 | Talbot et al. |
| 5,473,872 A | 12/1995 | Fox et al. |
| 5,535,577 A | 7/1996 | Chmielewski et al. |
| 5,595,053 A | 1/1997 | Jasper et al. |
| RE35,543 E | 7/1997 | Patterson |
| 5,678,398 A | 10/1997 | Fox et al. |
| 5,681,117 A | 10/1997 | Wellman et al. |
| 5,704,200 A | 1/1998 | Chmielewski, Jr. et al. |
| 5,768,870 A | 6/1998 | Talbot et al. |
| 5,791,128 A | 8/1998 | Rogalsky |
| 5,927,606 A | 7/1999 | Patterson |
| 5,992,759 A | 11/1999 | Patterson |
| 6,029,429 A | 2/2000 | Fox et al. |
| 6,044,636 A | 4/2000 | Minnaert |
| 6,079,194 A | 6/2000 | Waldrop |
| 6,170,244 B1 | 1/2001 | Coers et al. |
| 6,195,972 B1 | 3/2001 | Talbot et al. |
| 6,199,358 B1 | 3/2001 | Majkrzak |
| 6,282,876 B1 | 9/2001 | Patterson |
| 6,324,823 B1 | 12/2001 | Remillard |
| 6,351,931 B1 | 3/2002 | Shearer |
| 6,397,573 B2 | 6/2002 | Majkrzak |
| 6,442,918 B1 | 9/2002 | Fox |
| 6,453,655 B2 | 9/2002 | Ferraris |
| 6,502,379 B1 | 1/2003 | Snider |
| 6,519,923 B1 | 2/2003 | Cooksey et al. |
| 6,530,202 B1 | 3/2003 | Guyer |
| 6,543,211 B1 | 4/2003 | Talbot |
| 6,591,598 B2 | 7/2003 | Remillard et al. |
| 6,675,568 B2 | 1/2004 | Patterson et al. |
| 6,698,175 B1 | 3/2004 | Schumacher et al. |
| 6,708,475 B2 | 3/2004 | Guyer |
| 6,817,166 B2 | 11/2004 | Dunn |
| 6,843,045 B2 | 1/2005 | Bickel |
| 6,854,251 B2 | 2/2005 | Snider |
| 6,865,871 B2 | 3/2005 | Patterson et al. |
| 6,889,492 B1 | 5/2005 | Polk et al. |
| 6,962,040 B2 | 11/2005 | Talbot |
| 7,077,220 B2 | 7/2006 | Dunn et al. |
| 7,131,253 B2 | 11/2006 | Remillard et al. |
| 7,159,687 B2 | 1/2007 | Dunn et al. |
| 7,188,461 B2 | 3/2007 | Fox et al. |
| 7,197,865 B1 | 4/2007 | Enns et al. |
| 7,306,062 B2 | 12/2007 | Dunn |
| 7,306,252 B2 | 12/2007 | Barnett |
| 7,308,947 B2 | 12/2007 | Barnett |
| 7,322,175 B2 | 1/2008 | Ferre et al. |
| 7,328,565 B2 | 2/2008 | Snider et al. |
| 7,340,876 B1 | 3/2008 | Barnett |
| 7,347,277 B2 | 3/2008 | Enns et al. |
| 7,356,982 B2 | 4/2008 | Barnett |
| 7,364,181 B2 | 4/2008 | Patterson |
| 7,373,769 B2 | 5/2008 | Talbot et al. |
| 7,392,124 B2 | 6/2008 | MacGregor et al. |
| 7,392,646 B2 | 7/2008 | Patterson |
| 7,412,816 B2 | 8/2008 | Coers et al. |
| 7,438,305 B2 | 10/2008 | Schulz |
| 7,444,798 B2 | 11/2008 | Patterson et al. |
| 7,454,888 B2 | 11/2008 | Barnett |
| 7,461,498 B1 | 12/2008 | Barnett |
| 7,467,505 B2 | 12/2008 | MacGregor |
| 7,467,506 B2 | 12/2008 | Lovett et al. |
| 7,472,533 B2 | 1/2009 | Talbot et al. |
| 7,478,521 B2 | 1/2009 | Coers et al. |
| 7,484,349 B2 | 2/2009 | Talbot et al. |
| 7,497,069 B2 | 3/2009 | Enns et al. |
| 7,549,280 B2 | 6/2009 | Lovett et al. |
| 7,591,127 B1 | 9/2009 | Stacer et al. |
| 7,600,364 B2 | 10/2009 | Lovett et al. |
| 7,640,720 B1 | 1/2010 | Lovett et al. |
| 7,647,755 B2 | 1/2010 | Barnett et al. |
| 7,721,830 B2 | 5/2010 | Dunn et al. |
| 7,730,707 B2 | 6/2010 | Pietricola et al. |
| 7,849,952 B2 | 12/2010 | MacGregor et al. |
| 7,856,801 B2 | 12/2010 | Remillard |
| 7,886,511 B2 | 2/2011 | Honas et al. |
| 7,908,836 B1 | 3/2011 | Rayfield et al. |
| 7,918,076 B2 | 4/2011 | Talbot |
| 7,937,920 B2 | 5/2011 | Schmidt et al. |
| 7,958,706 B2 | 6/2011 | Remillard et al. |
| 7,958,711 B1 | 6/2011 | Sauerwein |
| 7,971,418 B2 | 7/2011 | Conrad et al. |
| 7,975,462 B1 | 7/2011 | Figgins |
| 8,006,469 B2 | 8/2011 | Barnett |
| 8,006,831 B1 | 8/2011 | Mackin et al. |
| 8,015,784 B2 | 9/2011 | Barnett et al. |

(56) References Cited

U.S. PATENT DOCUMENTS

| | | | |
|---|---|---|---|
| 8,020,363 | B1 | 9/2011 | Barnett et al. |
| 8,020,648 | B2 | 9/2011 | Otto |
| 8,056,311 | B1 | 11/2011 | Barnett |
| 8,065,865 | B1 | 11/2011 | Dow et al. |
| 8,069,640 | B2 | 12/2011 | Barnett et al. |
| 8,091,330 | B2 | 1/2012 | Lohrentz et al. |
| 8,096,102 | B2 | 1/2012 | Smith |
| 8,117,812 | B2 | 2/2012 | Patterson |
| 8,161,719 | B2 | 4/2012 | Barnett et al. |
| 8,176,716 | B2 | 5/2012 | Coers et al. |
| 8,191,344 | B2 | 6/2012 | Sauerwein |
| 8,205,421 | B2 | 6/2012 | Sauerwein et al. |
| 8,205,422 | B2 | 6/2012 | Sauerwein et al. |
| 8,225,589 | B2 | 7/2012 | Barnett |
| 8,225,903 | B2 | 7/2012 | Dunn |
| 8,240,114 | B2 | 8/2012 | Barnett |
| 8,245,489 | B2 | 8/2012 | Talbot |
| 8,281,561 | B2 | 10/2012 | Dow et al. |
| 8,286,411 | B2 | 10/2012 | Barnett et al. |
| 8,286,412 | B2 | 10/2012 | Kidd et al. |
| 8,291,684 | B2 | 10/2012 | Remillard et al. |
| 8,291,686 | B1 | 10/2012 | Cormier et al. |
| 8,307,620 | B1 | 11/2012 | Barnett et al. |
| 8,322,520 | B2 | 12/2012 | Dow et al. |
| 8,333,057 | B2 | 12/2012 | Schroeder et al. |
| 8,341,927 | B2 | 1/2013 | Barnett |
| 8,341,929 | B2 | 1/2013 | Sauerwein et al. |
| 8,387,351 | B2 | 3/2013 | Guyer |
| 8,402,728 | B2 | 3/2013 | Kidd |
| 8,408,567 | B2 | 4/2013 | Bergman et al. |
| 8,434,290 | B2 | 5/2013 | Barnett et al. |
| 8,468,789 | B2 | 6/2013 | Barnett et al. |
| 8,479,483 | B1 | 7/2013 | Huseman et al. |
| 8,484,938 | B2 | 7/2013 | Cormier et al. |
| 8,484,939 | B1 | 7/2013 | Cormier et al. |
| 8,511,050 | B1 | 8/2013 | Cormier et al. |
| 8,590,284 | B2 | 11/2013 | Rayfield |
| 8,752,359 | B2 | 6/2014 | Cormier et al. |
| 9,271,443 | B2 | 3/2016 | Sethi et al. |
| 9,338,941 | B2 | 5/2016 | Herringshaw et al. |
| 9,635,810 | B2 | 5/2017 | Leys et al. |
| 9,814,183 | B2 | 11/2017 | Allochis |
| 10,285,331 | B2 | 5/2019 | Leys et al. |
| 10,694,675 | B2 | 6/2020 | Leys et al. |
| 2002/0129591 | A1 | 9/2002 | Patterson et al. |
| 2007/0193243 | A1 | 8/2007 | Schmidt et al. |
| 2007/0204584 | A1 | 9/2007 | Coers et al. |
| 2007/0204589 | A1 | 9/2007 | Coers et al. |
| 2008/0092508 | A1 | 4/2008 | Talbot et al. |
| 2008/0271426 | A1 | 11/2008 | Lohrentz et al. |
| 2008/0276590 | A1 | 11/2008 | Sauerwein et al. |
| 2008/0276591 | A1 | 11/2008 | Tippery et al. |
| 2009/0007533 | A1 | 1/2009 | Lovett et al. |
| 2009/0266044 | A1 | 10/2009 | Coers et al. |
| 2009/0277146 | A1 | 11/2009 | Sauerwein et al. |
| 2009/0288383 | A1 | 11/2009 | Sauerwein et al. |
| 2009/0308042 | A1 | 12/2009 | Lovett et al. |
| 2010/0313540 | A1 | 12/2010 | Sauerwein |
| 2011/0308221 | A1 | 12/2011 | Sauerwein et al. |
| 2012/0042617 | A1 | 2/2012 | Dow et al. |
| 2012/0043185 | A1 | 2/2012 | Dow et al. |
| 2012/0233974 | A1 | 9/2012 | Cormier et al. |
| 2012/0251653 | A1 | 10/2012 | Mathy, Jr. et al. |
| 2012/0260870 | A1 | 10/2012 | Wahl et al. |
| 2013/0036860 | A1 | 2/2013 | Corniani |
| 2013/0160417 | A1 | 6/2013 | Huseman et al. |
| 2014/0001726 | A1 | 1/2014 | Statz |
| 2014/0033940 | A1 | 2/2014 | Simpson et al. |
| 2014/0059995 | A1 | 3/2014 | Cormier et al. |
| 2014/0150601 | A1 | 6/2014 | McGrath |
| 2014/0196427 | A1 | 7/2014 | Fuechtling |
| 2016/0316620 | A1 | 11/2016 | Allochis |
| 2019/0029175 | A1 | 1/2019 | Talbot et al. |
| 2020/0015418 | A1 | 1/2020 | Talbot et al. |
| 2020/0337240 | A1 | 10/2020 | Brimeyer et al. |
| 2023/0112003 | A1* | 4/2023 | Krog ........................ B60L 1/003 172/1 |
| 2023/0356554 | A1* | 11/2023 | Murray ............. A01D 41/1226 |
| 2023/0413728 | A1* | 12/2023 | Farley .................. A01D 41/142 |

FOREIGN PATENT DOCUMENTS

| | | |
|---|---|---|
| CA | 1043577 | 12/1978 |
| CA | 2180627 | 1/1980 |
| CA | 1086508 | 9/1980 |
| CA | 1087402 | 10/1980 |
| CA | 1185438 | 4/1985 |
| CA | 1197694 | 12/1985 |
| CA | 1318135 | 5/1993 |
| CA | 2100204 | 1/1995 |
| CA | 2126909 | 1/1995 |
| CA | 2138939 | 6/1996 |
| CA | 2165735 | 6/1997 |
| CA | 2180625 | 1/1998 |
| CA | 2180626 | 1/1998 |
| CA | 2211363 | 1/1998 |
| CA | 2198672 | 8/1998 |
| CA | 2226200 | 11/1998 |
| CA | 2229152 | 8/1999 |
| CA | 2245213 | 2/2000 |
| CA | 2280681 | 2/2000 |
| CA | 2184278 | 8/2000 |
| CA | 2289164 | 10/2000 |
| CA | 2289171 | 10/2000 |
| CA | 2284432 | 4/2001 |
| CA | 2284436 | 4/2001 |
| CA | 2320379 | 5/2001 |
| CA | 2311019 | 8/2001 |
| CA | 2307176 | 10/2001 |
| CA | 2320524 | 3/2002 |
| CA | 2357825 | 9/2002 |
| CA | 2380557 | 10/2002 |
| CA | 2387898 | 12/2002 |
| CA | 2358883 | 4/2003 |
| CA | 2359598 | 4/2003 |
| CA | 2370891 | 4/2003 |
| CA | 2399234 | 6/2003 |
| CA | 2389513 | 12/2003 |
| CA | 2406416 | 4/2004 |
| CA | 2406419 | 4/2004 |
| CA | 2427755 | 11/2004 |
| CA | 2461790 | 11/2004 |
| CA | 2467595 | 12/2004 |
| CA | 2434981 | 1/2005 |
| CA | 2510883 | 12/2005 |
| CA | 2513037 | 2/2006 |
| CA | 2341283 | 3/2006 |
| CA | 2494395 | 6/2006 |
| CA | 2494034 | 7/2006 |
| CA | 2505431 | 9/2006 |
| CA | 2505458 | 9/2006 |
| CA | 2531189 | 9/2006 |
| CA | 2513605 | 1/2007 |
| CA | 2513614 | 1/2007 |
| CA | 2528731 | 1/2007 |
| CA | 2743336 | 1/2007 |
| CA | 2521187 | 3/2007 |
| CA | 2522387 | 4/2007 |
| CA | 2524151 | 4/2007 |
| CA | 2525904 | 5/2007 |
| CA | 2527797 | 5/2007 |
| CA | 2534200 | 6/2007 |
| CA | 2538020 | 8/2007 |
| CA | 2554689 | 1/2008 |
| CA | 2596403 | 2/2008 |
| CA | 2559217 | 3/2008 |
| CA | 2559353 | 3/2008 |
| CA | 2561463 | 3/2008 |
| CA | 2609744 | 5/2008 |
| CA | 2627320 | 9/2008 |
| CA | 2626486 | 2/2009 |
| CA | 2639032 | 3/2009 |
| CA | 2783567 | 3/2009 |
| CA | 2587107 | 7/2009 |

(56)          References Cited

FOREIGN PATENT DOCUMENTS

| CA | 2627053 | 9/2009 |
|----|---------|--------|
| CA | 2722896 | 11/2009 |
| CA | 2578907 | 4/2010 |
| CA | 2671880 | 4/2010 |
| CA | 2564777 | 8/2010 |
| CA | 2695689 | 9/2010 |
| CA | 2665580 | 11/2010 |
| CA | 2665589 | 11/2010 |
| CA | 2706704 | 1/2011 |
| CA | 2706705 | 1/2011 |
| CA | 2706706 | 1/2011 |
| CA | 2706707 | 1/2011 |
| CA | 2775891 | 1/2011 |
| CA | 2783670 | 1/2011 |
| CA | 2713636 | 2/2011 |
| CA | 2596627 | 4/2011 |
| CA | 2686017 | 5/2011 |
| CA | 2721118 | 5/2011 |
| CA | 2739632 | 11/2011 |
| CA | 2708744 | 12/2011 |
| CA | 2745105 | 12/2011 |
| CA | 2538489 | 1/2012 |
| CA | 2707624 | 1/2012 |
| CA | 2709336 | 1/2012 |
| CA | 2710676 | 2/2012 |
| CA | 2734475 | 5/2012 |
| CA | 2766611 | 7/2012 |
| CA | 2744070 | 12/2012 |
| CA | 2802894 | 1/2013 |
| CA | 2796109 | 5/2013 |
| CA | 2796120 | 5/2013 |
| CA | 2796131 | 5/2013 |
| CA | 2796134 | 5/2013 |
| CA | 2796177 | 5/2013 |
| CA | 2796165 | 6/2013 |
| CA | 2802958 | 7/2013 |
| CA | 2802963 | 7/2013 |
| CA | 2802972 | 7/2013 |
| CA | 2802975 | 7/2013 |
| CA | 2803470 | 7/2013 |
| CA | 2814924 | 10/2013 |
| CA | 2815395 | 10/2013 |
| CA | 2815408 | 10/2013 |
| CA | 2815421 | 10/2013 |
| CA | 2815427 | 10/2013 |
| CA | 2789049 | 12/2013 |
| EP | 1935226 | 6/2008 |
| WO | 2012/166629 | 12/2012 |

OTHER PUBLICATIONS

Continental, ContiTech, www.contitech.us/iap, FD 70-13 CI, Double Convolution Air Actuator, Air Spring Systems, Sep. 26, 2019, 1 page.
MacDon FD2 FlexDraper®, ContourMax of MacDon Industries Ltd., YouTube video dated Dec. 16, 2021, https://www.youtube.com/watch?v=UEkPRqPsgDo, 1 page.
Webpage of MacDon Industries FD2 draper header with ContourMax Gauge Wheels—date first available to the public unknown, 13 pages.
Webpage of Extract from John Deere / Deere & Company Operator's Manual—"omhxe161442—HD35R, HD40R, HD45R, and HD50R Hinged Drapers (North American Edition)"—including "Off Ground Cutting" section—date first made available to the public unknown, https://techinfo-omview.apps-prod-vpn.US.e06.c01.johndeerecloud.com/omview/omhxe161442/09001faa84673214, 5 pages.
John Deere / Deere & Company Brochure for "HDxxR hinged Drapers Quick Reference Guide"—date first made available to the public unknown, https://www.deere.com/assets/pdfs/common/qrg/hdf-hinged-draper-2023.pdf, 6 pages.

* cited by examiner

AGRICULTURAL IMPLEMENT WITH STABILIZERS

TECHNICAL FIELD

The present disclosure relates agricultural implements, including headers, with stabilizers such as gauge wheels.

BACKGROUND

An agricultural implement such as a harvesting header on a combine/propulsion unit or a spray boom on a power unit, may be propelled across a field. The agricultural implement may be mounted to a combine/propulsion unit with a mounting assembly. During use, it may be desirable to control a height and tilt of the agricultural implement relative to the combine/propulsion unit and thereby control the height and tilt of the implement relative to the ground surface and to crops in the field. Accurate control of the height and tilt of the agricultural implement relative to the ground surface/ crops may result in higher crop yields for harvesting or improved efficiency in spraying, for example.

Some agricultural control systems may sense a height or separation distance of the implement above the ground surface and produce control signals for causing a positioning system to move the implement relative to the propulsion unit, based on the sensed height.

Some agricultural implements have suspension systems by which a sub-frame may be fixedly secured to a component (such as a feeder house) of a propulsion unit (eg. combine). The main frame of the implement may be suspended on the sub-frame with a suspension system.

In some systems the main frame of the implement may be moved vertically up and down and also be able to tilt laterally relative to the combine/propulsion unit under the control of a header position control system.

Some agricultural implements also have cutter bars which provide the implement with the ability to cut a crop as the implement is moved across a crop field. The cutter bar may be interconnected to the main frame. As the implement moves across a field during operation, the cutter bar may, at least in some modes of operation, rest on the ground surface and float with the rest of the implement over the ground surface. While some cutter bars are mounted to the main frame of the implement in a fixed manner, others have the additional capability to be able to move vertically upwards and downwards relative to the supporting main frame of the implement during operation.

In some known systems a cutter bar air suspension system may also be provided to provide for a spring like response of the cutter bar movement up and down relative to the main frame, at least in some modes of operation.

During operation of such an agricultural apparatus, a large proportion of the weight and other forces imparted by, and onto, the agricultural implement may be carried by the propulsion unit, with the load being transferred from the implement and its main frame, through the sub-frame and then via a mounting assembly to the propulsion unit. In some systems, at least in some operational modes, a large proportion of the weight of, and other forces imparted onto the implement may be supported by the cutter bar itself, where the cutter bar may rest upon and be supported by the ground surface.

At least for some agricultural implements, in at least some of their modes of operation, laterally positioned and spaced stabilizing components such as ground engaging gauge wheels at opposed ends of the implement, may be provided which can provide additional support of at least some of the weight of the implement. The stabilizing components may also assist in minimizing the negative effects of other forces imparted on the agricultural implement. However, the interaction between the loads on the implement (which typically will vary during operation) when the implement has some additional support of stabilizers such as gauge wheels, and the agricultural implement, can be challenging to manage. For example, when a gauge wheel on one side of a header encounters rising terrain, this can impart a significant upward shock force to the gauge wheel, which is transferred through the header to the header suspension system which may suffer significant shock loads transferred to the sub-frame and to the propulsion unit.

It is known to deploy mechanical springs made from rubber or a resilient metal material as part of a gauge wheel assembly to provide an ability to absorb shock loads imparted onto the gauge wheel mechanisms. But such mechanical springs have drawbacks.

It is therefore desirable to improve upon the design of such agricultural implements.

SUMMARY

In an aspect of the disclosure, there is provided an agricultural apparatus comprising: a sub-frame; a transversely extending main frame having a weight, the main frame being inter-connected to the sub-frame, a stabilizer apparatus inter-connected to the main frame and transversely spaced outwards from the sub-frame, the stabilizer apparatus operable to provide support for the main frame against downward acting forces acting upon the main frame in a an operational mode; wherein the sub-frame is operable to support a first portion of the weight of the main frame in the operational mode; the stabilizer apparatus comprises a stabilizer gas actuator device, and wherein the stabilizer apparatus is operable to support a second portion of the weight of the main frame in the operational mode.

In another aspect of the disclosure, there is provided an agricultural apparatus comprising: a propulsion unit; a transversely extending main frame having a weight; a stabilizer apparatus comprising a stabilizer gas actuator device, the stabilizer apparatus being inter-connected to the main frame and transversely spaced outwards from a centerline of the main frame, the stabilizer apparatus operable to provide support for the main frame against downward acting forces acting upon the main frame in an operational mode; wherein: the propulsion unit is operable to support a first portion of the weight of the main frame in the operational mode; and the stabilizer apparatus is operable to support a second portion of the weight of the main frame in the operational mode.

In another aspect of the disclosure, there is provided an agricultural apparatus comprising: a sub-frame; a transversely extending main frame inter-connected to the sub-frame, the main frame being configured to be able to move upwards on a first transverse side relative to the sub-frame when subjected to a lifting force on the first side of the main frame; a stabilizer apparatus inter-connected to the main frame and transversely spaced outwards from the sub-frame, the stabilizer apparatus operable to provide support for the main frame against downward acting forces acting upon the main frame; a pneumatic system comprising: at least one frame gas suspension bag operationally located between the sub-frame and the main frame; at least one stabilizer gas bag located proximate the stabilizer apparatus; the at least one stabilizer gas bag being in pneumatic communication for transmission of pressurized gas to the at least one frame gas suspension bag; wherein during operation, when the at least one gas suspension bag is filled with a pressurized gas, and the stabilizer apparatus is subjected to an upwardly directed force, the at least one stabilizer gas bag is compressed increasing a pressure of the pressurized gas within the at least one stabilizer gas bag, and wherein pressurized gas in the stabilizer gas bag is communicated towards the at least one frame gas suspension bag, to increase a gas pressure within the at least one frame gas suspension bag, which creates a lifting force on a first side of the main frame, to cause the main frame to lift upwards relative to the sub-frame.

In another aspect of the disclosure, there is provided a method of operating an agricultural apparatus, the agricultural apparatus comprising: a sub-frame; a transversely extending main frame mounted on the sub-frame and being configured to be able to tilt upwards relative to the sub-frame when subjected to a lifting force; a stabilizer apparatus mounted on the main frame and transversely spaced from the sub-frame, the stabilizer apparatus operable to provide support for the main frame to oppose downward acting forces acting upon the main frame; a pneumatic system comprising: at least one frame gas suspension bag located between the sub-frame and the main frame; at least one stabilizer gas bag located proximate the stabilizer apparatus; the at least one stabilizer gas bag being in pneumatic communication for delivery of pressurized gas with the at least one frame gas suspension bag; the method comprising: (a) with the at least one gas suspension bag and the at least one gas stabilizer gas bag being initially filled pressurized gas, subjecting the stabilizer apparatus to an upwardly directed force causing the at least one stabilizer gas bag to be compressed and increasing the pressure of the pressurized gas within the at least one stabilizer gas bag; (b) communicating the pressurized gas in the stabilizer at least one stabilizer gas bag to the at least one frame gas suspension bag, to increase the gas pressure within the at least one frame gas suspension bag, and thereby creating a lifting force to cause the main frame to lift upwards relative to the sub-frame.

In another aspect of the disclosure, there is provided an agricultural apparatus comprising: a sub-frame; a transversely extending main frame inter-connected to the sub-frame, the main frame having a centerline and a first side on one side of the centerline and a second side on the opposite side of the centerline, the main frame being configured to be able to lift upwards on the first side relative to the sub-frame when subjected to a lifting force on the first side of the main frame and being configured to be able to lift upwards on the second side relative to the sub-frame when subjected to a lifting force on the second side of the main frame; a first stabilizer apparatus inter-connected to the main frame on the first side and transversely spaced outwards from the sub-frame, the first stabilizer apparatus operable to provide support for the main frame against downward acting forces acting upon the main frame; a second stabilizer apparatus inter-connected to the main frame on the second side and transversely spaced outwards from the sub-frame, the second stabilizer apparatus operable to provide support for the main frame against downward acting forces acting upon the main frame; a pneumatic system comprising: at least one frame gas suspension bag on the first side and operationally located between the sub-frame and the main frame; at least one frame gas suspension bag on the second side and operationally located between the sub-frame and the main frame; at least one stabilizer gas bag on the first side located proximate the first stabilizer apparatus; the at least one stabilizer gas bag on the first side being in pneumatic communication for delivery of pressurized gas to the at least one frame gas suspension bag on the first side; at least one stabilizer gas bag on the second side located proximate the second stabilizer apparatus; the at least one stabilizer gas bag on the second side being in pneumatic communication for delivery of pressurized gas to the at least one frame gas suspension bag on the second side; wherein during operation: when the at least one gas suspension bag on the first side is filled with pressurized gas, and the first stabilizer apparatus is subjected to an upwardly directed force, the at least one stabilizer gas bag on the first side is compressed increasing a pressure of the pressurized gas within the at least one stabilizer gas bag on the first side and wherein pressurized gas in the at least one stabilizer gas bag on the first side is communicated towards the at least one frame gas suspension bag on the first side, to increase the gas pressure within the at least one frame gas suspension bag on the first side, which creates a lifting force on the first side, to cause the main frame to lift upwards on the first side relative to the sub-frame; when the at least one gas suspension bag on the second side is filled with a volume of a pressurized gas, and the second stabilizer apparatus is subjected to an upwardly directed force, the at least one stabilizer gas bag on the second side is compressed increasing a pressure of the pressurized gas within the at least one stabilizer gas bag on the second side and wherein pressurized gas in the at least one stabilizer gas bag on the second side is communicated towards the at least one frame gas suspension bag on the second side, to increase a gas pressure within the at least one frame gas suspension bag on the second side, which creates a lifting force on the second side, to cause the main frame to lift upwards on the second side relative to the sub-frame.

In another aspect of the disclosure, there is provided an agricultural apparatus comprising: a sub-frame; a transversely extending main frame inter-connected to the sub-frame, the main frame being configured to be able to tilt upwards on a first side relative to the sub-frame when subjected to a lifting force on the first side of the main frame; a stabilizer apparatus inter-connected to the main frame and transversely spaced outwards from the sub-frame, the stabilizer apparatus operable to provide support for the main frame against downward acting forces acting upon the main frame; a pneumatic system comprising: at least one frame gas suspension bag and operable to at least partially suspend the main frame on the sub-frame, at least one stabilizer gas bag being operatively connected to the stabilizer apparatus, and the at least one stabilizer gas bag being in pneumatic communication of pressurized gas to the at least one frame gas suspension bag; wherein during operation, when the at least one gas suspension bag is filled with a pressurized gas, and the stabilizer apparatus is subjected to an upwardly directed force, the at least one stabilizer gas bag is compressed increasing a pressure of the pressurized gas within the at least one stabilizer gas bag, and wherein pressurized gas in the stabilizer gas bag is communicated towards the at least one frame gas suspension bag, to increase a gas pressure of pressurized gas within the at least one frame gas suspension bag, which creates a lifting force to cause the main frame to tilt upwards in a first transverse tilting direction relative to the sub-frame.

US 12,696,830 B2

5

DETAILED DESCRIPTION

Figure 1:
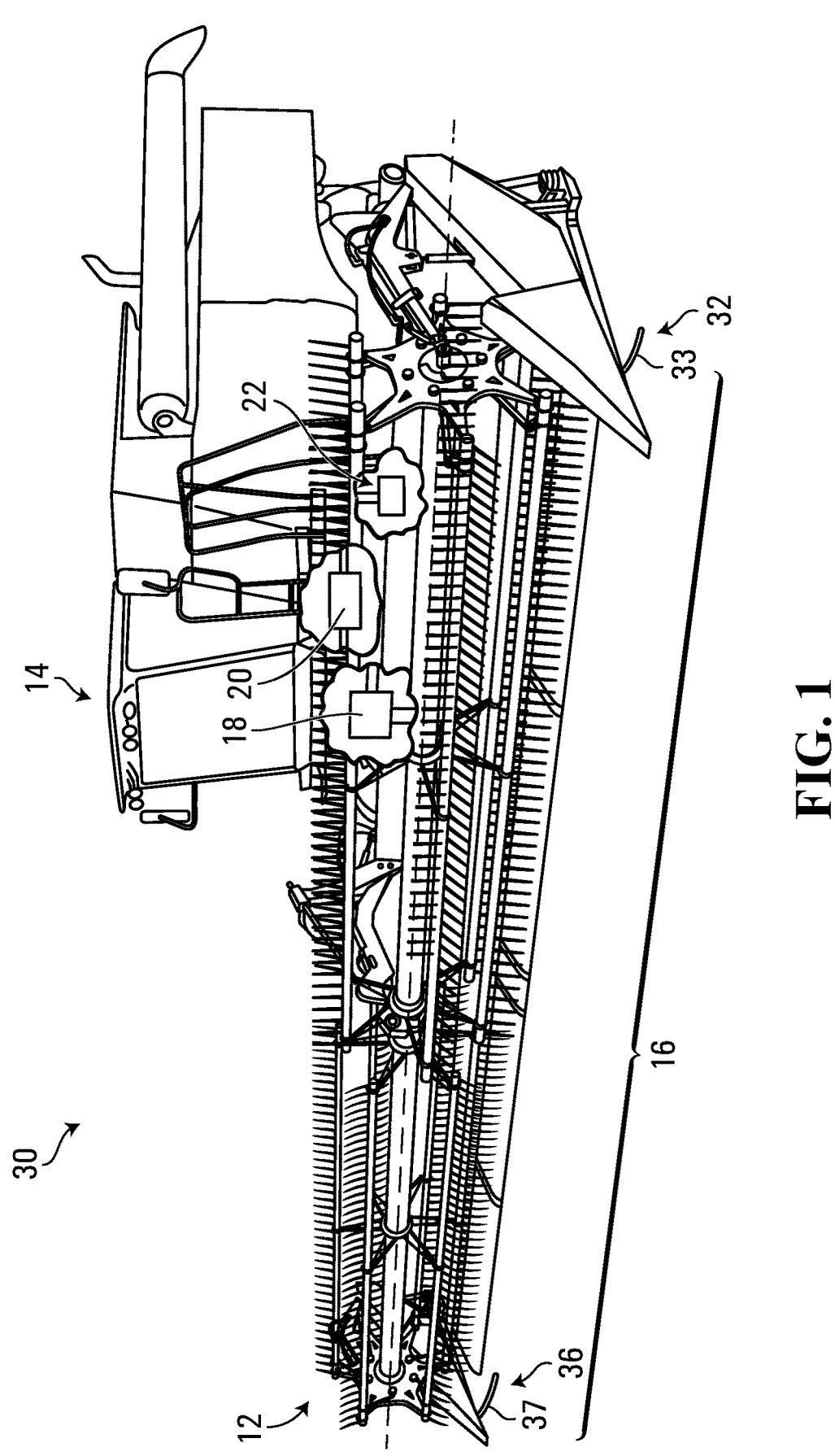
FIG. 1 is a front perspective view of an agricultural apparatus according to one embodiment.

Referring to FIG. 1, an agricultural apparatus in accordance with one embodiment is shown at 30. Agricultural apparatus 30 may be an agricultural combine harvester including a header 12 mounted to a propulsion and processing unit 14 (hereinafter referred to as a "propulsion unit").

Propulsion unit 14 provides support for header 12 is operable to propel the movement of header 12, and provide power and other utilities to header 12, during operation. Header 12 may be configured to harvest crop material from crops growing in a field while the apparatus 30 is driven across a crop field by propulsion unit 14. Header 12 may be configured to cut and collect the crop material and transfer the crop material to propulsion unit 14 which may be configured to further process the cut crop material.

Figure 1A:
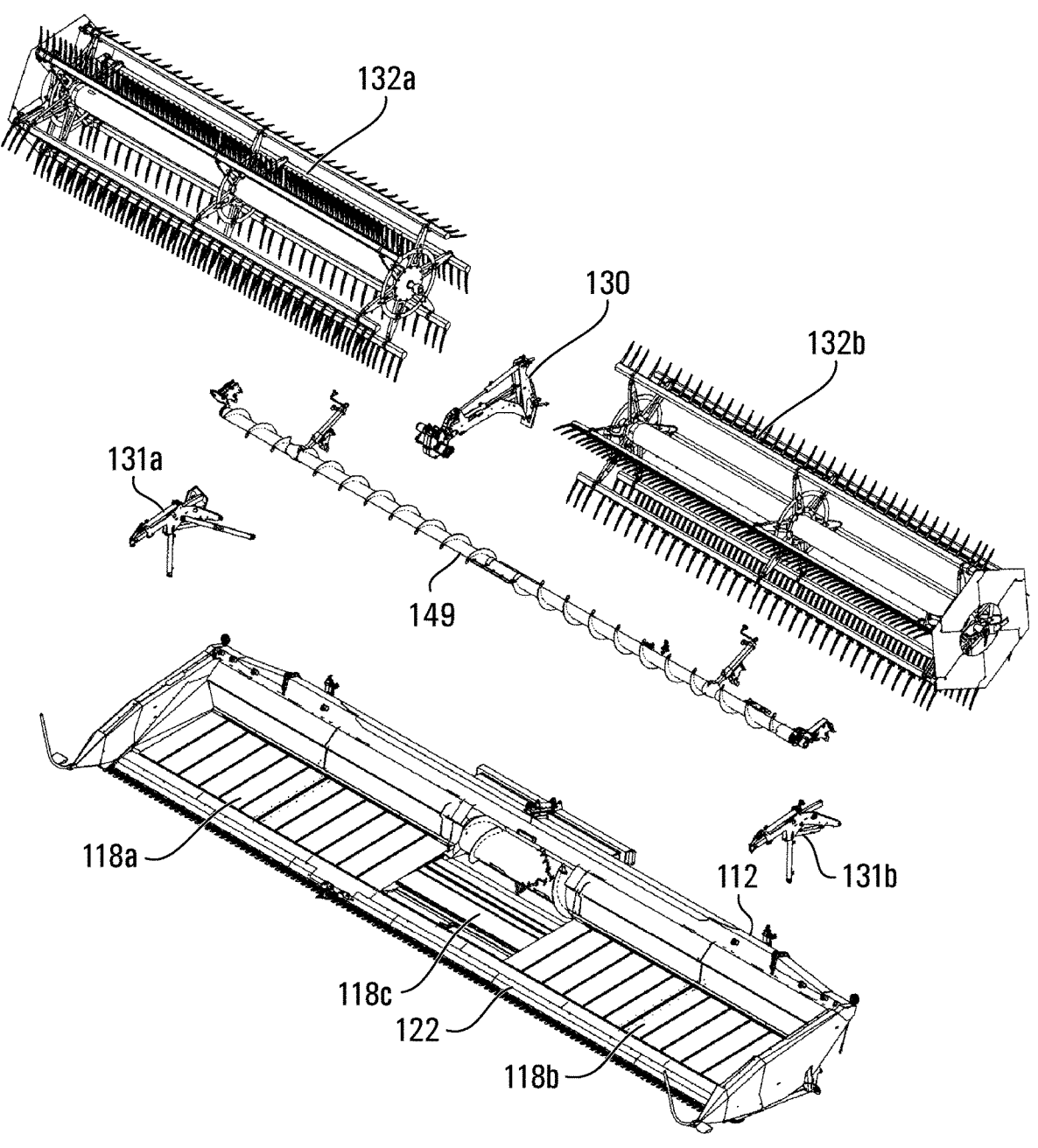
FIG. 1A is a front side perspective view of the agricultural implement of the agricultural apparatus of FIG. 1, with some parts being shown exploded.
Figure 1B:
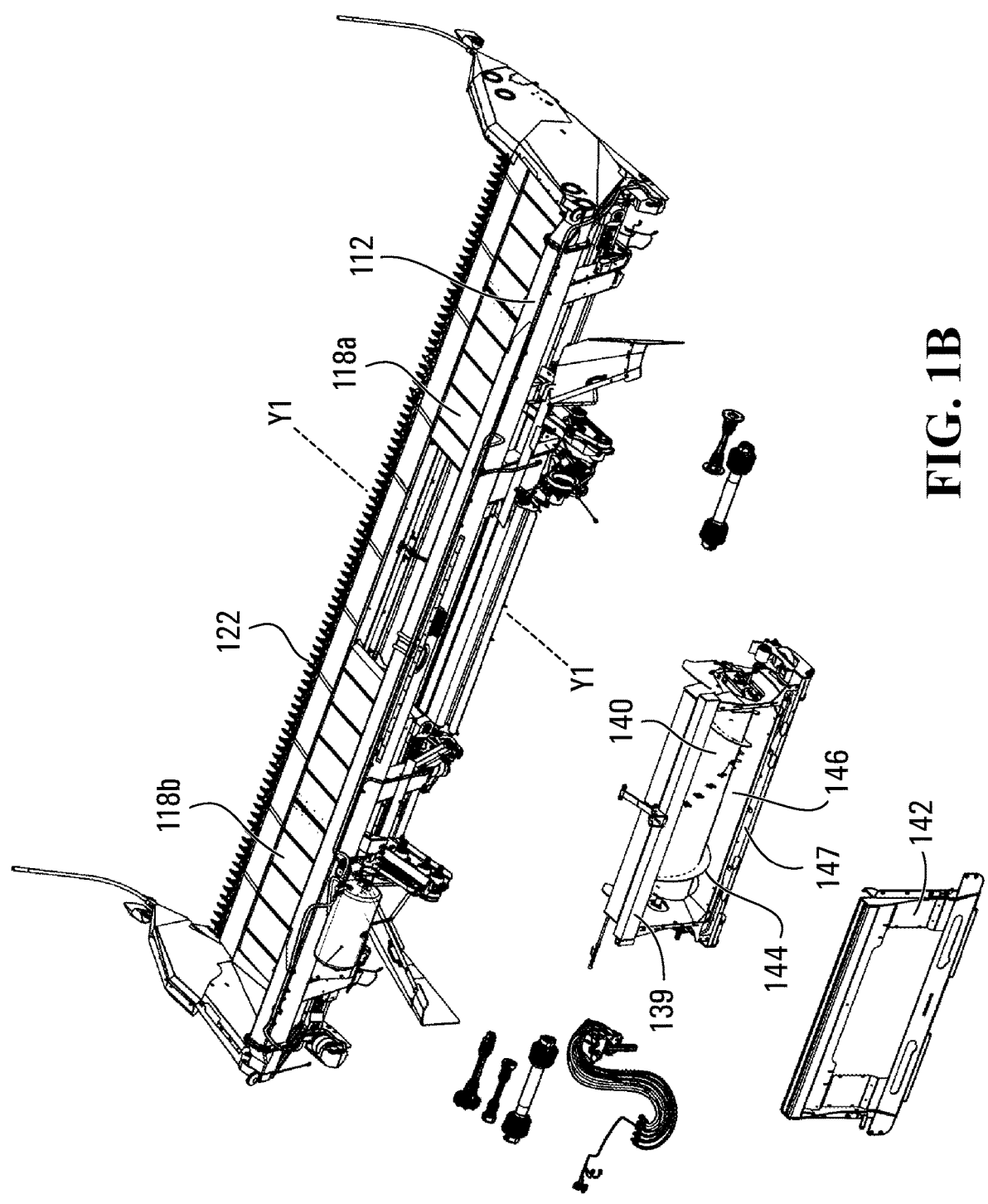
FIG. 1B is a rear side perspective view of the agricultural implement of the agricultural apparatus of FIG. 1, with some parts being shown exploded.
Figure 1C:
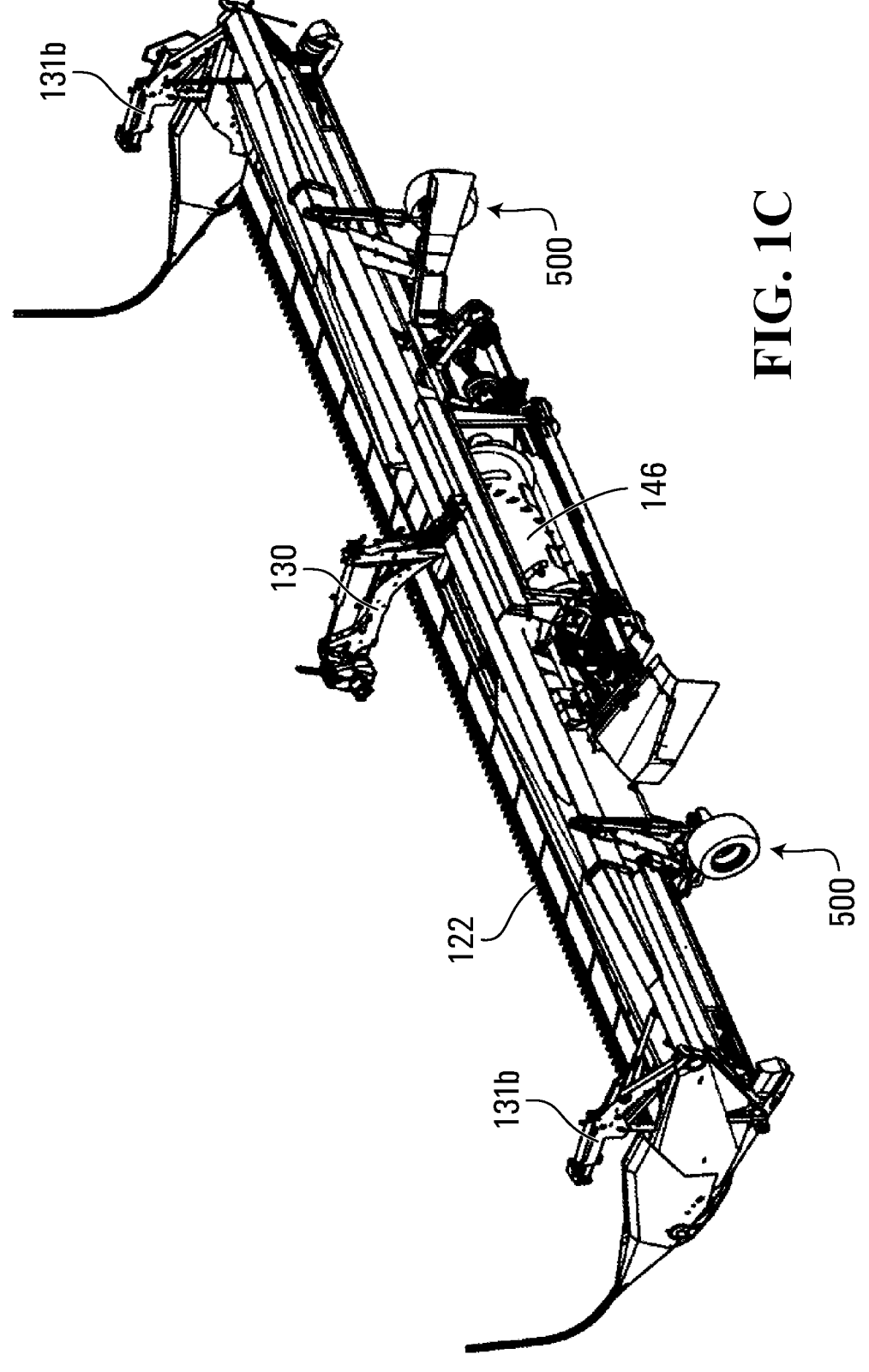
FIG. 1C is an opposite rear side perspective view of the agricultural implement of the agricultural apparatus of FIG. 1.
Figure 1D:
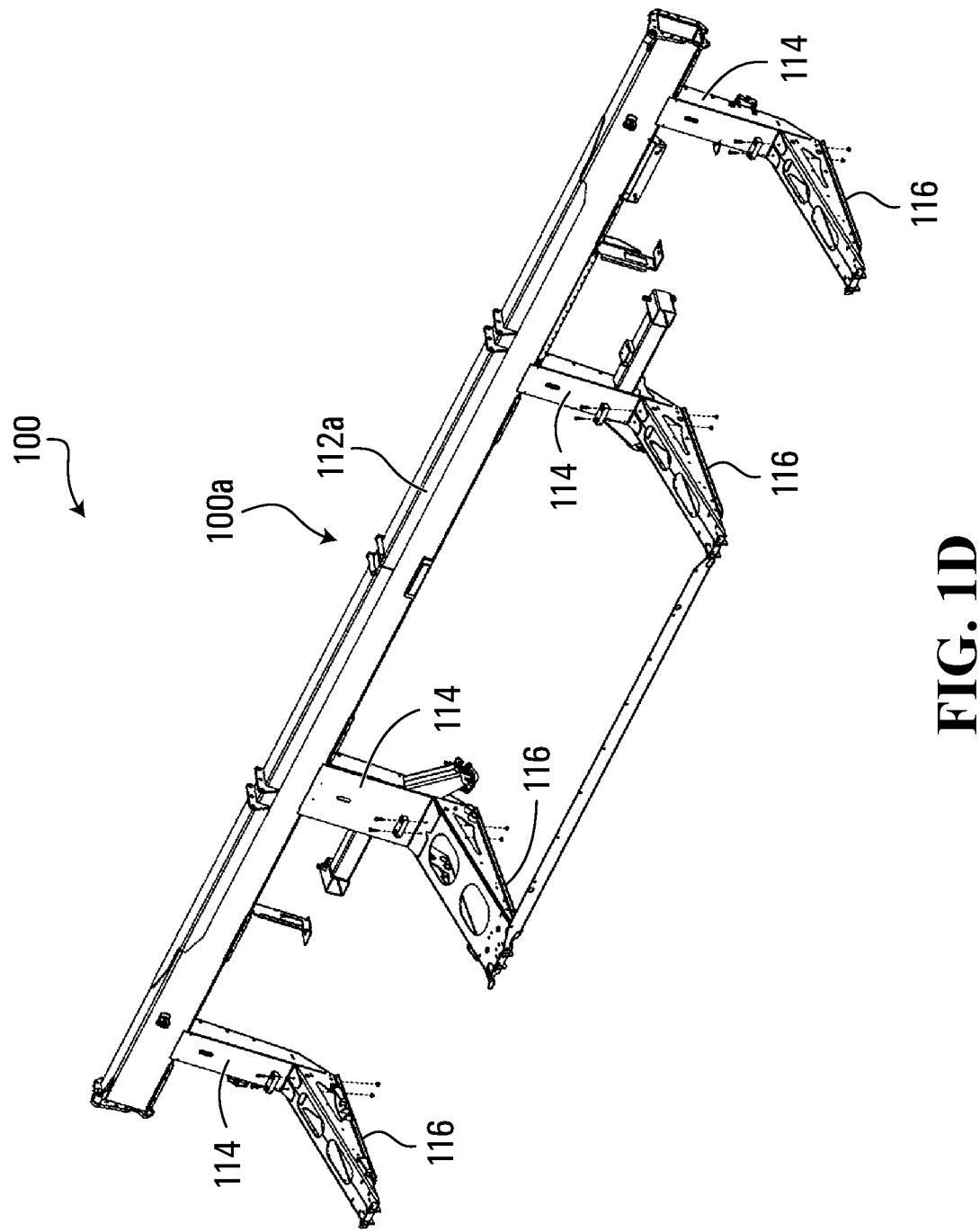
FIGS. 1D, 1E and 1F are perspective views of some main frame components of the agricultural implement of FIGS. 1A, 1B and 1C.
Figure 1E:
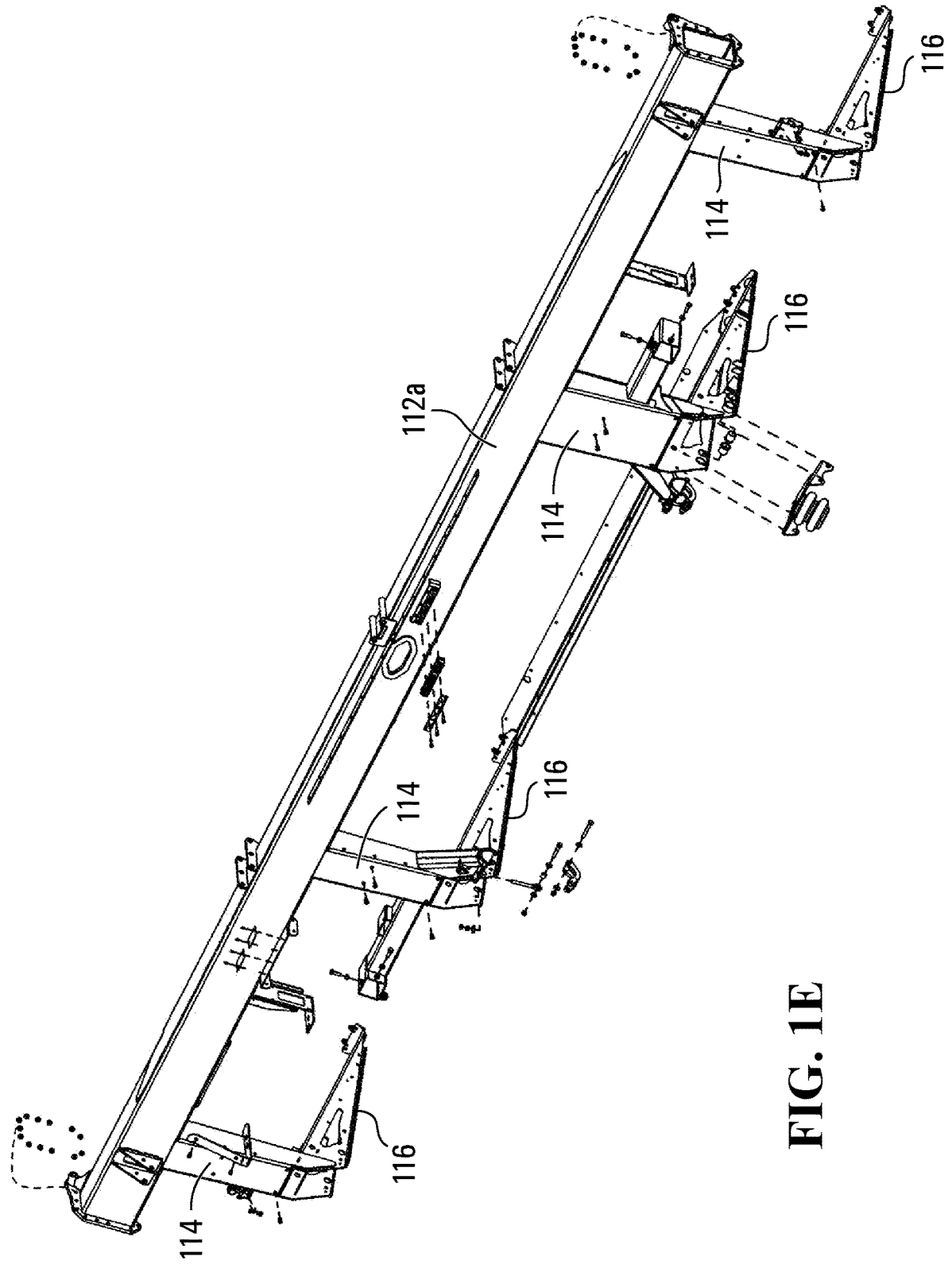
Figure 1F:
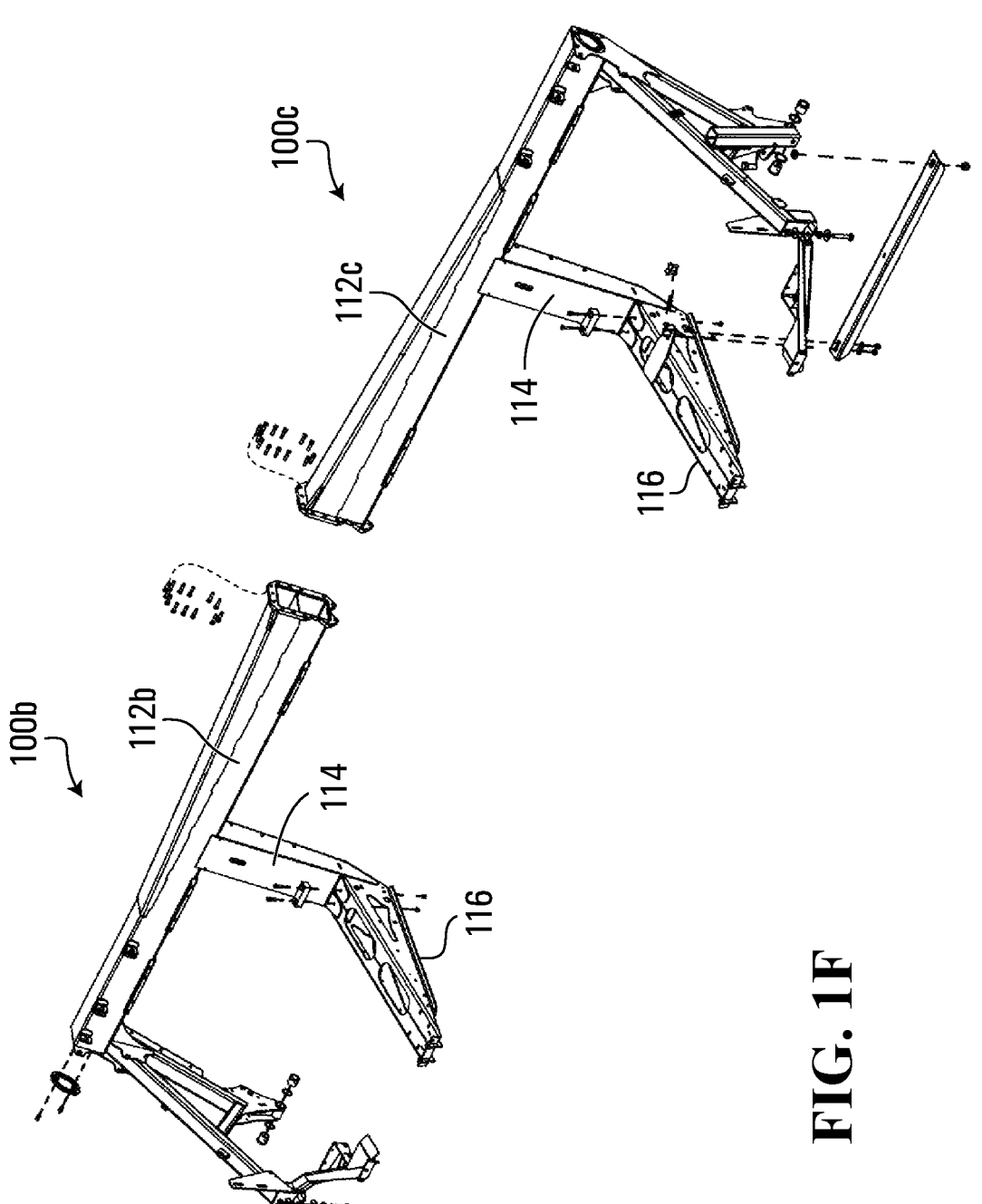

With particular reference to FIGS. 1A to 1F, header 12 may include a main frame generally designated 100. Main frame 100 may include a main transverse support beam 112 (FIG. 1B), which may include a central support beam component 112a, and right and left side support beam extensions 112b, 112c (FIGS. 1D, 1E and 1F). Support beam components 112a, 112b, 112c, may be fixedly connected to each other (for example with bolted flanges) in an end-to-end relation with longitudinal alignment to create a transversely extending composite continuous transverse support beam 112. Transverse support beam 112 may be made from any suitably strong and configured material such as a steel hollow sectional tube member such as ASTM A36 steel. Fixedly secured to transverse support beam 112, such as for example with fasteners or by welding may be a plurality of transversely spaced, generally downwardly depending, vertical struts 114.

Fixedly secured, such as for example with fasteners or by welding, to a bottom end region of each vertical strut 114 may be a generally forwardly extending horizontal strut 116. Each vertical strut 114 may be made from any suitably strong and configured material such as a steel hollow sectional tube member such as ASTM A36 streel. Each horizontal strut 116 may be a steel structural open member such as an open structural member made from ASTM A36 steel.

Main frame 100 may thus be formed as a central frame section 100a (FIG. 1D) with opposite side frame sections 100b and 100c. For each frame section, 100a, 100b, 100c, the main support beams and vertical and horizontal struts may be fastened or welded together to form a single assembly/weldment. The center, right and left frame sections 100a, 100b, 100c can then be bolted together. Depending upon the required overall transverse width, the right and left frame section may vary in width such that headers may range in total width of between about 25 ft and 60 ft, or possibly more. Spray booms on crop sprayers can be up to 130 ft in width or even more.

With reference to FIGS. 1, 1A and 1B, header 12 may also include first and second lateral draper decks 118a, 118b supported on main frame 100 and located on opposite transverse sides of a central draper deck 118c. Draper decks 118a, 118b, 118c may be mounted to header main frame 100 in a known manner and may be operable to collect and feed cut crop material to propulsion unit 14 for further processing, in a known manner. Header 12 may also include a cross auger device 149 which may be mounted on main frame 100 in a known manner and may assist in moving cut crop material on draper decks 118a, 118b to central draper deck 118c, and into central feed auger drum 144.

Header 12 may also include a center reel arm 130 and right and left side reel arms 131a, 131b which may be mounted to and supported by main header frame 100 in a known manner. Center reel arm 130 and right-side reel arm 131a may support, for rotation about a reel axis, a right reel section 132a. Center reel arm 130 and left-side reel arm 131b may support, for rotation about the same common transversely extending reel axis, a left reel section 132b.

Right and left reel sections 132a, 132b may be driven about their common transversely oriented reel axis with known reel drive systems. Reel sections 132a, 132b may be operable to pull crop material onto cutter bar 122 to be cut by the cutting blades of cutter bar 122, and then pull cut crop material directly onto central draper deck 118c and also onto the draper decks 118a, 188b for transport to central draper deck 118c.

Figure 4:
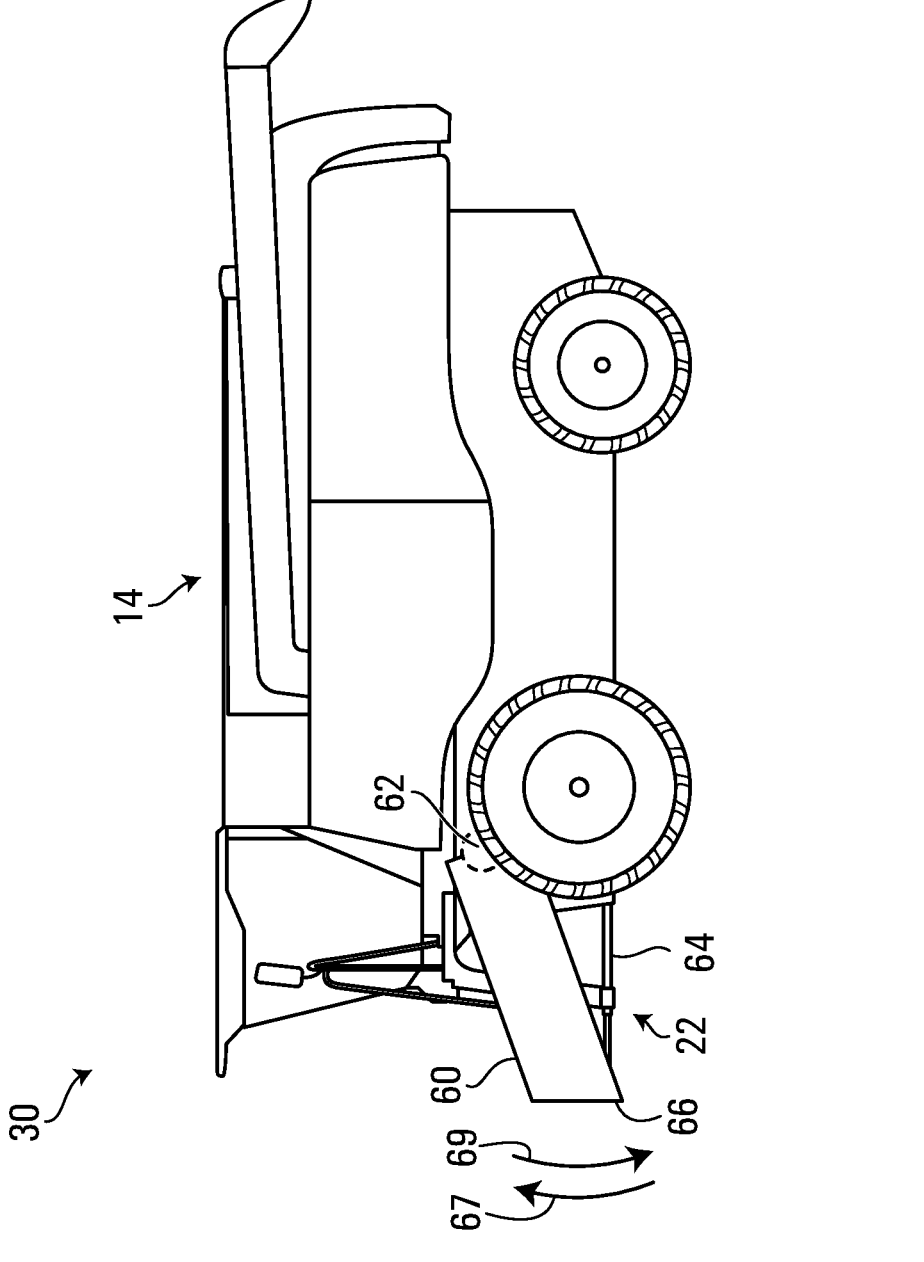
FIG. 4 is a side view of the apparatus of FIG. 1.

With particular reference to FIGS. 1A and 1B, interconnected to header main frame 100 may be a generally rectangular shaped sub-frame 140. Main frame 100 and the header components supported thereon, may in turn be supported by sub-frame 140. The upper, lower and side members of sub-frame 140 may be formed from suitably strong and rigid members such as for example, hollow section rectangular/square tubular structural steel members made from ASTM A36 steel that may be welded together to form an integral weldment unit. Sub-frame 140 may also be fixedly secured, such as for example with bolts, to a generally rectangular shaped adapter plate 142. The upper, lower and side members of adapter plate 142 may also be formed from suitably strong and rigid members such as hollow section rectangular/square tubular structural steel members made from ASTM A36 steel. Adapter plate 142 may in turn be fixedly secured, such as for example via a latching coupling mechanism that is compatible with the type/brand/model of propulsion unit 14 being utilized. Adapter plate 142 and the components supported thereon, may in turn be supported by a feeder house 60 associated with propulsion unit 14 (FIG. 4). Feeder house 60 may be part of and pivotally connected to the rest of propulsion unit 14 at pivot point 62.

A feed auger drum 144 may be fixedly mounted transversely to sub-frame 140 within a central feed opening 146 of sub-frame 140. Adapter plate 142 may also have a complementary sized and shaped opening to central feed opening 146 in sub-frame 140. Feed auger drum 144 may be powered in a known manner and may be operable to assist in feeding cut crop delivered by central draper deck 118c to the feeder house 60 associated with propulsion unit 14.

As will be described further hereinafter the connection between sub-frame 140 and main header frame 100 may be a three-point pivotal connection that permits a limited degree of lateral (side-to-side) tilting in upward and downward lateral directions of main header frame 100 relative to sub-frame 140, about an upper pivotal connection, and thus relative to adapter plate 142 and feeder house 60. This connection between sub-frame 140 and main header frame 100 may be provided with a header air suspension system (as described hereinafter) to resist/absorb/cushion/dampen the forces acting on the header frame 100 and cutter bar 122, including forces acting in lateral tilt directions, which are transferred to sub-frame 140, as described further below.

With reference now to FIGS. 1D-1F and FIGS. 8A-8E, pivotally mounted to each horizontal strut 116, may be a forwardly and generally horizontally extending cutter bar float paddle 120 which has a portion that extends beyond the front edge of each horizontal strut 116. Each cutter bar float paddle 120 may each be made of any suitably strong and configured material(s) such as ASTM A36 steel. Each cutter bar float paddle 120 may be configured and mounted to be able to pivot about a transverse axis X1 at its rearward end region relative to its respective horizontal strut 116. A forward end region of each cutter bar float paddle 120 may be interconnected to cutter bar 122. Thus, cutter bar 122 may be connected to, and at least partially supported by, a plurality of transversely spaced cutter bar float paddles 120, and each cutter bar float paddle 120 may be configured and operable for independent upward and downward movement within an angular range that enables cutter bar 122 to have an upward/downward range of translation of several inches (eg. an upwards/downwards translation of about nine inches). A paddle travel limiting strap 125 may be secured between each paddle end region 120a and the end of horizontal strut 116. Each paddle travel limiting strap 125 may act to limit the downward movement of paddle regions 120a relative to the end of horizontal strut 116. The upward movement of paddle 120 may be limited by contact between surfaces of paddle 120 and surfaces of horizontal strut 116. Cutter bar 122 may be a known type of crop cutting apparatus that extends laterally substantially the entire width of header 12 and may include reciprocating cutting blades that may be powered in a known manner.

Figure 8A:
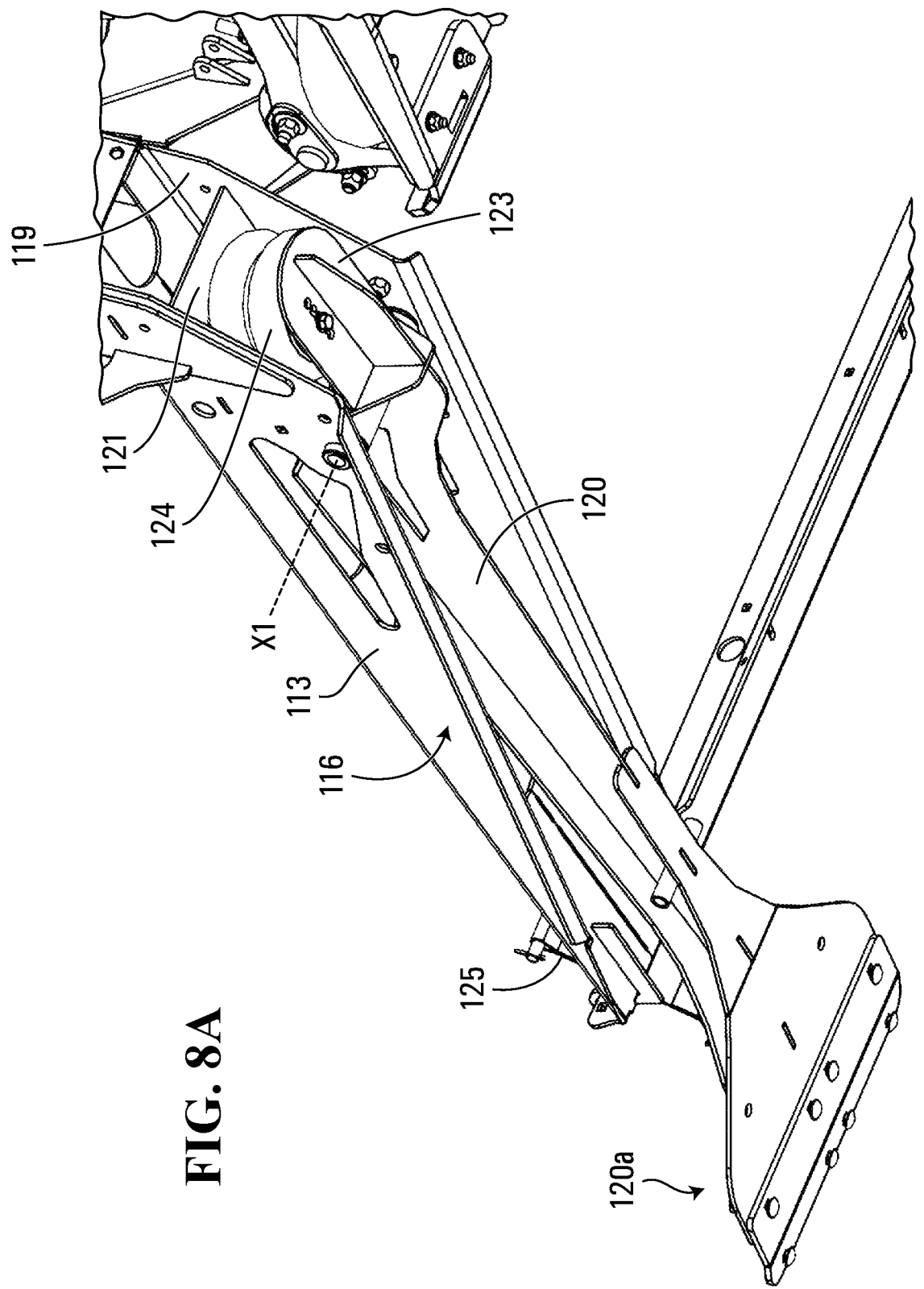
FIG. 8A is an enlarged rear lower perspective view of some other components of the agricultural implement of the agricultural apparatus of FIG. 1.
Figure 8B:
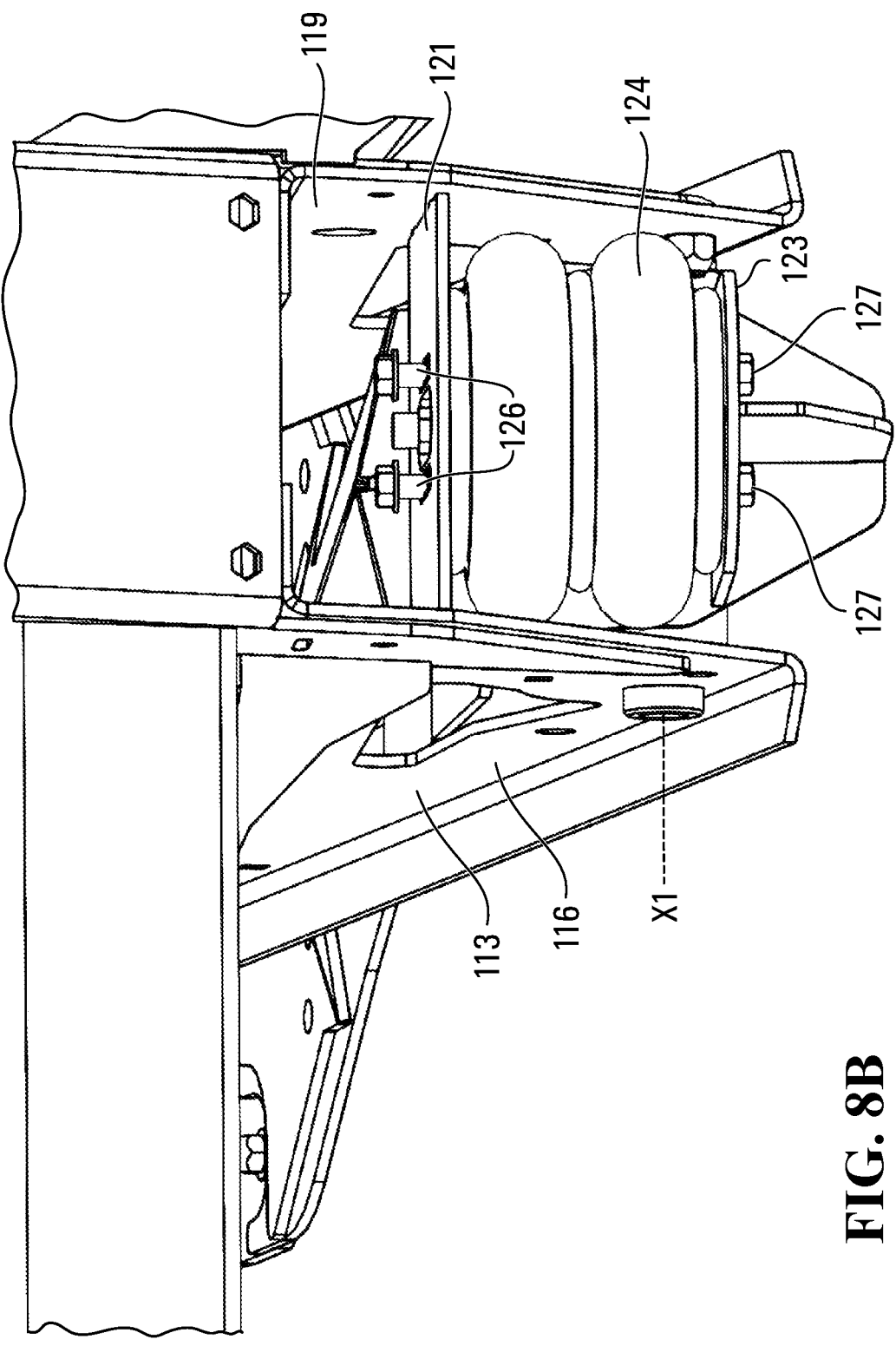
FIG. 8B is an enlarged rear perspective view of some components shown in FIG. 8A.
Figure 8C:
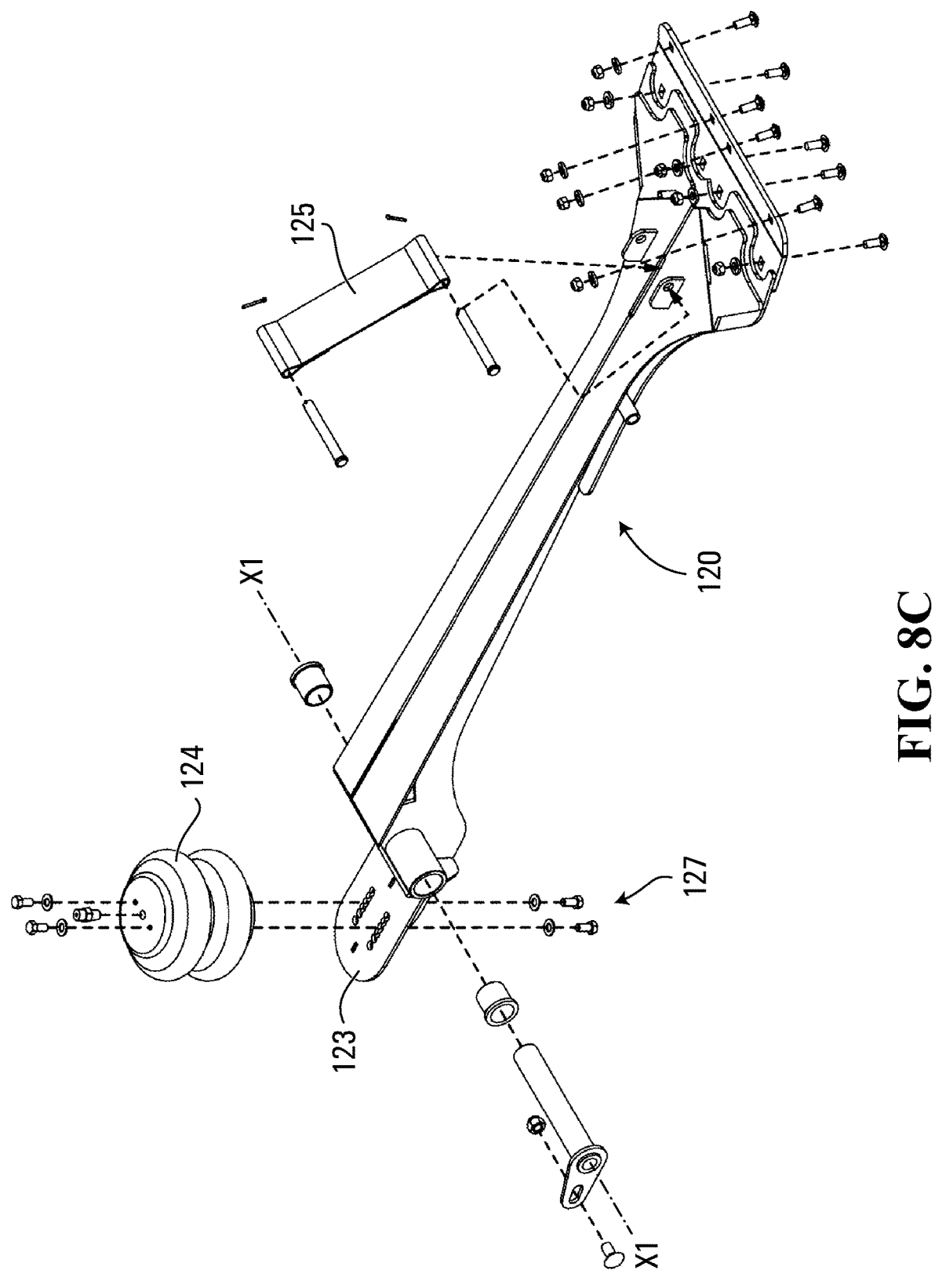
FIG. 8C is an enlarged upper exploded perspective view of components shown in FIG. 8A.
Figure 8D:
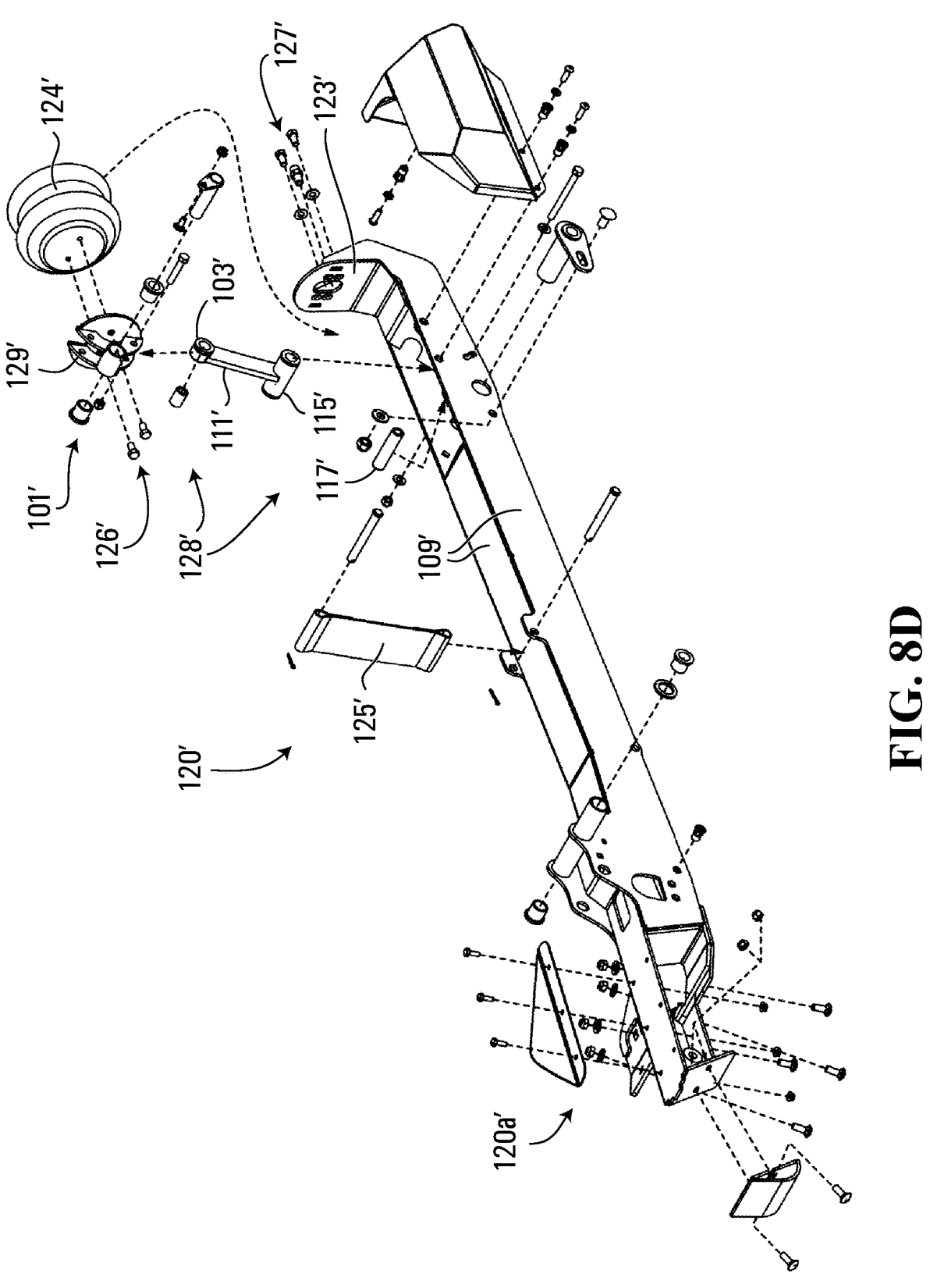
FIGS. 8D and 8E are enlarged upper exploded and assembled perspective views of components similar to the components shown in FIG. 8A.

FIG. 8D depicts a variation of a type of cutter bar float paddle 120' which functions substantially the same as cutter bar float paddle 120 but which may be deployed at the right and left end regions of main frame 100, for securing to right and left end regions of cutter bar 122. Each cutter bar float paddle 120' may also each be made of any suitably strong and configured material(s) such as ASTM A36 steel. Each cutter bar float paddle 120' may be configured and mounted to be able to pivot about a transverse axis at its rearward end region relative to a respective horizontal strut 116. A forward end region 120a' of each opposed end cutter bar float paddle 120' may be interconnected to end regions of cutter bar 122. Thus, cutter bar 122 may be connected to, and at least partially supported by, cutter bar float paddles 120', and each cutter bar float paddle 120' may also be configured and operable for independent upward and downward movement within an angular range that enables cutter bar 122 to have an upward/downward range of translation of several inches (eg. an upwards/downwards translation of about nine inches)—like cutter bar float paddles 120. A paddle travel limiting strap 125' may be secured between a middle area of cutter bar float paddle 120a' and a middle region of a horizontal strut 116. Each paddle travel strap 125' may act to limit the downward movement of paddle 120a' relative to the end of horizontal strut 116. The upward movement of paddle 120' may be limited by contact between surfaces of paddle 120 and surfaces of a horizontal strut 116.

With particular reference to FIGS. 8A, 8B, 8C and 8D, at least one cutter bar gas actuator device/float gas bag, which may be a cutter bar float air bag 124, may be mounted between a rearwardly generally horizontally extending plate member 123 of each cutter bar float paddle 120 and a rearwardly positioned, upper generally horizontal rigid support plate 121 of the respective horizontal strut 116, behind the pivot axis X1. The support plates 123 may extend between inward facing support surfaces 119 of vertical side walls 113 of each horizontal strut 116. Each plate member 123 may be formed integrally at a rearward region of cutter bar float paddle 120 and may pivot about axis X1 (FIG. 8C) with the rest of its respective cutter bar float paddle 120 relative to its respective horizontal strut 116. Each cutter bar float air bag 124 may have a lower integral rigid plate portion that may be fixedly secured to a respective plate member 123 with a bolt mechanism 127 and may be held in lateral position relative to support strut plate 121 with guide bolts 126 passing through an opening with the support strut plate 121. Bolt holes in the plate portion of the air bag 124 can be appropriately sealed in a known manner from the inner pressurized air cavity of the cutter bar float air bag 124 (eg. blind mounting nuts/bolt holes). The rigid upper plate portion may also provide for an air inlet/outlet which can be pneumatically connected to a pneumatic/air hose 903 (FIG. 9).

Figure 8E:
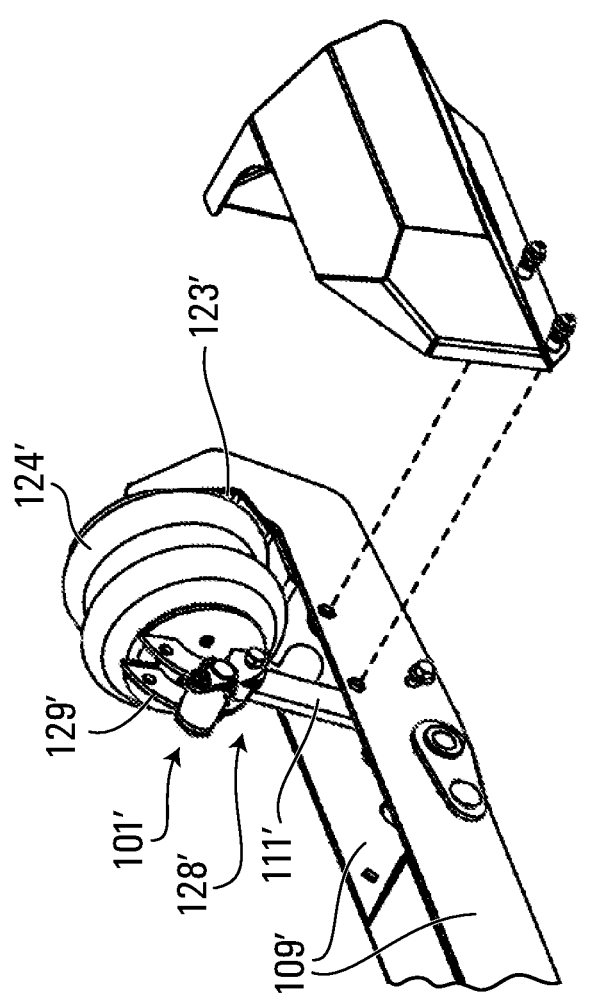

Similarly, with reference to FIGS. 8D and 8E, at least one cutter bar float gas bag, which may be a cutter bar float air bag 124' (and which hereafter may at times also be referred to collectively with cutter bar float air bag 124 simply as cutter bar float air bag(s) 124), may be mounted between a rearwardly generally vertically extending plate member 123' of each cutter bar float paddle 120' and a front side, generally vertically extending mounting plate 129' of cutter bar float paddles 120' located at each of the right and left end regions of main frame 100. Mounting plate 129' is part of a pivoting mounting bracket assembly 128'. Bracket assembly 128' may include a pivot arm 111' having a lower pivot cylinder 115' that is pivotally mounted with a transverse pin 117' between vertical side walls 109' of cutter bar float paddle 120'. An upper pivot assembly 101' pivotally interconnects an upper end 103' of pivot arm 111' to both mounting plate 129' of cutter bar float air bag 124' and to a portion of vertical strut 114 of main frame 100. Each cutter bar float air bag 124' may have a rear integral rigid plate portion that may be fixedly secured to a respective plate member 123' with a bolt mechanism 127' and may be held in vertical position with guide bolts 126'. Bolt holes in the forward rigid plate portion of the air bag 124' can be appropriately sealed in a known manner from the inner pressurized air cavity of the cutter bar float air bag 124' (eg. blind mounting nuts/bolt holes). This rigid forward plate portion may also provide for an air inlet/outlet which can be pneumatically connected to a pneumatic/air hose 903 (FIG. 9). Increasing the pressure within cutter bar float air bag 124' will cause cutter bar float air bag 124' to pivot about transverse axis of upper pivot assembly 101'. There is a mechanical benefit to this mechanism for cutter bar float air bag 124' compared to the corresponding mechanism for cutter bar float air bag 124 as described above, in that the spring rate response/behavior of the pivot mechanism for cutter bar float air bag 124' provides a more constant spring rate over the full range of pivoting motion of cutter bar float air bag 124' about the transverse pivot axis.

Each cutter bar float air bag 124 may be operable to provide an air suspension/force cushioning effect to the pivoting movement of each cutter bar float paddle 120 about its axis X1 relative to the horizontal strut 116, when forces are imparted upon cutter blade 122 and thus on paddles 120, including the downward acting force of gravity on the cutter blade and paddles, and upward acting forces imposed by rising terrain as cutter bar 122 moves across the ground surface during operation of agricultural apparatus 30.

Figure 9:
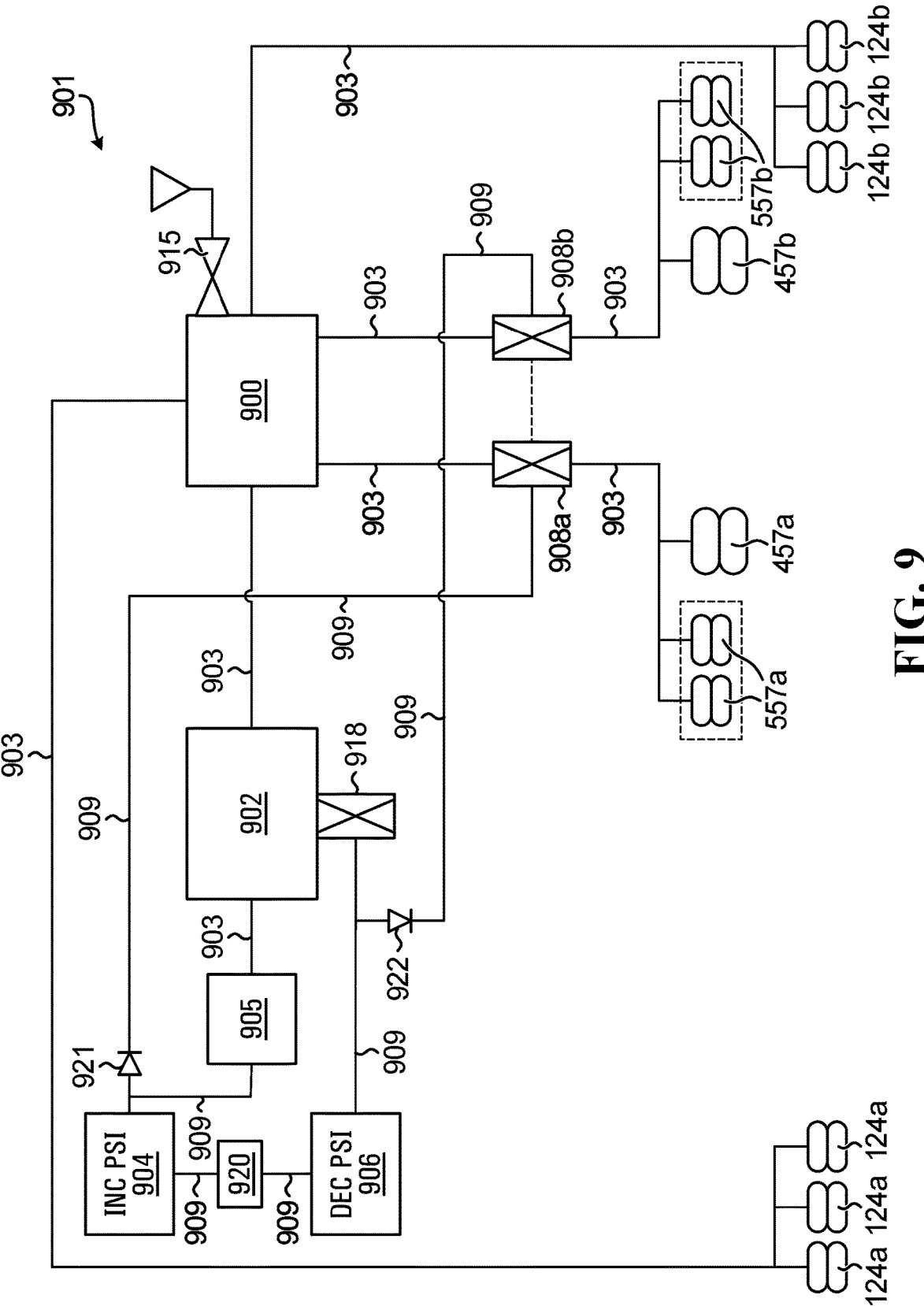
FIG. 9 is a schematic of a pneumatic system in accordance with an embodiment.

Each cutter bar float air bag 124 (which may also include each cutter bar float air bag 124') may, through a plurality of hoses and valves, be in pneumatic communication with, and be a part of, a pneumatic system 901 (which may be compressed air or possibly another suitable gas) as described further hereinafter, that also includes a gas (air) compressor 905 and a gas (air) storage/working tank 902 (FIG. 9). While in some embodiments, pneumatic system 901 uses pressurized air as the pressurized gas, other embodiments may utilize other suitable gases such as gases that may be less thermally expansive than air (eg. for use in some climatic environments). For example, pneumatic system 901 may utilize pressurized nitrogen gas.

Each cutter bar float air bag 124 (which may also include each cutter bar float air bag 124') may be inflated and deflated by the pneumatic system 901 over a range of air pressures such as for example between 30 psi and 100 psi.

or between 30/40 psi. and 120 psi. Each cutter bar float air bag 124 may be made of a generally tubular side wall made of a resiliently expandable material such as a rubber. The sidewall material may be permanently bonded to/crimped with metal generally cylindrical, flat end plates at opposite ends. Cutter bar float air bags 124 may also be sized, configured and positioned to be able to exert appropriate forces/pressures (also known as resistance forces) on the surface of each plate member 123 and opposed facing surface of horizontal strut plate 121 of respective horizontal strut 116 when the interior cavity of the cutter bar float air bag 124 is pressurized by pneumatic system 901. Each cutter bar float air bag 124' may also operate in a similar manner. An example of a known type of air bag that might be employed as a cutter bar float air bag 124 is the model FD 70-12 CI Double Convolution Air Acutator made by ContiTech AG and/or one of its affiliated companies or a comparable AIRSTROKE™ actuator made by Firestone Industrial Products, LLC. Such an air suspension bag may have upper and lower plates with a diameter of about 4.25 inches and the interior of the bag may have operating internal volumes of between about 40 cubic inches to 110 cubic inches over operating pressures of between about 30/40 psi and 120 psi.

It should be noted that a pressurized gas bag, such as cutter bar float air bag 124 (as well as gas/air suspension bag 457 and gauge wheel gas/air bags 557 as described below) function like a spring in which the spring rate is able to be varied by the air pressure inside the air bag. The higher the internal air pressure, then the stiffer the spring force action of the air bag.

It should also be noted that all such pressurized gas bags may, in addition to being capable of resisting and imparting varying forces (eg. provide lifting/load carrying capabilities), may also be capable of functioning to act as vibration isolators/dampeners.

The level of the air pressure within each cutter bar float air bags 124/124' provided by pneumatic system 901 (as well as the height of main frame 100 relative to the ground surface) can be varied to alter how much of the weight of the cutter bar 122 is carried on the frame 100 and how much is supported by the contact (if any) between the cutter bar 122 and by the stabilizer apparatuses 500 (as referenced below) and the ground surface. When each of the transversely spaced float air bags 124/124' is inflated to a relatively high, typically the same, initial setup pressure by pneumatic system 901 (eg. a maximum pressure such as 100 psi) each cutter bar float air bag 124 then all of the float air bags 124/124' will have expanded, and the cutter bar float paddles 120/120' will be forced to pivot about their respective axes X1 relative to the horizontal strut 116 to a maximum upwards extent permitted. A stop member may be provided to limit the upwards movement of the forward portion of cutter bar float paddle 120/120'. The pressure in each of the cutter bar float air bags 124/124' may be set to such a high level that the float air bags will be very difficult to compress during operation of agricultural apparatus 30 as header 12 moves through a crop field. Thus, if the height of header main frame 100 is set at a particular desired cutting height above the ground, cutter bar 122 will, when travelling over flat ground surface, have most, or at least the majority, of its weight carried by the main header frame 100. This is because, each cutter bar float paddle 120/120' will be unable to pivot to move the cutter bar 122 downwards, to any significant extent relative to horizontal strut 116 and cutter bar 122 will typically not be providing any support for the weight of header 12. This creates a relatively high degree of stiffness of the entire cutter bar 122 which results in the entire cutter bar 122 being substantially rigid, and substantially fixed in upward/downward movement relative to horizontal struts 116, and consequently also relative header main frame 100. None of cutter bar float paddles 120/120' will be able to pivot to any significant extent about their respective axes X1, and cutter bar 122 will behave substantially like a cutter bar this is fixedly connected to, and unable to move relative to, header main frame 100. This mode of operation may be referred to as the cutter bar 122 operating in a "rigid mode". In this mode, the height of the header main frame 100 and of cutter bar 122 can be set to a desired cutting height relative to, and typically a few inches above, the ground surface.

However, by varying/lowering the pressure in each of the cutter bar float air bags 124/124', each cutter bar float paddle 120/120' and cutter bar float air bag 124/124' arrangement referenced above, can also be operated in a different manner such that cutter bar 122 can "flex" transversely across its width relative to main support frame 100 (i.e., along its entire length or at one or more certain sections across its width). If each of the float air bags 124/124' is inflated to a specified lower pressure level (eg. at an initial setup pressure such as about 30 psi) then the float air bags 124/124' will act more like a spring that allows each cutter bar float paddle 120/120' to pivot about axis X1 when the cutter bar 122 is subjected to upward and downward variations in forces, such as the force of gravity acting on the cutter bar and the result of the interaction of the cutter bar 122 with a changing level of the ground surface. The pressure in the float air bags 124/124' may be at a level that the cutter bar float air bags 124/124' will be able to be resiliently compressed during operation of agricultural apparatus 30 as the header 12 moves through a crop field. This pressure level creates a lower degree of stiffness in the cutter bar float air bags 124 (which results in each cutter bar float paddle 120 being able to pivot about their respective axes X1) and cutter bar 122 will be able to move upwards and downward within a range of movement when subject to variations in upwardly/downwardly acting forces, typically caused by changes in the level of the ground surface. This may be referred to as the cutter bar operating in a "flex mode". At a relatively lower air pressure level in the float air bags 124/124' (eg. 30 psi), the header frame height may be selected such that a relatively high proportion of the weight of cutter bar 122 is being carried by its contact with the ground surface and a much lower proportion, if any, of the weight of the cutter bar 122 is carried by stabilizer apparatuses 500 which generally are in contact with the ground, and by header main frame 100, acting through the cutter bar float air bags 124/124' interposed between the cutter bar float paddles 120/120' and the respective horizontal struts 116.

When during operation, agricultural apparatus 30 is moving through a field, cutter bar 122 may be configured in "flex mode" and the main frame 100 height may be selected (as described further below) so that the cutter bar 122 is, when on level ground, in contact with the ground surface. The header frame 100 may have been positioned at a particular desired position relative to the propulsion unit 14. For example, if the cutter bar 122 has a range of relative upward and downward movement relative to header main frame 100 of 9 inches, the header height control system 10 (FIG. 2) may be set such that when the cutter bar is resting on a level ground surface, the cutter bar may be set at a desired cutting position of 2 inches down from the uppermost zero-inch position. This means that that each paddle 120 is able to independently move upwards 2 inches and downwards 7 inches relative to the header main frame 100. When cutter bar 122—or a portion of cutter bar 122 encounters a portion of rising ground surface, if the height control system for header main frame 100 does not raise the entire header 12 relative to the propulsion unit 14, the cutter bar 122 may rise relative to the header main frame 100, as the forward regions of one or more cutter bar float paddles 120/120' pivot upwards relative to and about the pivot connection with its respective horizontal strut 116. This allows the respective float air bags 124/124' to expand, reducing the air pressure therein. During such operation, the main header height control system 10 which controls the height of main frame 100 relative to propulsion unit 14, may continue to be utilized to try to maintain main frame 100 at such a position that the entire cutter bar 122 is maintained at about a 2-inch desired cutting position, on level ground.

However, when cutter bar 122—or a portion of cutter bar 122—encounters a portion of ground surface at a lower level, the header height control system 10 (FIG. 2) may not need to respond to lower header main frame 100 relative to the propulsion unit 14, and may remain at its set cutting position. Instead, cutter bar 122 (or a portion of the cutter bar) may lower relative to the header main frame 100, as forward regions of one or more cutter bar float paddles 120 pivot downwards relative and about the pivot connection with its respective horizontal strut 116 due to the weight of the cutter bar 122. As the cutter bar float paddles 120 pivot downwards at the front regions with cutter bar 122, the rear plate member 123 will compress the float air bag(s) 124/124' thus increasing the air pressure therein, resulting in an increase in the force being exerted back by the air float bag 124/124' against the cutter bar float paddle 122. This creates a cushioning effect by which a greater portion of the weight of the cutter bar 122 is being carried by the header main frame 100 and less of the weight of the cutter bar 122 is being carried by the ground surface. This response of the cutter bar 122 to the downward change in surface level can occur more quickly as the response is direct, as compared to the response of the header height control system 10 which acts in response to header height signals that control hydraulic cylinders to adjust the position of the header frame 100, as described further below.

Figure 5A:
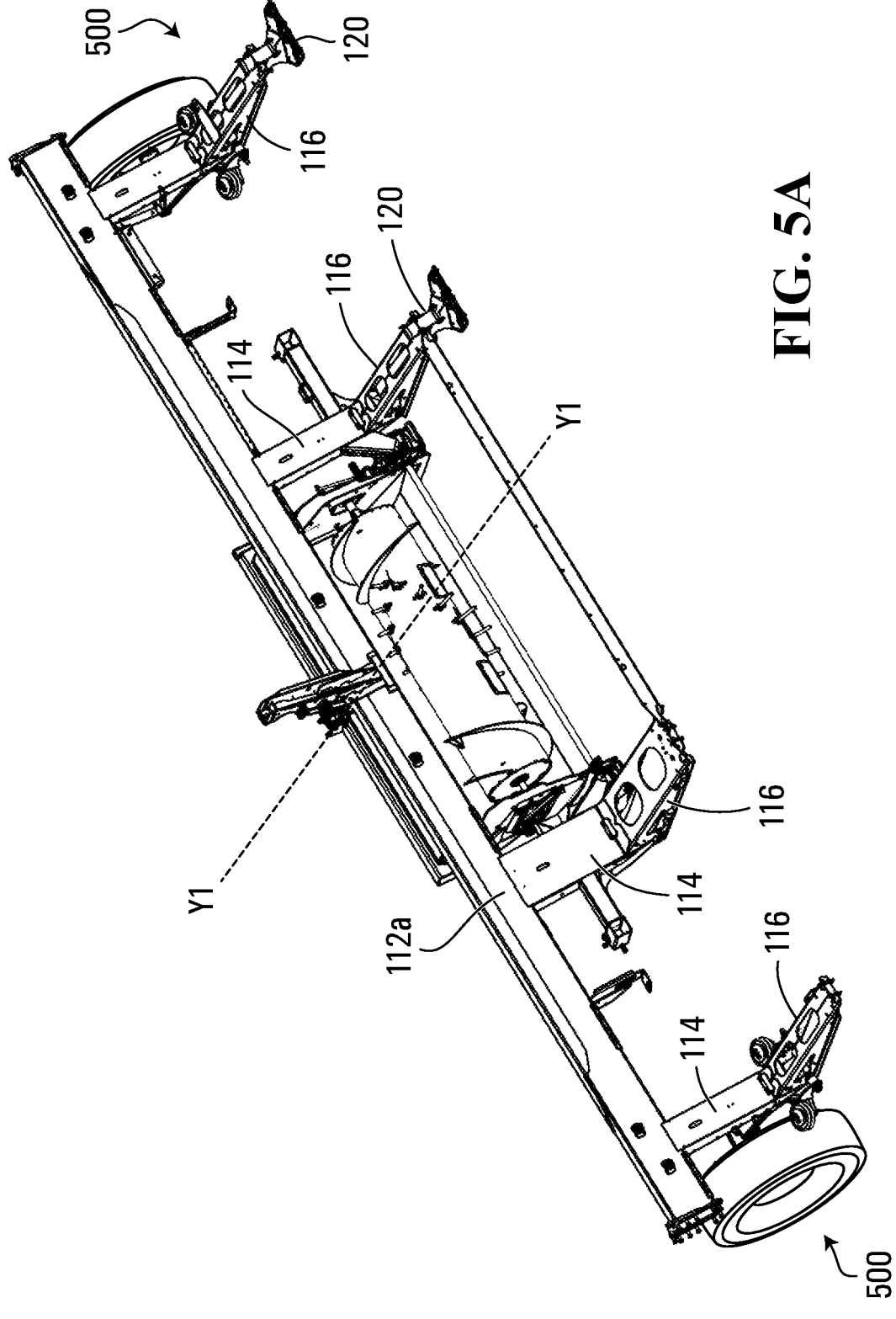
FIG. 5A is a front side perspective view of some components of the agricultural implement of the agricultural apparatus of FIG. 1.

As will be described further hereinafter, header 12 may also be equipped with at least one stabilizer apparatus generally designated 500, (and possibly two or more) on each lateral side of the center line Y1 of the header (FIG. 5A). The stabilizer apparatus(es) 500 on each side can assist in carrying some of the forces acting on header 12, during modes of operation.

As may be evident from the foregoing, header 12 may in some modes of operation (eg. rigid mode of cutter bar 122 and header 12) be able to efficiently harvest the crop material when the main frame 100 of header 12 is kept at a constant height or separation distance close to but generally above the ground, without striking the ground. As apparatus 30 travels over the ground, the ground may have inconsistencies and undulations and therefore in order to keep the header 12 at a constant height relative to the ground, the apparatus may have a sensor system 16 to sense changes in level of the ground, which may act as a reference surface. The apparatus 30 then controls a position of main frame 100 of header 12 relative to the propulsion unit 14 to maintain header main frame 100 of header 12 at a constant or desired height above the reference surface.

Figure 2:
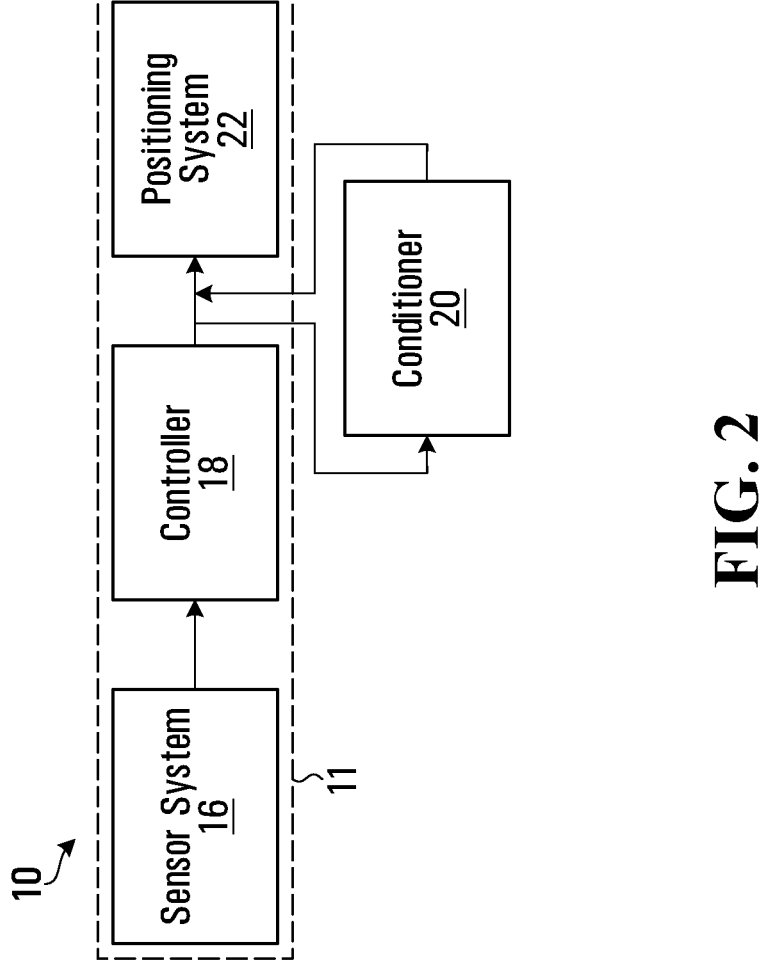
FIG. 2 is a schematic view of the system of FIG. 1 according to one embodiment.

Referring to FIG. 2, to control the position of header 12, apparatus 30 as shown in FIG. 1, may include a header height control system 10 for controlling the movement/ position of the agricultural implement relative to the propulsion unit 14. The system 10 may include a controller system 11 including a sensor system 16, a controller 18, and a header positioning system 22. The controller system 11 may be a known controller system such as supplied by a manufacturer of the apparatus for controlling movement of the agricultural implement.

Referring to FIG. 2, sensor system 16 may be configured to sense a position of the agricultural implement (eg. of the sub-frame 140 relative to-main frame 100) and to transmit position signals representing the sensed position to controller 18. Controller 18 may receive the position signals representing the sensed position and compare the sensed position to a desired position to determine a difference. Controller 18 may then produce control signals, based on the difference. Controller 18 may be configured to transmit the control signals to header positioning system 22 which may control hydraulic actuators, for example to cause movement of the sub-frame 140 and main frame 100 of header 12 towards a desired position relative to propulsion unit 14. While the embodiments herein are described with reference to hydraulic actuators, in some embodiments, other types of actuators such as electrical actuators may be employed to cause movement of the sub-frame 140 along with main frame 100 of header 12.

Header positioning system 22 may have a positioning response time for causing the agricultural implement to respond to the control signals. In cases where the positioning system has a positioning response time that results in excessive movement or "hunting" for the desired position, according to the teachings herein the system 10 may be provided with a signal conditioner 20, which is configured to condition the control signals transmitted by the controller 18 and normally received by header positioning system 22. The conditioner 20 is configured to intercept the control signals transmitted by the controller 18 and to transmit conditioned control signals or output signals to the positioning system 22 instead of the control signals, in response to the control signals transmitted by the controller 18.

Referring back to FIG. 1, system 10 of FIG. 2 may be mounted on apparatus 30. In the embodiment shown, sensor system 16 may include left, and right sensors 32 and 36 located at first and second locations on left and right ends respectively of main frame 100 of header 12.

Figure 3:
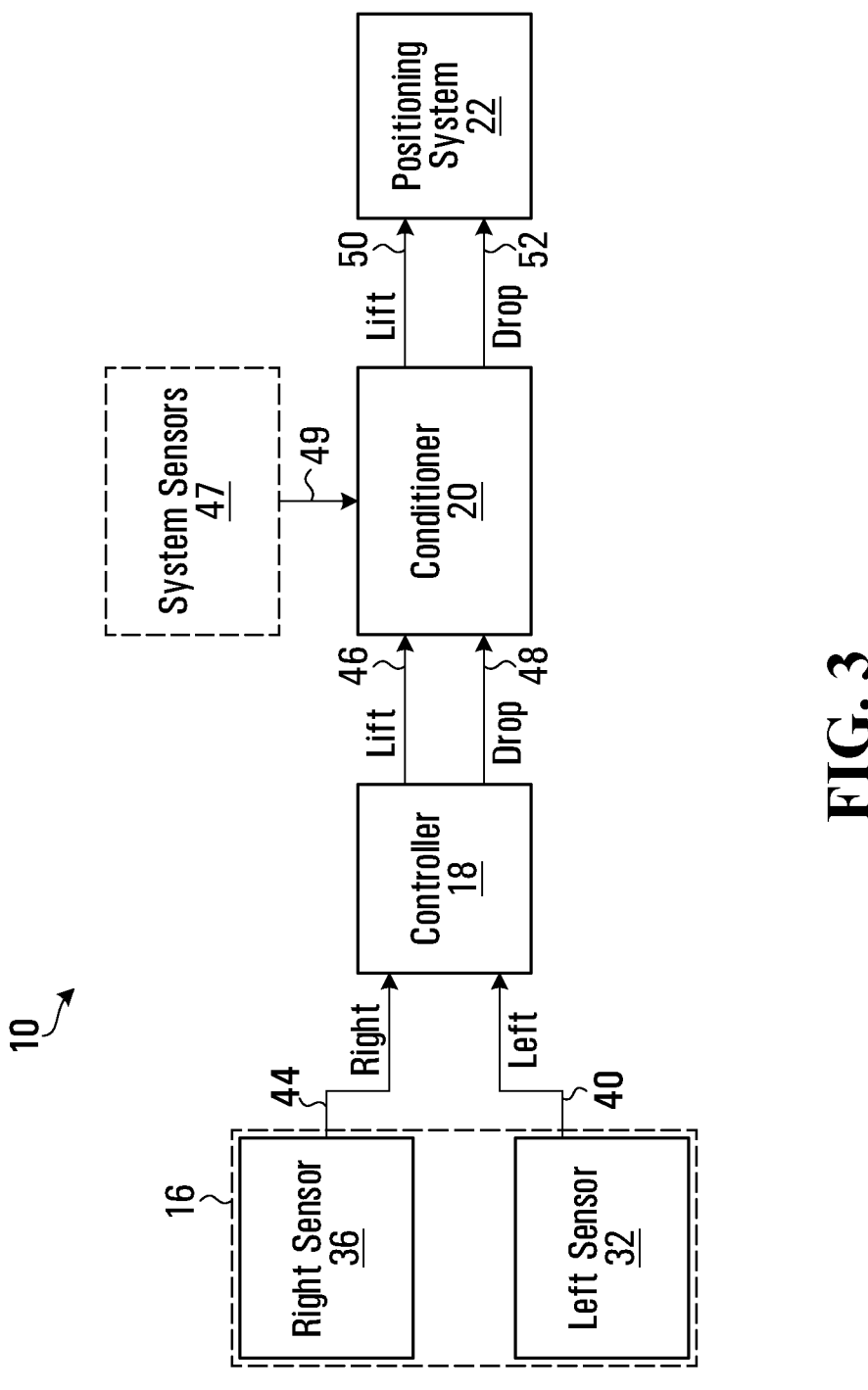
FIG. 3 is a schematic view of the system of FIG. 1 according to one embodiment.

Referring to FIGS. 1 and 3, sensors 32 and 36 may be configured to send left and right position signals 40 and 44 representing left and right sensed positions or heights of respective locations on header 12 (in particular on header main frame 100 relative to sub-frame 140) relative to the ground to the controller 18. In some embodiments, the sensors 32 and 36 may each include a sensing arm or paddle attached to main frame 100 (shown at 33 and 37 in FIG. 1) and a Hall Effect sensor configured to sense a rotational angle of the sensing arm.

In various embodiments the left and right position signals 40 and 44 may be electrical signals which have a voltage level representing a sensed position or height measured by their respective sensor. For example, the voltage level of the left and right position signals 40 and 44 may be between a low voltage level and a high voltage level, with a low voltage level representing 0% of a maximum sensed height and high voltage level representing 100% of the maximum sensed height. For example, in some embodiments, the low voltage level may be about 1 Volt and the high voltage level may be about 4 Volts. However, in various other embodiments, the high and low voltage levels of the left and right position signals 40 and 44 may be other voltage levels.

In the embodiment shown, sensors 32 and 36 have a minimum sensed height of about 0 inches and a maximum sensed height of about 18 inches. However, in various embodiments, sensors 32 and 36 may sense other ranges of heights.

In various embodiments, the sensors 32 and 36 may transmit the left and right position signals 40 and 44 to controller 18 using electrical wires, for example, coupled to a respective one of sensors 32 and 36 at one end and to controller 18 at another end.

Referring still to FIG. 3, in various embodiments, controller 18 may be configured to receive or sample the left and right position signals 40 and 44 representing the left and right sensed heights of the main frame 100 or sub-frame 140 of header 12. In some embodiments, controller 18 may be configured to sample the position signals periodically, such as once every about 320 ms, for example. Controller 18 may be configured to compare each of the left and right sensed heights with desired left and right heights respectively to determine differences between the sensed heights and the desired heights. In some embodiments, the controller 18 may be configured to receive signals representing the desired left and right heights from memory and/or via an I/O interface of the controller 18, for example. The desired heights may be about 2", for example.

Controller 18 may, based on the differences between the sensed heights and the desired heights, produce lift and drop control signals 46 and 48 for causing positioning system 22 to move the sub-frame 140/main frame 100 of header 12 towards the desired heights.

For example, in some embodiments, controller 18 may be configured to determine a left difference between the left sensed height and the left desired height and to determine a right difference between the right sensed height and the right desired height. When at least one of the left and right differences represents a sensed height that is less than a desired height and has an absolute value that is greater than a threshold difference, the controller 18 may produce the lift and drop control signals 46 and 48 such that, if the control signals were transmitted to positioning system 22, the control signals would cause positioning system 22 to cause main frame 100 and sub-frame 140 of header 12 to be raised relative to propulsion unit 14 shown in FIG. 1.

If only one of the left and right differences represents a sensed height that is less than a desired height and has an absolute value that is greater than a threshold difference, the controller 18 may produce the lift and drop control signals 46 and 48 such that there will be both a suitable height adjustment of main frame 100 and sub-frame 140 relative to the ground surface, and a lateral tilt adjustment, by positioning system 22 to achieve a desired main frame height on both the right and left sides.

If neither of the left and right differences represents a sensed height that is less than a desired height and has an absolute value that is greater than the threshold difference and at least one of the left and right differences represents a sensed height that is greater than a desired height and has an absolute value that is greater than a threshold difference, controller 18 may produce the lift and drop control signals 46 and 48 such that, if the control signals were transmitted to positioning system 22, the control signals would cause positioning system 22 to drop (i.e. lower) the main frame 100 and sub-frame 140 of header 12 relative to the propulsion unit 14 shown in FIG. 1. If the left and right differences are both within a threshold range, controller 18 may produce the lift and drop control signals 46 and 48 to cause the positioning system 22 to not change the height of the main frame 100 and sub-frame 140 of header 12 relative to the propulsion unit 14 shown in FIG. 1.

As discussed above, controller 18 may be configurable to transmit the lift and drop control signals 46 and 48 directly to positioning system 22 but, in the embodiment shown in FIG. 3, a conditioner 20 may optionally be provided which is configured to intercept the lift and drop control signals 46 and 48 produced by controller 18 and to produce and transmit conditioned lift and drop control or output signals 50 and 52 to positioning system 22 instead of the control signals. An example of the incorporation of a conditioner 20 into the control system is disclosed in U.S. Pat. No. 10,462,966 issued on Nov. 5, 2019, the entire contents of which is hereby incorporated by reference herein.

FIG. 4 shows a side view of the apparatus 30 without header 12 attached, showing elements of positioning system 22, in accordance with one embodiment. Referring to FIG. 4, positioning system 22 includes feeder house 60 which may be pivotally connected to propulsion unit 14 at pivot point 62. Positioning system 22 may also include a height controlling hydraulic system including a height-controlling hydraulic cylinder 64 connected at one end to the feeder house 60 and at the other end to propulsion unit 14. The height controlling hydraulic system may include a "lift" valve, such as, for example, a solenoid-controlled valve 25 which may be controlled using the conditioned lift output signal 50 and a "drop" valve, such as, for example, a solenoid-controlled valve, which may be controlled using the conditioned drop output signal 52. When the lift valve is opened and the drop valve is closed, the height-controlling hydraulic cylinder 64 extends. Conversely, when the lift valve is closed and the drop valve is opened, the height-controlling hydraulic cylinder 64 retracts.

Header 12 shown in FIG. 1 is mounted to a front portion 66 of the feeder house 60 shown in FIG. 4. Extension of the height-controlling hydraulic cylinder 64 causes the front portion 66 (and thus main frame 100 and sub-frame 140 of header 12 shown in FIG. 1 when attached to the front portion 66) to move upward relative to propulsion unit 14 in the direction of arrow 67. Conversely, retraction of height-controlling hydraulic cylinder 64 may cause front portion 66 (and thus main frame 100 and sub-frame 140 of header 12 shown in FIG. 1 when attached to the front portion 66) to move downward relative to propulsion unit 14 in the direction of arrow 69.

In various embodiments, each time positioning system 22 is instructed to move, there may be a positioning response time before positioning system 22 finishes moving and reaches a generally non-transient or fixed position. In various embodiments, the positioning response time may be due to a variety of factors such as, for example, weight and momentum of feeder house 60 and/or the header 12, time required for valves of the height-controlling hydraulic cylinder 64 to open and/or close after being commanded to do so, and/or float in the height-controlling hydraulic cylinder.

Lateral Tilt

Header 12 as shown in FIG. 1 is mounted to a front portion 66 of the feeder house 60 in a manner which allows for tilting together of header main frame 100, adapter plate 142, header sub-frame 140 and feeder house 60, relative to propulsion unit 14. Header 12 may thus be laterally tilted relative to propulsion unit 14 when there is a difference in the side to side slope of the ground surface beneath the header, compared to the side to side slope of the ground surface beneath the propulsion unit and the corresponding slope of the propulsion unit 14 itself. Two or more transversely spaced hydraulic cylinders may be provided such that different amounts of extension/retraction of the height-controlling hydraulic cylinder 64 can cause header 12 to tilt transversely about a forwardly directed rotational axis.

Referring back to FIG. 4, header positioning system 22 may include one or more tilt hydraulic cylinders for controlling a lateral tilt of header 12. Extension of the tilt hydraulic cylinder(s) may cause the front portion 66 of the feeder house 60 shown in FIG. 4 to tilt laterally from left to right (i.e., to rotate the front portion 66 about a pivot point of the front portion by raising a left side of the front portion 66 and lowering a right side of the front portion).

In some embodiments, controller 18 may be configured to produce tilt control signals in addition to the signals already described, based on the received left and right position signals 40 and 44. The tilt control signals may be configured to control the tilt hydraulic cylinder and thus cause positioning system 22 to control a lateral tilt of main frame 100 and sub-frame 140 of header 12.

In some embodiments, controller 18 may be configured to cause the tilt control signals to direct positioning system 22 to tilt sub-frame 140 and mainframe of header 12 together such that the heights of the left and right sensors 32 and 36 are equal. In some embodiments, controller 18 may be configured to transmit the tilt control signals directly to positioning system 22. In some embodiments, controller 18 may transmit the tilt control signals to conditioner 20, and conditioner 20 may relay the tilt control signals to the positioning system 22. In some embodiments, the conditioner 20 may condition the tilt control signals generally as described above having regard to the lift and drop control signals 46 and 48 shown in FIG. 3.

Header Suspension

Figure 5B:
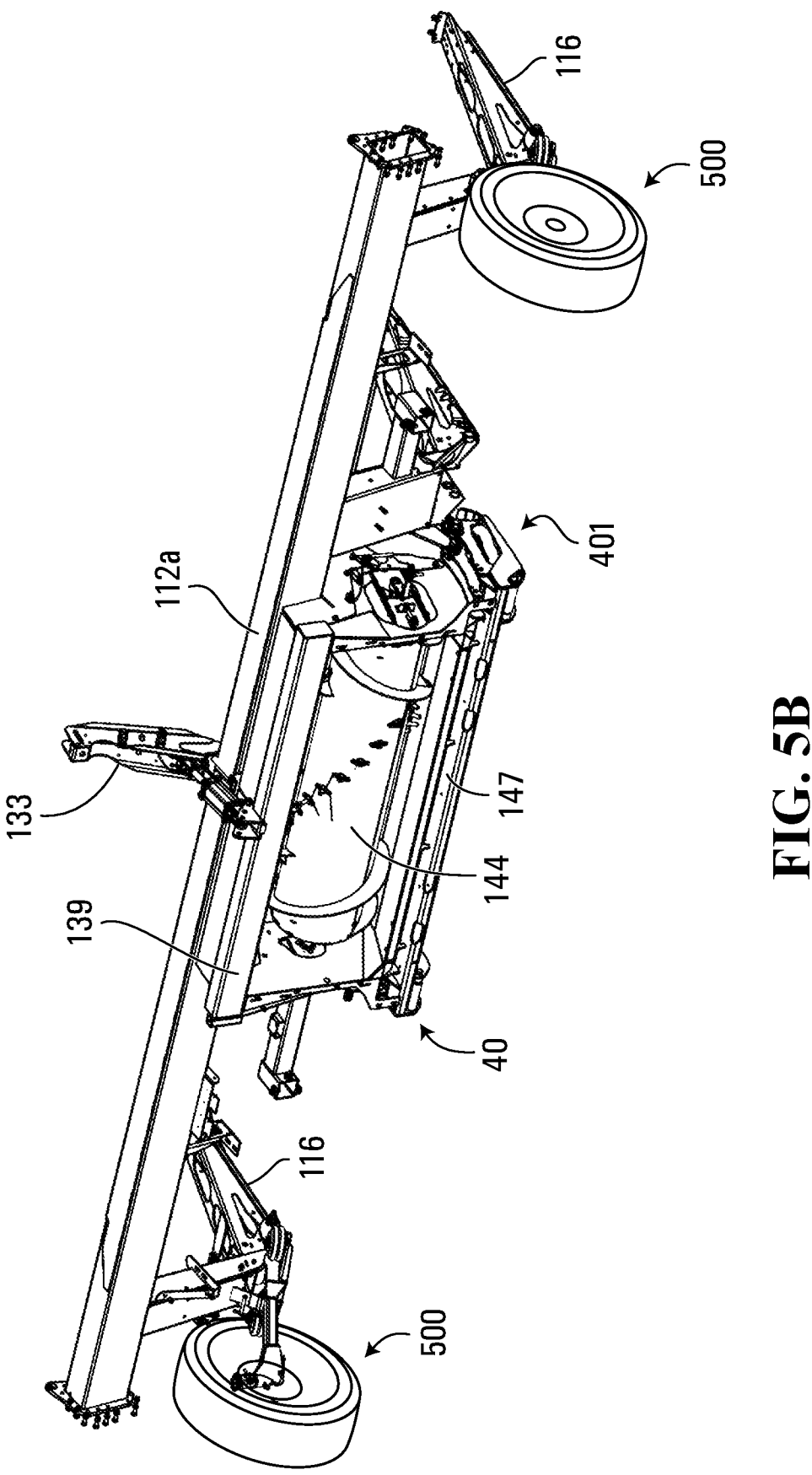
FIG. 5B is a rear side perspective view of some components of the agricultural implement of the agricultural apparatus of FIG. 1.

Agricultural apparatus 30 may also include a header suspension system generally designated 401 (FIGS. 5B and 5C) to provide for shock/force absorption between header main frame 100 of header 12 and the front portion 66 of feeder house 60. Header suspension system 401 may be an air suspension system that may include components that are also part of pneumatic system 901. Pneumatic system 901 may transmit pressurized air through hoses and valves of pneumatic system 901, to and from a plurality of frame gas suspension air bags—which may be a plurality of frame air suspension air bags 457—positioned operationally between header main frame 100 and header sub-frame 142, as described further hereinafter. Pneumatic system 901 may be operable to allow the air pressure in the header air suspension bags 457 to be selectively maintained at a specified air pressure, and also for the air pressure in the header air suspension bags to be selectively increased and decreased. Such a header suspension system 401 may support main frame 100 on sub-frame 140 and absorb forces transmitted between (a) the main frame 100 and cutter bar 122 of header 12, and (b) propulsion unit 14, such as when the cutter bar 122 impacts/encounters a rising portion of ground surface while moving across the ground surface.

With reference now to FIGS. 5B, 5C, 7A and 7B, an interconnection between header main frame 100 and sub-frame 140, which includes such header suspension system 401, is shown in more detail.

Figure 5C:
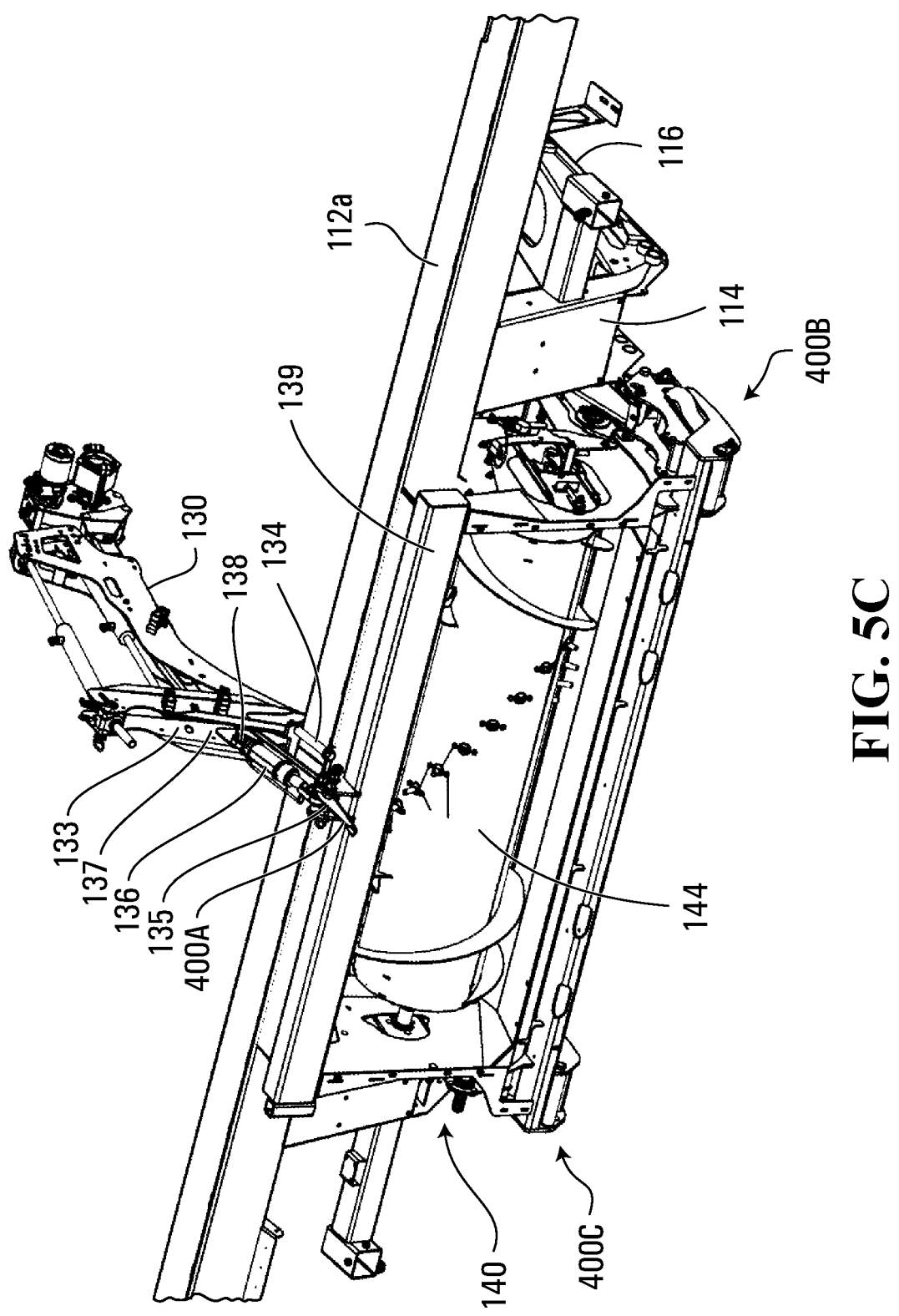
FIG. 5C is an enlarged rear side perspective view of some of components of the agricultural implement shown in FIG. 5C.
Figure 5D:
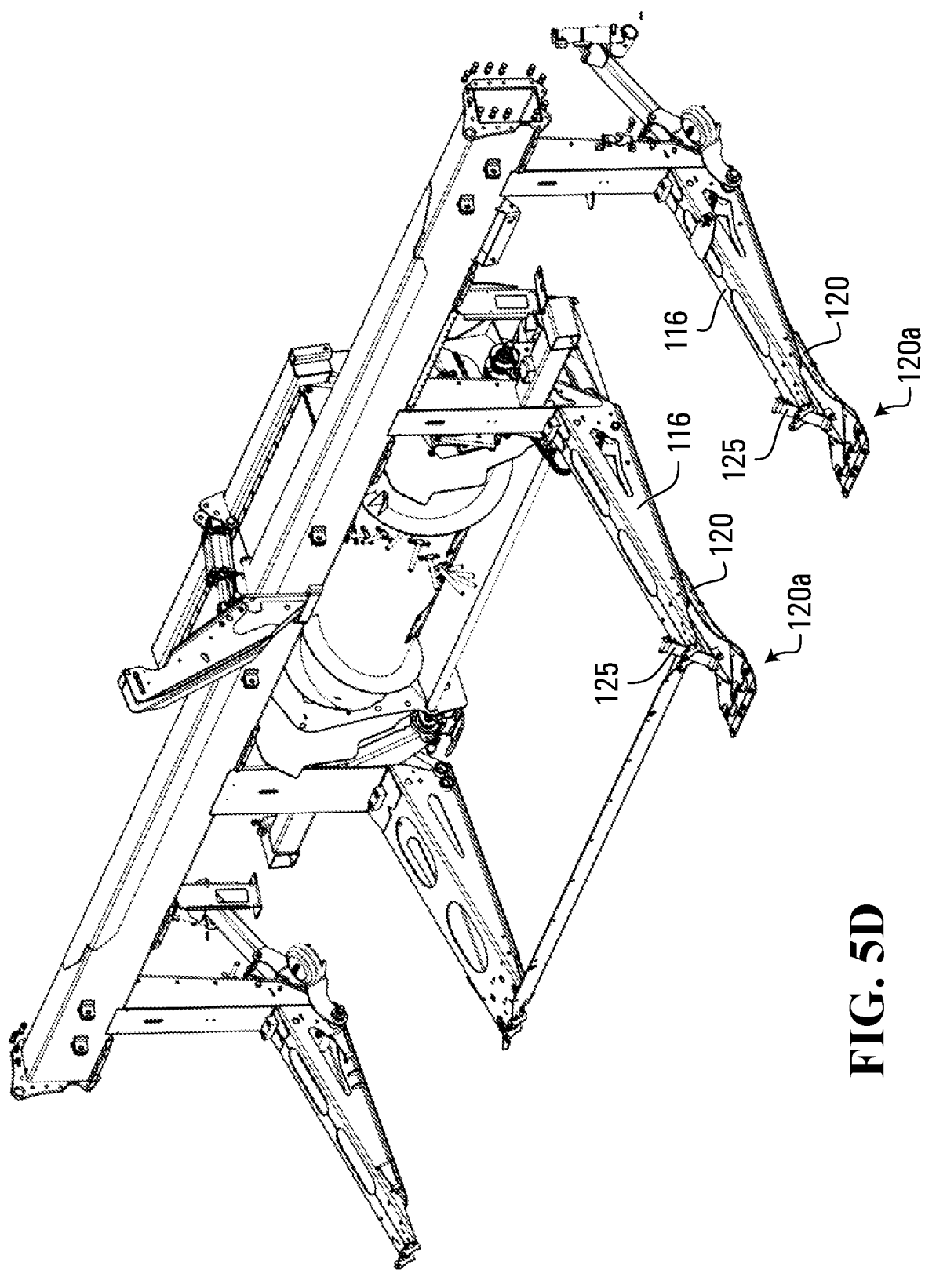
FIG. 5D is another front side perspective view of some components of the agricultural implement of the agricultural apparatus of FIG. 1.

A center reel arm tower 133, that includes center reel arm 130, may be fixedly connected to transverse support beam 112 of header main frame 100 with a reel arm mounting assembly 134 (FIG. 5C). A sub-frame mounting bracket 135 may be formed on an upward facing surface of a sub-frame transverse top beam member 139 of sub-frame 140. Sub-frame mounting bracket 135 may pivotally connect to a bottom end of a hydraulic cylinder 136. The top end of hydraulic cylinder 136 may be connected to a plate member 137 of center reel arm tower 133 with a spherical bearing connection 138 that accommodates the lateral pivoting/tilting of the header frame 100 relative to sub-frame 142. Hydraulic cylinder 136 may be connected to a header hydraulic fluid system (not shown). Hydraulic cylinder 136 may be configured and operable to be able to enable main frame 100 to be tilted forwards/backward (fore/aft) relative to sub-frame 140. Main frame 100 may pivot forward and backwards about transverse axis X4 on opposed laterally spaced frame connection pivots 456 (FIG. 7B), when hydraulic cylinder 136 is operated (such as by an operator or controller). This enables header 12, for example when operating in rigid mode, to have the forward/backward angle of the cutting knives on cutter bar 122 relative to the ground surface adjusted. It may be desirable to adjust the fore/aft angle of the cutting knives dependent for example on the header height and what type of crop is being harvested in a particular situation.

Figure 7A:
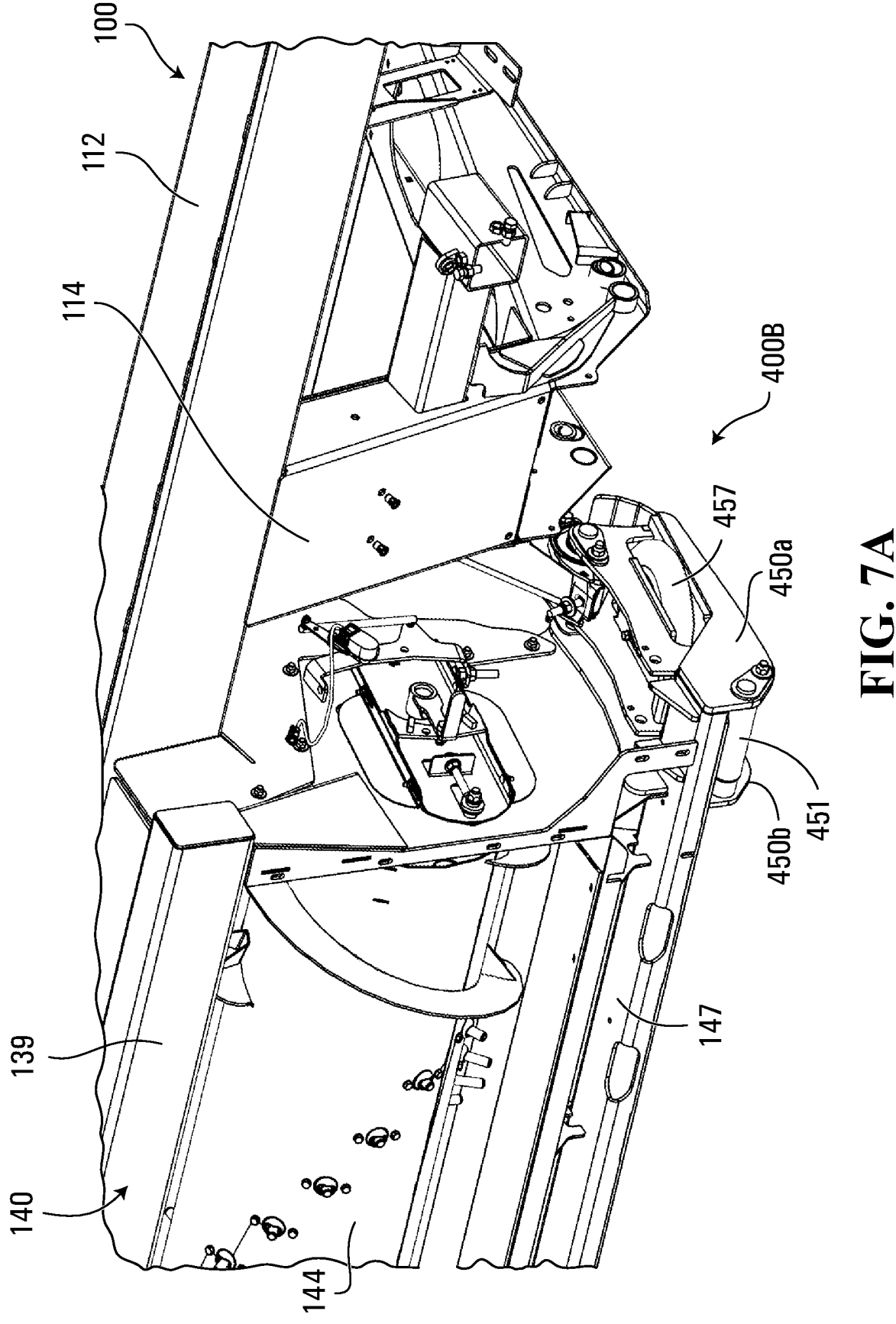
FIG. 7A is an enlarged rear perspective view of some other components of the agricultural implement of the agricultural apparatus of FIG. 1.
Figure 7B:
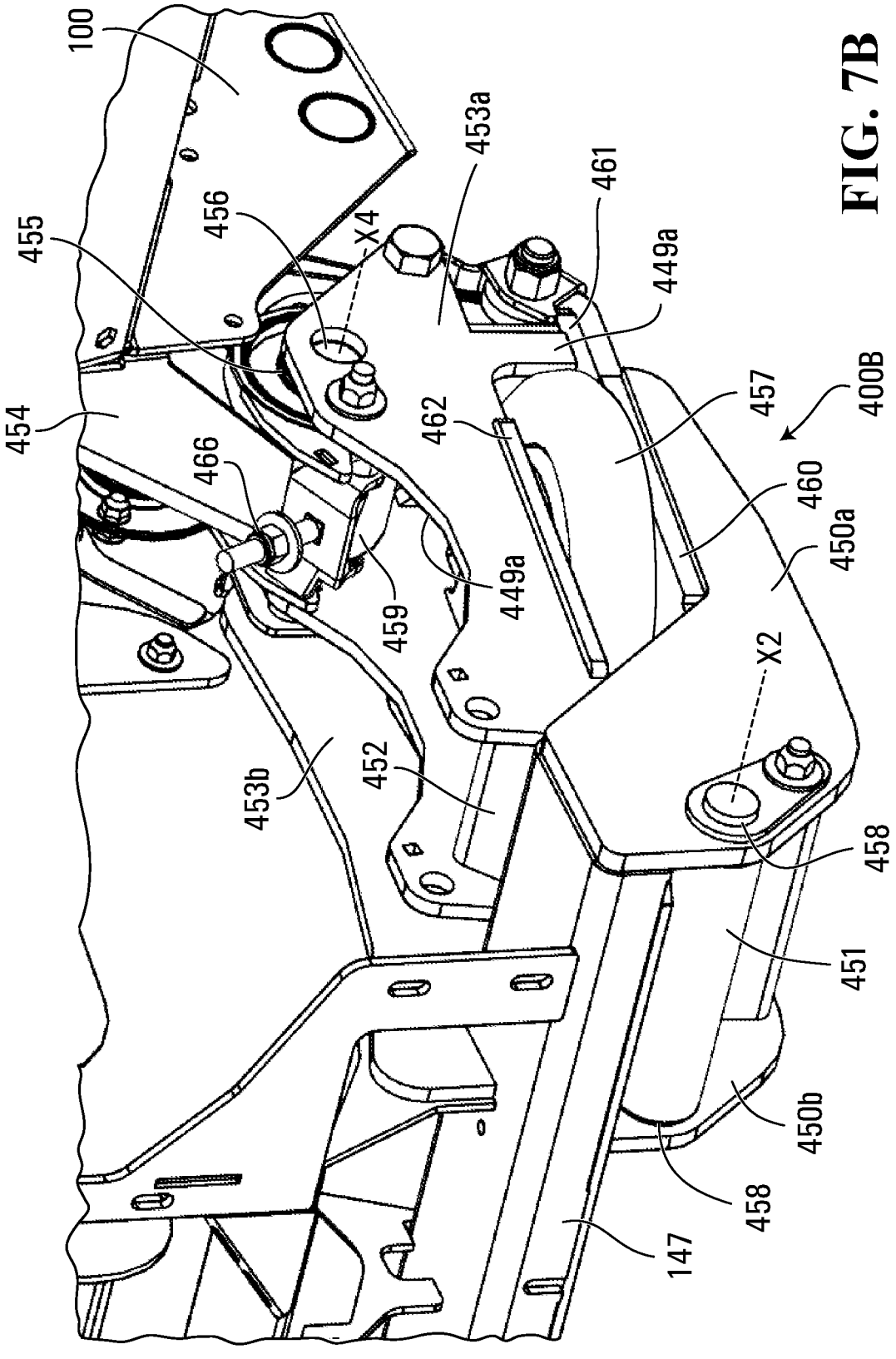
FIG. 7B is an enlarged rear perspective view of some components shown in FIG. 7A.

With respect to the main frame/sub-frame suspension connection, a spherical bearing 138 may provide the upper pivot connection 400A of a generally triangular shaped, 3-point pivotal connection that allows for lateral tilting to the right and left sides, between main header frame 100 and sub-frame 142. The other two right and left side lower connections 400B and 400C of the 3-point pivotal suspension connection between main header frame 100 and sub-frame 142 are also illustrated in FIGS. 5C, 7A and 7B. The associated arrangements of the components of header main frame 100 and sub-frame 140 for each for the lower right-side connection 400B and lower left-side connection 400C may be constructed in the same manner, and so only lower right-side connection 400B is depicted and described herein in detail.

Figure 7C:
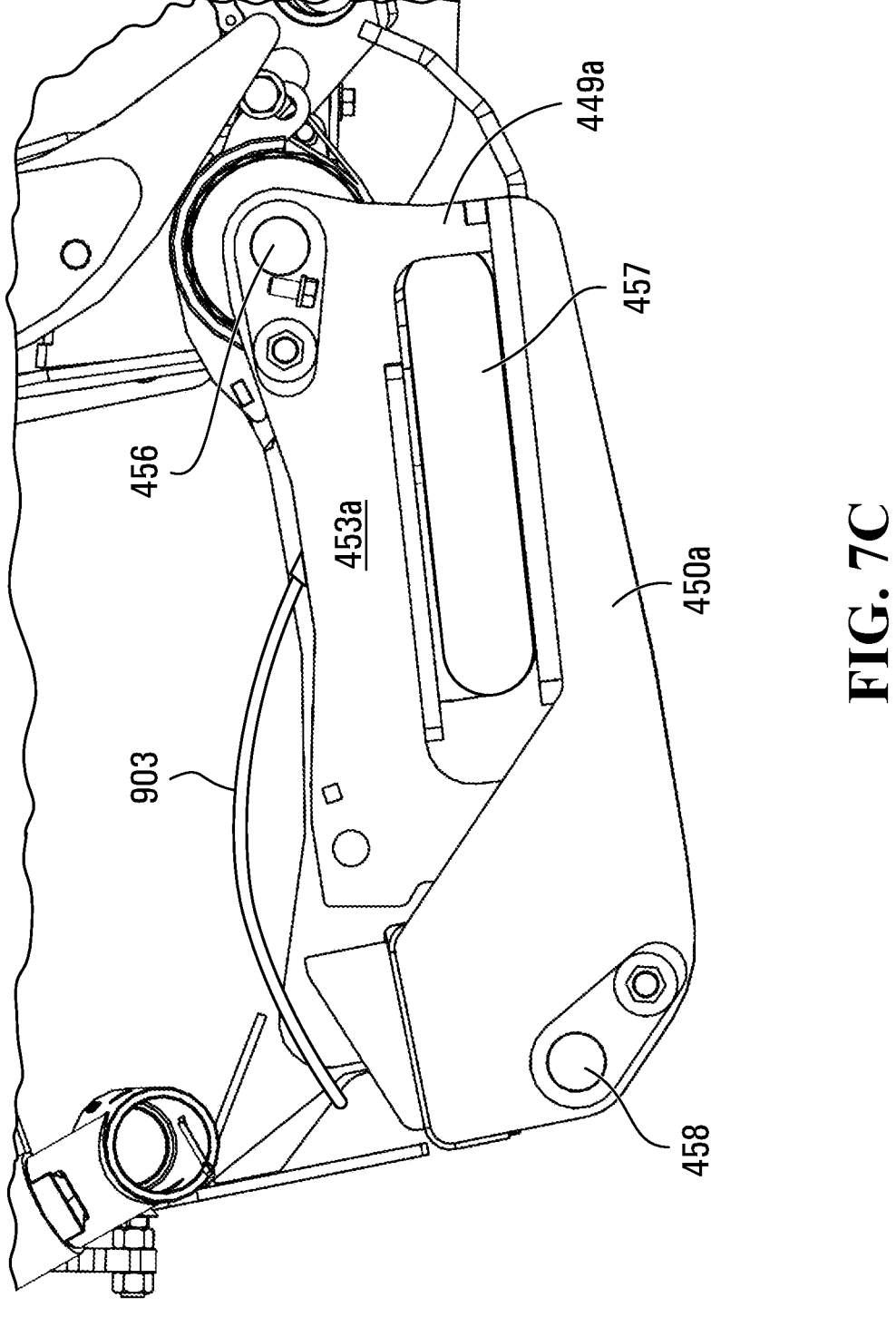
FIG. 7C is an enlarged side elevation view of some components shown in FIG. 7B.

With particular reference to FIGS. 7A, 7B and 7C, as part of sub-frame 140, a sub-frame transverse lower beam member 147 extends transversely generally parallel to, and is vertically spaced from, sub-frame top beam member 139. With reference to right side connection 400B, at a right region of lower beam member 147, are located a pair of transversely spaced, generally parallel oriented in relation to each other, and forwardly directed, lower air bag support members 450a, 450b. Lower air bag support members 450a, 450b may form part of an integral weldment with sub-frame 140's upper, lower and side structural members (including upper transverse beam member 139 and lower transverse beam member 147) and may be formed from the same suitably strong material. Extending between rearwardly located inward facing surface areas of lower air bag support members 450a, 450b is a header suspension pivot pin 451 that is operable to rotate within pin mount openings 458. Fixedly attached to header suspension pivot pin 451 and operable for rotation with header suspension pivot pin 451 is a pivot arm 452. A pair of transversely spaced, forwardly oriented, pivot arm side plates 453a, 453b are fixedly attached to opposed side edges of pivot arm 452. Extending downwardly, each of pivot arm side plates 453a, 453b has a respective pivot arm side plate bottom stop (only right side top 449a is shown in Figures). Extending transversely and forwardly between and fixedly attached to transversely spaced pivot arm side plates 453a, 453b is an upper base plate 462.

At a forward end region, extending between forward end surface areas of transversely spaced pivot arm side plates 453a, 453b is a lift horn cylinder 459 that holds therein a transversely oriented cylindrical rubber bushing 455. A pivot bushing mounting clamp 466 (FIG. 7B) may be provided to assist in mounting the rubber bushing on lift horn cylinder 459. Within rubber bushing 455 is a transversely oriented header frame connection pivot pin 456 which extends through rubber bushing 455 between openings in spaced pivot arm side plates 453a, 453b. Extending upwards and forward from lift horn cylinder 459 is a lift horn member 454 which is fixedly connected such as by welding at an upper end thereof, to inboard vertical struts 114 of header main frame 100.

One frame air suspension bag 457 (or in other embodiments a plurality of frame air suspension bags 457) may be operationally located between the main header frame 100 and sub-frame 140, on each side of axis Y1 (FIG. 5A) of header frame 12.

In general, each of frame air suspension bags 457 may have an internal air volume that is generally larger than the volume of the cutter bar float air bags 124 (and of gauge wheel air bags 557 described below) when subjected to the same internal air pressure (eg. 100 psi). For example, each frame air suspension bags 457 may have an internal air volume that is about two to three times as large as the volume of the cutter bar float air bags 124 (and two to three times as large as the volume of each of the gauge wheel air bags 557 described below) when subjected to the same internal air pressure (eg. 100 psi).

It should be noted that in some embodiments, the combined internal volume of the one or more gauge wheel bags 557 is greater than the internal volume of the one or more frame air suspension bags 457 on each side, when subjected to the same internal air pressure. In other embodiments, it may be desirable to provide for a significantly greater combined internal volume of the one or more gauge wheel bags 557 than the internal volume of the frame air suspension bag(s) 457, when subjected to the same internal pressure. Providing a greater internal volume of air for the gauge wheel bag(s) 557 may provide for a more aggressive/active response of the frame air suspension bags 457 and the lift/tilt force imparted on main frame 100.

Frame air suspension bag(s) 457 may be located between the bottom facing surface of upper base plate 462 on an upper side, and the top facing surface of a lower air bag support member 460 that extends forwardly and laterally between laterally spaced lower air bag support members 450a, 450b, on a lower side.

Each frame air suspension bag 457 may have an upper integral rigid plate portion that may be fixedly secured to a respective plate member 462 with a bolt mechanism (not shown) and may be held in lateral position relative to plate member 462 with guide bolts passing through an opening in plate member 462. Bolt holes in the plate portion of the frame air suspension bag 457 can be appropriately sealed in a known manner from the inner pressurized air cavity of the bag (eg. blind mounting nuts/bolt holes). The rigid upper plate portion may also provide for an air inlet/outlet which can be pneumatically connected to a pneumatic/air hose 903 for the communication of pressurized air.

Each frame air suspension bag 457 may be made of a generally tubular side wall made of a resiliently expandable material such as a rubber. The sidewall material may be permanently bonded to/crimped with metal generally cylindrical, flat end plates at opposite ends. Each frame air suspension bag 457 may be sized, configured and positioned to be able to exert appropriate forces/pressures on the surface of upper base plate 462 and lower air bag support member 460 when the interior cavity of the frame air suspension bag 457 is pressurized by pneumatic system 901. An example of a known type of air bag that might be employed as a frame air suspension bag 457 is the model FS 200-10 CI Single Convolution Air Actuator made by ContiTech AG and/or one of its affiliated companies or a comparable AIRSTROKE™ actuator made by Firestone Industrial Products, LLC. Such an air suspension bag may have upper and lower plates with a diameter of about 6.34 inches and the interior of the bag may have operating internal volumes of between about 86 cubic inches to 160 cubic inches over operating pressures of between about 30/40 psi and 120 psi.

Figure 6A:
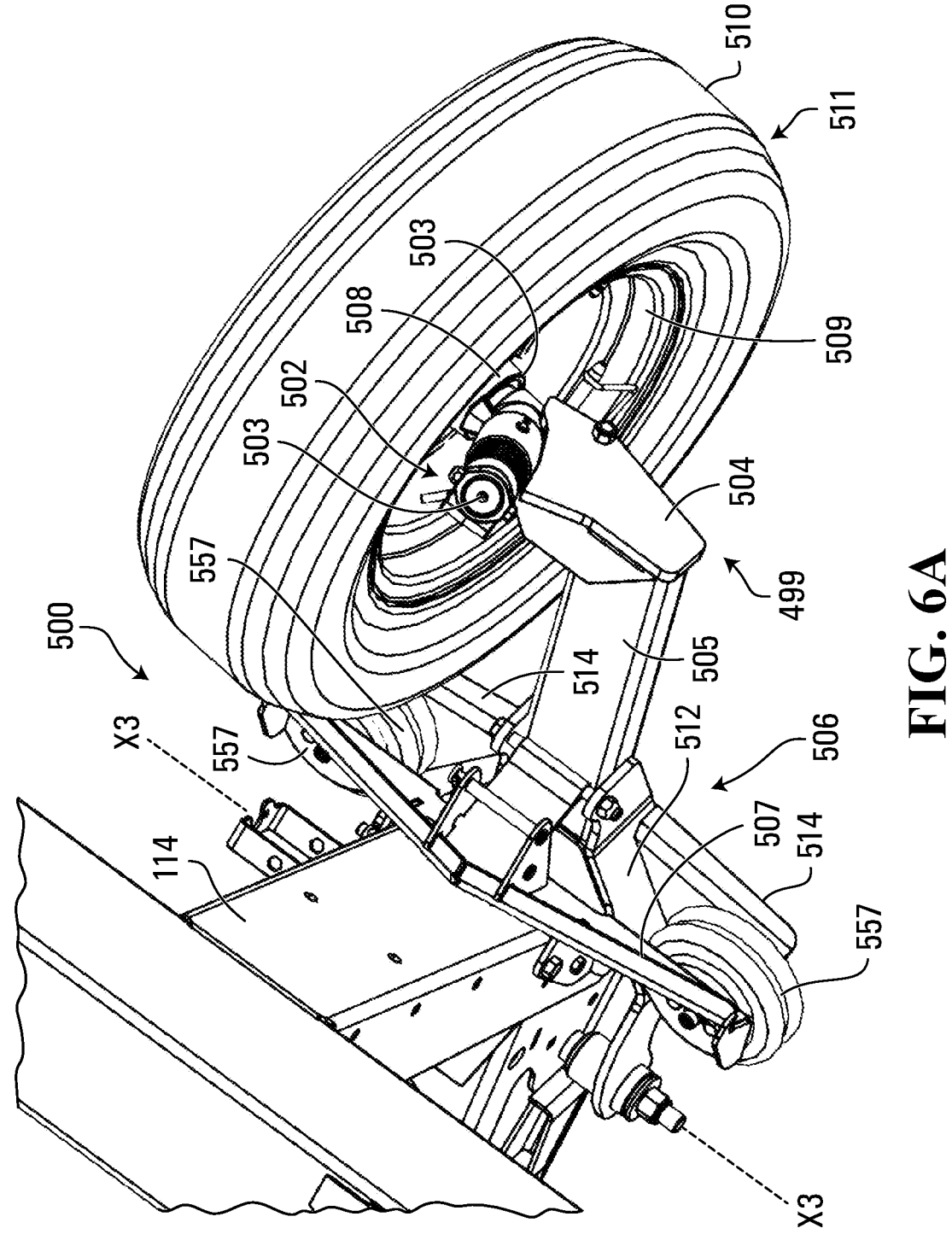
FIG. 6A is an enlarged rear perspective view of some components of the agricultural implement of the agricultural apparatus of FIG. 1.

Each frame air suspension bag 457 may, through a plurality of hoses and valves, be in pneumatic communication with, and be a part of, pneumatic system 901. Each frame air suspension bag 457 may, like cutter bar float air bags 124, and gauge wheel air bags 557 (FIG. 6A) also be inflated and deflated through an air hose 903 (eg. FIG. 7C) by pneumatic system 901 over a range of air pressures such as for example between 30 psi and 100 psi. Frame air suspension bags 457 may be sized, configured and positioned to be able to exert appropriate forces/pressures on the bottom facing surfaces of pivot arm side plates 453a, 453b and upperbase plate 462 on one side, and the top facing surface of a lower air bag support member 460, when the interior cavity of the frame air suspension bag 457 is pressurized by pneumatic system 901.

The level of the air pressure within frame air suspension bags 457 can be varied, including by operation of pneumatic system 901. This can influence how much, if any, of the weight of the main frame 100 and cutter bar 122 is transferred between main frame 100 and sub-frame 140 and the manner in which such weight is transferred. In some modes of operation (eg. rigid mode), main frame 100 (and components supported thereon) may be spring supported on sub-frame 140 and on gauge wheel/stabilizer apparatuses 500; in other modes (eg. flex mode) there may be near zero spring action/support in the connection between the main frame 100 and sub-frame 140, and the gauge wheel apparatuses may also provide little or no support of the main frame 100 and components supported thereon during normal operation on level ground.

The level of air pressure within frame air suspension bags 457 can also influence how much of, and whether, and the manner in which, any other forces (beyond the weight of the main frame and its components) are transmitted between main frame 100 and subframe 140 on the right and left sides of the header 12, including through the frame air suspension bags 457.

If both right side and left side frame air suspension bags 457 are both inflated to a relatively high air pressure by pneumatic system 901 (eg. an air pressure such as 100 psi) then frame air suspension bags 457 will have expanded, and on both the right and left side of the header, pivot arm side plates 453a, 453b, upper base plate 462 along with lift horn member 454 will be forced to pivot about axis X2 (FIG. 7B) relative to lower air bag support members 450a, 450b of sub-frame 140. The movement upwards of lift horn members 454 on both the left side and the right side of header 12 will then result in the upwards movement of header main frame 100 and cutter bar 122 on the right and left sides of the header relative to sub-frame 140. The air pressure level in each of the right and left side frame air suspension bags 457 will typically increase to the same increased level.

The overall weight of header main frame 100 (and of the components that may be supported thereon such as the draper decks and cutter bar) may be substantially evenly distributed in a transverse side-to-side direction across main frame 100, such that the positioning of main frame 100 on sub-frame 140 does not, if not subjected to any forces beyond gravity result in an imbalance of the forces/moments. However, the mounting arrangements of the frame air suspension bags 457 between sub-frame 140 and main frame 100 may allow for some lateral and/or forward and backwards, adjustments of the position of frame air suspension bags in order to accommodate left/right side load imbalances. This may allow for a uniform pneumatic system pressure to still be employed in pneumatic system 901 between all the right side and left side air bags, while accommodating some level of imbalanced weight loading on the one lateral side of the header compared to the other lateral side.

The pressure in the right and left frame air suspension bags 457 may both be set by pneumatic system 901 to a high level (eg. 100 psi) at the same time as the cutter bar float air bags are also set to the same high air pressure (eg. 100 psi) so that cutter bar 122 is in rigid mode as referenced above and is generally laterally level (i.e., no lateral tilt) relative to the propulsion unit 14 and the ground surface. In the rigid mode of cutter bar 122 (and of header 12), and with the cutter bar 122 set for a cutting height above the ground surface level, the frame air suspension bag(s) 457 on both sides of center axis Y1 (FIG. 5A), and the sub-frame 140 beneath, will typically be carrying a large portion of the weight of the header main frame 100 and cutter bar 122 and other components supported on main frame 100. In rigid mode of cutter bar 122, each air frame suspension bag 457 may be sufficiently expanded such that main frame 100 behaves like it is sprung loaded on sub-frame 140 (and on stabilizer apparatuses 500 as referenced below).

Main frame 100 may in rigid mode of cutter bar 122 and header 12, be positioned relative to sub-frame 140 near to, but slightly above, the bottom/lowermost position of its range of upward/downward movement. The result can be that main frame 100 rests and is supported "lightly" on sub-frame 140 such that a relatively small additional upward force is required to lift the main frame 100 upwards (eg. about 50 lbs upwards force at either end of main frame 100 can cause a main frame of 40 ft in width, to be lifted upward relative to sub-frame 140). This is because, frame air suspension bags 457 have the capability to further expand and during further expansion of the frame air suspension bags 457 during upward movement of frame 100 relative to sub-frame 140, frame air suspension bags can continue to provide a significant upward force that is only a relatively small amount less than the downward weight of main frame 100 and the header components supported thereon. Thus, a relatively small additional upward force is required to start upward movement of main frame 100 relative to sub-frame 140.

Each frame air suspension bag 457 can be configured such that each frame air suspension bag 457 is not fully expanded when the pressure in the right and left frame air suspension bags 457 have both been set by pneumatic system 901 to a high level (eg. 100 psi). Then, any further increase in pressure delivered to either of right or left side frame air suspension bag 457 will allow and may result in upward movement of pivot arm side plates 453a, 453b and upper base plate 462 along with lift horn member 454, which will raise that particular side of header main frame 100 and cutter bar 122 (i.e. it will tilt upwards on the that side of header 12)

relative to sub-frame 140, as main frame 100 pivots about upper pivot connection 400A of the three-point connection.

If there is an increase in air pressure of frame air suspension bags 457 beyond the high level set by pneumatic system 901, with the same level of increase on both the right and left side of the header, this will allow and may result in further upward movement of pivot arm side plates 453a, 453b and upper base plate 462 along with lift horn member 454, on both sides, and which in both sides of header main frame 100 and cutter bar 122 being raised further but with main frame 100 remaining level (i.e. no lateral side tilting of the header).

If the pressure in the right and left frame air suspension bags 457 is, as described above, set by pneumatic system 901 to a high level (eg. 100 psi) at the same time as the cutter bar float air bags are also set to the same high air pressure (eg. 100 psi) so that cutter bar 122 is in rigid mode as referenced above, then if a significant downward force acts on main frame 100 and cutter bar 122 beyond their weight (eg. as a consequence of a limited time, abrupt downward movement in elevation of propulsion unit 14 that is transmitted to main frame 100 through sub-frame 140), then any additional downward forces acting on main frame 100 and cutter bar 122 can be cushioned/absorbed/dampened by frame air suspension bags 457 when transmitting the downward acting forces back to sub-frame 140.

If the pressure in the right and left frame air suspension bags 457 is, as described above, set by pneumatic system 901 to a high level (eg. 100 psi) at the same time as the cutter bar float air bags 124 are also set to the same high air pressure (eg. 100 psi) so that cutter bar 122 is in rigid mode as referenced above, and with main frame 100 resting at the lower end of its range of movement relative to sub-frame 140, then if a significant upward force that acts upwardly on one transverse side of main frame 100 and cutter bar 122 (eg. due to an increase in the level of the ground surface that results in contact between one side of cutter bar 12 and the ground surface), then a delivery of more pressurized air to maintain, or possibly increase the air pressure in frame air suspension bag(s) 457 on that side, in order to be able to transmit an additional upward acting force on pivot arm side plates 453a, 453b, upper base plate 462 along with lift horn member 454 to force them to pivot about axis X2 relative to lower air bag support members 450a, 450b of sub-frame 140. If this additional pressurized air can be delivered to frame air suspension bags 457, then the movement upwards of lift horn members 454 on the one side of header 12 will result in an upwards lifting force on header main frame 100 and cutter bar 122 on that side of the header relative to sub-frame 140, resulting in an assistance lifting force being delivered by frame air suspension bag 457 on that side of the header to assist in achieving the upward tilt of the main frame 100 and other components of header 12 attached to the main frame, such as cutter bar 122 and draper decks 118a-118c. It will be appreciated that the opposite force generated by the increase in pressurized air to a frame air suspension bag 457, may be transferred through sub-frame 140 and onto propulsion unit 14, and then transferred to the ground surface.

In the present embodiment, the delivery of additional pressurized air to the frame air suspension bag 457 on a side of the header, can be facilitated by delivering pressurized air from a stabilizer apparatus on that side of the header 12. Increasing the air pressure in the frame air suspension bag 457 on one side relative to the other side frame air suspension bag 457 on the opposite transverse side, can be accomplished by functionally linking components of a stabilizer apparatus 500 on one side to the frame air suspension bags

457 on the same side of header 12, as described below and at the same time also pneumatically isolating the right side pair of frame air suspension bag 457 and gauge wheel air bag 557 (FIG. 6A), from the left side frame air suspension bag 457, gauge wheel air bag 557, from the cutter bar float air bags 124, and also from any other components of pneumatic system 900 such as compressor 905 and working air storage tank 902. This isolation of the right side pair of frame air suspension bag 457a and right gauge wheel air bags 557 from the left side frame air suspension bags 457, gauge wheel air bags 557, and from other components in pneumatic system 901 ensures that any increase in pressure in right gauge wheel bags 557a will be efficiently and effectively communicated to the right side frame air suspension bag(s) 457. The same is true on the left side. This isolation of the left side pair of frame air suspension bag 457b and gauge wheel air bag 557b from the right side frame air suspension bag 457a, right gauge wheel air bag 557a, and from other components in pneumatic system 901 ensures that any increase in pressure in left gauge wheel bags 557b will be efficiently and effectively communicated to the left side frame air suspension bag(s) 457b.

As noted above, if the pressure in each of the cutter bar float air bags 124 is lowered (eg. to 30 psi) this results in cutter bar 122 operating in "flex" mode transversely across its width. If each of the frame suspension air bags 457 is also inflated to a specified lower pressure level (eg. the same pressure of cutter bar float air bags 124, such as 30 psi) then the frame air suspension bags 457 may provide little or no suspension effect between main frame 100 and sub-frame 140. In such a flex mode of operation each pivot arm side plates 453a, 453b may have its respective pivot arm side plate bottom stop 449a, (with the opposite side bottom stop not shown) in the fully downward portion in which its respective pivot arm side plate bottom stop 449a rests directly upon a stop block 461 which is fixedly attached at forward end on an upper surface of lower air bag support member 460. It should be also noted that in this flex mode, stabilizer apparatuses 500 (as described below) provide little if any assistance in supporting header 12 on the ground surface. However, even at such a lower internal air pressure, frame air suspension bags 457 may provide some level of vibration dampening to stabilize main frame 100 on sub-frame 140 when subject to relatively small vibrational oscillations.

Stabilizer Apparatus

Turning now to FIGS. 5A, 5B, 6A and 6B, as referenced above, header 12 may be equipped with at least one stabilizer apparatus 500, and possibly multiple stabilizer apparatuses 500, on each transverse side of the center line Y1 of the header (FIG. 5A). Each stabilizer apparatus 500 on each side can assist in carrying some of the forces acting on header 12, including at least some of the weight of main frame 100 and the components supported therein including cutter bar 122 and draper decks 118a-118c, during at least some modes of operation, such as when cutter bar 122 is in rigid mode as described above. Each stabilizer apparatus will typically be in contact with the ground surface below, and provide support against downward acting forces, at least when the cutter bar 122, and header 12, is in rigid mode. A stabilizer apparatus 500 can also assist in "lifting" a side of main frame 100 when a stabilizer apparatus on a side, encounters a rise in the level of the terrain as header 12 moves over the ground surface, at least when the cutter bar 122 and header 12 are in rigid mode. Each stabilizer apparatus 500 may, at least in some modes of operation (eg. a rigid mode), carry at least part of the weight of header 12.

One or more stabilizer apparatuses 500 may be positioned on each side of header 12, transversely spaced from the sub-frame 140 and the frame suspension bag(s) 457 on each respective side. In some embodiments, where there are single stabilizer apparatuses 500 on each lateral side of the main frame, these stabilizer apparatuses 500 may be positioned in the range of about 30% to 75% (such as about 50%) of the distance from the centerline Y1 of frame 140 to the end of main frame 100. For example, for headers in the range of about 40 to 45 ft in total width, the stabilizer apparatuses on each side may be located about 15 ft from the center line. For headers of a total width of less than 40 ft each stabilizer apparatus may be located only about 10 ft from the center line on each of the left and right sides. It may be appreciated that since each stabilizer apparatus may be mounted to a vertical strut 114, the selection of the precise transverse locations of stabilizer apparatuses 500 may be limited to where such vertical struts 114 are transversely located on the main frame 100. It may also be desirable for structural stability, that the stabilizer apparatuses 500 be attached to central support beam component 112*a* of main transverse support beam 112 and not to right and left side support beam extensions 112*b*, 112*c* which are bolted to attached to central support beam component 112*a*.

Each stabilizer apparatus 500 may be connected to one or more structural members of header main frame 100 such as vertical struts 114. Each stabilizer apparatus 500 may comprise a pressurized stabilizer gas actuator device, such as an expandable gas bag actuator (eg. a gauge wheel air bag 557 as described below). Such a pressurized gas actuator device may be configured and operable to provide a spring like force resistance and response to an upwardly directed force applied to a component of the stabilizer apparatus 500 that is in contact support with the ground. Such a pressurized gas actuator may also be operable to isolate and/or dampen vibrations from being transferred between the main frame 100 and the component of stabilizer apparatus 500 that is in contact support with the ground. Such a pressurized gas actuator device has the benefit of being able to provide for a varying spring rate, which is dependent upon the gas pressure within the gas actuator device. In general, the greater the internal gas pressure within the air actuator, the greater the spring rate, the stiffer the spring action and the greater the initial resistance force. This capability is extremely useful to assist in addressing varying operating modes, conditions and situations for agricultural apparatus 30. In some embodiments, the pressurized gas actuator device may be a stand-alone device which is not in pneumatic communication with any other components of pneumatic system 901. In some embodiments, the pressurized gas actuator device may be an air bag actuator. In other embodiments, the pressurized gas actuator may be a metal pneumatic cylinder with a piston rod that may be actuated by pressure applied by the ground surface onto a component of the stabilizer apparatus. In some embodiments, the pressurized gas actuator device may be only in pneumatic communication with other components of pneumatic system 901 that enable to the internal pressure within gas actuator device to be set various different levels, depending upon the actual operating conditions/modes.

Each stabilizer apparatus 500 may be configured and operable to absorb shock loads imparted onto the stabilizer apparatus 500 when for example, the stabilizer apparatus encounters a change in the height of the ground surface beneath it, as the propulsion unit 14 moves header 12 across a field.

Each stabilizer apparatus 500 may also be configured and operable to provide assistance to the functioning of header suspension system 401 by placing components of stabilizer apparatus 500 (eg. a pressurized gas actuator) in pneumatic communication with the header pressurized gas actuators/frame air suspension bags 457 of header suspension system 401 as will be described further hereinafter. In some embodiments, the frame air suspension bags 457 and gauge wheel air bags 557 are set in an initial state at the same initial operating pressure, such as prior to commencing cutting of a crop in a field. In other embodiments, the frame air suspension bags 457 and gauge wheel air bags may be set in an initial state at different initial operating pressures.

The pneumatic system 901 may also provide for selectively pneumatically isolating the right-side pair of (i) right frame air suspension bag 457 and (ii) right stabilizer apparatus 500 (eg. gauge wheel air bags 557 as described below), from the left side pair of (i) left frame air suspension bag 457 and (ii) left stabilizer apparatus 500 (eg. gauge wheel air bags 557). Also, both the left and right-side pairs of frame air suspension bag 457 and gauge wheel bags 557 may be also selectively isolated from any other components of pneumatic system 900 such as cutter bar float air bags 124/124', compressor 905 and working air storage tank 902 and air pressure dump valve 915.

The result may be that forces imparted onto a stabilizer apparatus 500 on any one side of the header 12, may be converted into a pneumatic gas/air pressure increase on that side stabilizer apparatus(es) (eg. in one or more gauge wheel air bags 557), which can be transferred/communicated to increase the air pressure in a header frame gas/air suspension bag 457, on the same side of the header. That causes that side header frame air suspension bag 457 to expand (and not cause any expansion of any of the opposite side frame air suspension air bag 457, the opposite side gauge wheel air bags 557 or any of the cutter bar float air bags 124), This results in an upward lifting force being imparted onto the main frame 100 on that side of the header 12, and cause upward movement of main frame 100 on that side relative to sub-frame 140 which results in a lateral tilting movement on that side of the main frame where the lifting force is provided.

Each stabilizer apparatuses 500 may comprise a gauge wheel assembly 499 (FIG. 6B) which may be supported on respective right and left side vertical struts 114 of main header frame 100. In other embodiments, stabilizer apparatuses 500 may be a plough device, a ski device, or any other device on an agricultural implement capable of travelling in contact with a ground surface.

An example right side, gauge wheel assembly 499 may include a wheel 511 comprising a wheel rim 509 (which may be made from any suitable material such as a steel) on which may be mounted a tire 510 (which may be made from a rubber material). Left side gauge wheel 501 may be constructed in the same manner. Each gauge wheel assembly 499 may include an axle/hub assembly 502 in such a manner as to allow for free rotation of the wheel about the horizontal axis of the axle/hub assembly 502. Axle/hub assembly 502 may also include a wheel hub 508 (FIG. 6A) to which wheel 511 is affixed and a spindle which is received in a tubular housing of a king pin assembly 503. King pin assembly 503 may be affixed to a lower end of support bracket 504. The king pin assembly may also permit rotation of the wheel 511 about a king pin axis of rotation that may be at an angle to a vertical direction.

Figure 6B:
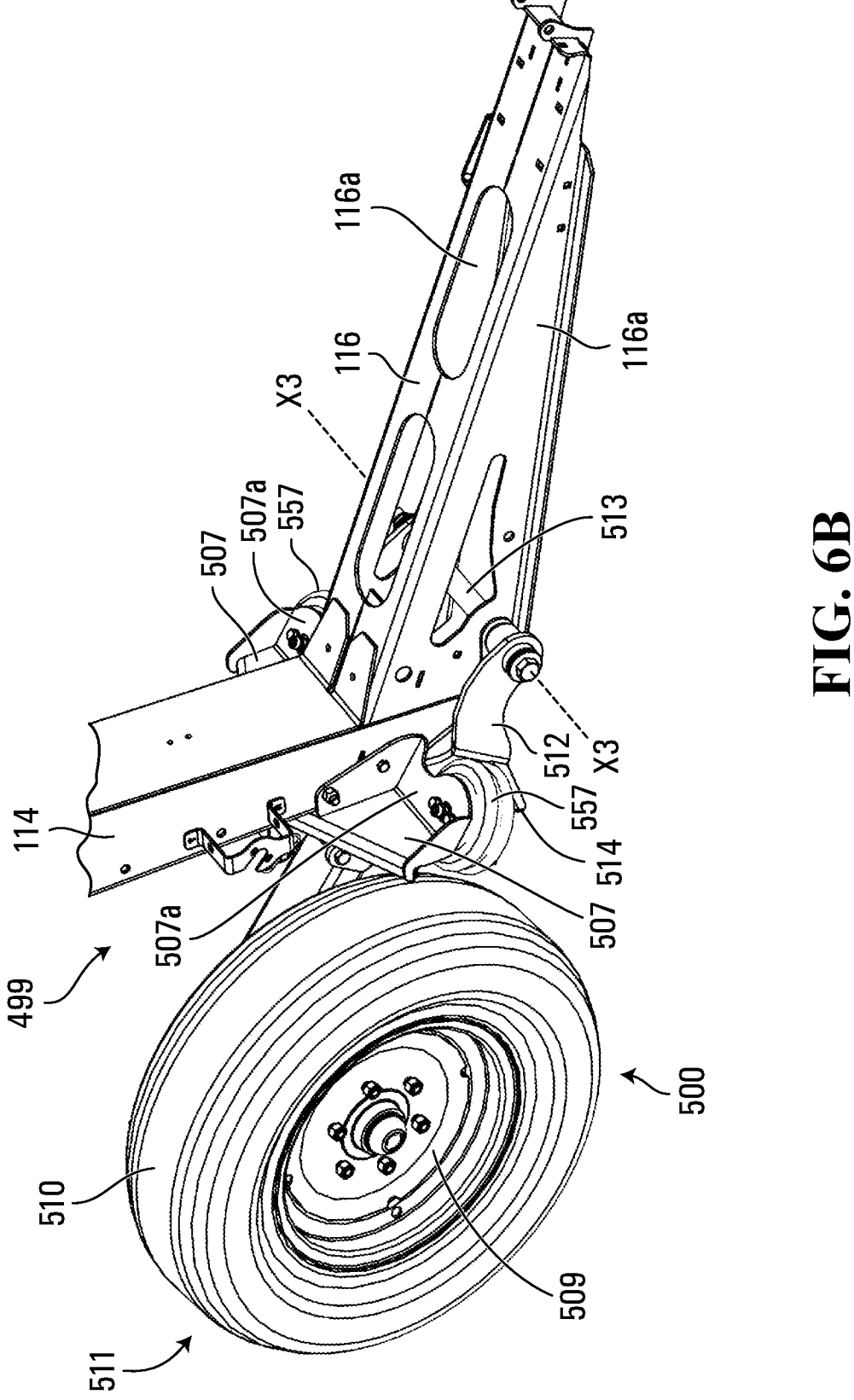
FIG. 6B is an enlarged front perspective view of some components shown in FIG. 6A.

Support bracket 504 may be fixedly connected to a gauge wheel pivot mechanism that may comprise a trailing wheel leg member 505, which may be part of a trailing gauge wheel mounting assembly 506. Wheel leg member 505 may be supported for pivoting movement, on opposed transverse sides by a pair pivoting support arms 512. Pivoting support arms 512 may be supported for pivoting movement about a pivot pin 513 and be able to pivot about gauge wheel pivot axis X3 with leg member 505. Pivot pin 513 may be mounted transversely between side strut members 116a, 116b of horizontal strut 116 of header main frame 100 (FIG. 6B).

Extending transversely from each of right and left side support arms 512 and fixedly attached thereto, such as by welding, may be a lower, gauge wheel air bag support plate 514. Fixedly attached, such as by welding, to opposed longitudinal and vertical surfaces of vertical strut 114, may be a generally v-shaped, flanged, upper, gauge wheel air bag support bracket 507. Gauge wheel air bag support bracket 507 may include right side and left side, upper horizontal and transversely extending air bag mounting plates 507a.

On each side of vertical strut 114, one gauge wheel gas/air bag 557 (or in other embodiments a plurality of air bags 557) may be located, and may be positioned beneath the bottom facing surface of upper base plate 507a on an upper side, and the top facing surface of lower base plate 514 that extends laterally outwards from a support arm 512, on both side. Thus, each of the pair of transversely spaced gauge wheel air bags 557 may be sandwiched between an upper base plate 507a and a lower base plate 514. It will be appreciated that the vertical position of each lower base plate 514 relative to its opposed upper base plate 507a, may be varied, as wheel leg member 505 and gauge wheel 501 connected thereto, pivot about gauge wheel pivot axis X3 on pivot pin 513.

Gauge wheel air bags 557 may be fixedly secured to a downward facing surface of upper base plate 507a using a pair of bolts secured to an upper integral rigid plate portion of the air bags 457. Bolt holes in the plate portion of the air bag can be appropriately sealed in a known manner from the inner pressurized air cavity of the bag (eg. blind mounting nuts/bolt holes). The rigid upper plate portion may also provide for an air inlet/outlet which can be pneumatically connected to a pneumatic/air hose 903.

Each gauge wheel air bag 557 may be made of a generally tubular side wall made of a resiliently expandable material such as a rubber. The sidewall material may be permanently bonded to/crimped with metal generally cylindrical, flat end plates at opposite ends. Each gauge wheel air bag may also be sized, configured and positioned to be able to withstand appropriate forces/pressures exerted by the surface of each of plates 507a, 514 when the interior cavity of the frame air suspension bag 557 is pressurized by pneumatic system 901. An example of a known type of air bag that might be employed as a gauge wheel air bag 557 is the model FD 70-12 CI Double Convolution Air Actuator made by ContiTech AG and/or one of its affiliated companies. Such an air suspension bag may have upper and lower plates with a diameter of about 4.25 inches and the interior of the bag may have operating internal volumes of between about 40 cubic inches to 110 cubic inches over operating pressures of between about 30/40 psi and 120 psi.

It should be noted that for a given internal air pressure the cutter bar float air bag 124 and the gauge wheel air bags 557 (eg. the model FD 70-12 CI Double Convolution Air Actuator made by ContiTech AG) will have a spring rate that is significantly less over the operating air pressures, such as possibly in the range of about ¼ to ½ of the spring rate of the frame air suspension bag 457 (eg. the model FS 200-10 CI Single Convolution Air Actuator made by ContiTech AG). Thus, with respect to gauge wheel air bags 557, by providing two such air bags the lower spring rate will be compensated for, and yet the smaller size will accommodate small size constraints in providing such air bags within the confines of the relatively small sized gauge wheel assembly 499. However, in other embodiments only one gauge wheel air bag may be utilized on each side of main frame 100. In yet other embodiments, more than two gauge wheel air bags may be utilized on each side of main frame 100.

Pneumatic System

With reference now to FIG. 9, an example pneumatic system 901 is illustrated. Pneumatic system 901 may comprise right side cutter bar float air bags 124a and left side cutter bar float air bags 124b. Right side cutter bar float air bags 124a may be mounted on the right side of main frame 100 (as described above) in spaced transverse relationship to each other and they may each be pneumatically connected in parallel via air hoses 903 to an air manifold 900. Similarly left side cutter bar float air bags 124b may be mounted on the left side of main frame 100 (as described above) in spaced transverse relationship to each other and they may each be may independently be pneumatically connected in parallel via air hoses 903 to an air manifold 900.

Right side header frame air suspension bag 457a and the pair of right side, gauge wheel bags 557a may be plumbed/pneumatically linked together in parallel by air hoses 903 and be pneumatically connected through an electric solenoid isolation valve 908a to air manifold 900. Similarly, left side header frame air suspension bag 457b and the pair of left side, gauge wheel bags 557b may be plumbed/pneumatically linked together in parallel by air hoses 903 and be pneumatically connected through an electric solenoid isolation valve 908b to air manifold 900.

Air manifold 900 may be pneumatically connected through an air hose 903 to working air storage tank 902. Working air storage tank 902 be for example a tank having an interior pressurized air storage volume sufficient to maintain operation over a working pressure range of 30-120 psi and may also be pneumatically connected through another air hose 903 to air compressor 905 which may be for example a model 330C air compressor made by Viair Corporation having specifications of 150 psi—100% duty cycle.

Air compressor 905 may be in electrical communication with a switch/relay 904 which may itself be activated/controlled by a controller device (or switch box which an operator controls) 920. For example, controller device 920 may be able to provide for the application of a voltage (eg. 12 volts) to switch/relay 904 to cause air compressor 905 to be activated. Removal of that voltage by controller device 920 and switch/relay 904 can de-activate air compressor 905. Thus, air compressor 905 may be activated and deactivated by controller device 920 through electronic switch/relay 904 to cause 903 to start and stop delivering additional pressurized air to working air storage tank 902 to increase the air pressure within the tank to a desired/specified level.

Working air storage tank 902 may also be in pneumatic communication with an air pressure dump valve device 918, which may also be in electrical communication with an electronic switch/relay 906 which may itself also be activated/controlled by controller device 920. For example, controller device 920 may be able to provide for the application of a voltage (eg. 12 volts) to switch/relay 906 to cause dump valve 918 to be activated/opened. Removal of that voltage by controller device 920 and switch/relay 906 can de-activate/close dump valve 918. Thus, air pressure dump valve device 918, may be activated and deactivated by controller device 920 through electronic switch/relay 906 to cause 903 to start and stop expelling air from working air storage tank 902 to decrease the air pressure within the tank to a desired/specified level.

An air pressure relief valve 915 may be in pneumatic communication with air manifold 900 to ensure that the air pressure being delivered by the air manifold 900 to all the air bags referenced above, does not exceed a maximum permitted level—so as to avoid over-pressuring of the air bags, and also ensure that all the air bags can be pressurized to, but not over, a specified maximum level.

Isolation valve 908a and isolation valve 908b may be electrically linked such that an electrical signal/voltage provided by switch/relay 904 to open isolation valve 908a, causing compressor 905 to operate, will also result in isolation valve 908b being opened. Similarly, isolation valve 908a and isolation valve 908b may also be electrically linked such that a lack of electrical signal provided by switch/relay 904 causing air compressor 918 to shut off, will close isolation valve 908a, and will also result in isolation valve 908b being closed.

Similarly, isolation valve 908a and isolation valve 908b may be electrically linked such that an electrical signal/voltage provided by switch/relay 906 to open isolation valve 908b, causing air dump valve 918 to open, will also result in isolation valve 908a being opened. Similarly, isolation valve 908a and isolation valve 908b may also be electrically linked such that a lack of electrical signal provided by switch/relay 906 causing dump valve 918 to close, will close isolation valve 908b, and will also result in isolation valve 908a being closed.

Steering diode 921 may be provided in the electrical link between compressor switch/relay 904, air compressor 905 and isolation valve 908a. Steering diode 922 may be provided in the electrical link between electronic switch 906, air dump valve 918 and isolation valve 908b.

When an electrical signal is applied to switch/relay 904, and air compressor 905, then steering diode 922 ensures that no electrical signal/voltage is applied to dump valve 918 and no voltage passes via that path to switch/relay 906 or controller 920. Similarly, when an electrical signal is applied to switch/relay 906 to open dump valve 918, then steering diode 921 ensures that no electrical signal/voltage is applied to air compressor 905 and no voltage passes via that path to switch/relay 904 or controller 920.

Steering diodes 921 and 922 can be configured to operate such that either air compressor 905 or dump valve 918 can be activated/de-activated by switches/relays 904 or 906 respectively at any one time, with either the operation of air compressor 905 or dump valve 908 resulting in the opening or closing of isolation valves 908a, 908b together (i.e., in tandem). Steering diodes 921 and 922 can also be configured to operate such that at no time are air compressor 905 and dump valve 918 activated together and operated at the same time.

If during operation it is desired to operate in header 12 in rigid mode, header height control system 10 can select and provide a height of header main frame 100 such that the cutter bar is at a cutting height above level ground surface (eg. 2 inches above the ground surface).

Generally speaking, by increasing the initial setup pressure of cutter bar float air bags 124, gas/air suspension bag 457 and gauge wheel gas/air bags 557, the spring rate of each gas/air bag will be increased and thus the resistance force provided by each gas/air bag will also be increased. The resistance force is the force exerted by the airbags in opposition to compressive forces applied to the airbags.

When pneumatic system 901 is operating, pneumatic system 901 will increase the air pressure in all the airbags to an initial setup pressure. The greater the initial setup pressure, the greater the spring rate of each air bag and the greater the initial resistance force of each bag will be.

In operation of header 12, including pneumatic system 901, with cutter bar 122 to be operating in rigid mode, controller 920 can cause switch/relay 904 to open isolation valves 908a, 908b and cause air compressor 905 to be activated to ensure that the air pressure in working air storage tank 902 is increased to the desired high level (eg. 100 psi. as referenced above). Pressurized air may be communicated from working air storage tank 902 through air manifold 900 to pressurize the air bags as follows: All right-side cutter bar float air bags 124a, the right-side header frame air suspension bag 457a and the pair of right side, gauge wheel bags 557a will be pressurized to the same high level (i.e., the initial setup pressure, for example 100 psi.). Similarly, all left-side cutter bar float air bags 124b, the left side header frame air suspension bag 457b and the pair of left side, gauge wheel bags 557a will also all be pressurized to the same high level (i.e., the initial setup pressure, for example 100 psi.). This will cause the cutter bar 122 to be operating in the rigid mode, with the cutter bar 122 positioned by header height control system 10 being set to a cutting position above the level ground surface level. Header height control system 10 can select and provide a height of the header main frame 100 such that the cutter bar 122 is at, and tries to maintain, a specified cutting height above level ground surface (eg. 2 inches above level ground surface). Stabilizer apparatuses 500 on both sides will be operating to carry some of the weight of main frame 100 and the components supported thereon.

When pneumatic system 901 is operating in rigid mode, pneumatic system 901 will have raised the air pressure in all the air bags to the same high/upper level, and controller 920 may also have sent electrical signals through electric cables 909 to operate air compressor 905 and place isolation valves 908a, 908b in an open configuration. Once the pressure in all the air bags has reached the desired high/upper level, then controller 920 can deactivate switch/relay 904 causing air compressor 905 to be turned off and for isolation valves 908a, 908b to be closed. This places right and left isolation valves 908a, 908b, in an isolation state. In this isolation state of right and left isolation valves 908a, 908b, the right-side header frame air suspension bag 457a and the pair of right side, gauge wheel bags 557a will be in direct pneumatic communication with each other, but will otherwise be pneumatically isolated from the rest of pneumatic system 901. The amount of air in this isolated part of pneumatic system 901 will be fixed. The result is that if the size/volume of the air cavity in any of the right gauge wheel air bags 557a is reduced the air pressure therein is increased (such as when the right gauge wheel air bags 557a are both compressed due to their associated gauge wheel 501 encountering a rise in the ground surface). As the pressure in the right gauge wheel air bags 557a is increased, this causes a delivery of pressurized air though hose 903 towards right air suspension bag 457a, with the result that the air pressure in right air suspension bag 457a will also increase, causing right air suspension bag 457*a* to expand. This causes header main frame 100 to be raised/lifted relative to sub-frame 140 as described above, on that right side of header main frame 100.

Similarly, in this rigid mode of header 12, and in this isolation mode on pneumatic system 100, the left side header frame air suspension bag 457*b* and the pair of left side, gauge wheel bags 557*b* will be in direct pneumatic communication with each other, but will otherwise be isolated from the rest of pneumatic system 901. The amount of air in this isolated part of pneumatic system 901 will also be fixed. The result is that if the size of the air cavity in any of the left gauge wheel air bags 557*b* is reduced and the air pressure therein is increased (such as when the left gauge wheel air bags 557*b* are both compressed due to their associated gauge wheel 501 encountering a rise in the ground surface). As the pressure in the gauge wheel air bags 557*b* is increased, pressurized air is communicated via hose(s) 903 towards left side air suspension bag 457*b*, with the result that the pressure in left side air suspension bag 457*b* will also increase, causing air suspension bag 457*b* to expand. This causes header main frame 100 to be raised relative to sub-frame 140 as described above, on that left side of the header main frame.

Pneumatic system 901 may benefit from a relative simplicity in design. For example, pneumatic system 901 as depicted in FIG. 9, may prior to agricultural apparatus 30 being in a commencement state of operation—that is prior to commencing working (eg. cutting a crop in a field) in a particular mode (eg. rigid mode or flex mode)—be able to pressurize each of the cutter bar float air bags 124, frame air suspension bags 457 and gauge wheel air bags 557, all to the same internal air pressure. For example, with the cutter bar 122 above the ground surface, providing an internal pressure of 100 psi in all such air bags, cutter bar float air bags 124, then header 12 may be configured in a rigid mode as described above; frame air suspension bags 457 may be providing appropriate support for main frame 100 and the components thereon, but have a relatively small degree of expansion such that pivot arm side plates 453*a*, 453*b* are close to the bottom of their range of movement. At the same time, gauge wheel air bags 557 may be sufficiently expanded and have an appropriate spring rate, such that a shock force resulting from a gauge wheel 501 travelling over rising terrain will provide and appropriate level of absorption by one or more gauge wheel air bags 557, but there may also result in a sufficient pressure increase inside such air bags, that there is sufficient pressurized air transmitted to air suspension bags 457 to achieve a suitable amount of lifting force. It is possible to achieve this simplicity in design, in part by appropriately engineering and taking into account the physical characteristics of the header 12, such as the overall weight and weight distribution of main frame 100 and components supported thereon, as well as the specifications of the cutter bar float air bags 124, frame air suspension bags 457 and gauge wheel air bags 557 and the air pressures to be applied therein, as well as the dimensions etc. of the components that are directly functionally linked to the frame air suspension bags 457 and the gauge wheel air bags 557 (eg. the length of the trailing wheel leg members 505 and support arms 512, from the pivot pins 513 and the position of the gauge wheel air bags 557 in relation thereto). Achieving the ability to be able to pressurize the cutter bar float air bags 124/124', frame air suspension bags 457 and gauge wheel air bags 557, all to the same internal air pressure in rigid mode and in flex mode of operation may be accomplished, at least in part, by practical experimentation on for example, the length of the gauge wheel lever arm—to ensure it will work for wheel clearance, amongst other considerations—and for example attempting to make it a short as practical. Experimentation can also be made with respect to the position of gauge wheel air bags 557 relative to the transverse pivot axis X3 of the lever arm to achieve a desirable level of performance.

It should be also noted that within the stabilizer apparatus 500 itself, there may be a mechanical advantage in having the gauge wheel air bags 557 being squeezed between lower plates 514 and upper plates 507*a*, created by a lever action of a gauge wheel 501 supported on a leg arm 505 such that there is a significant lever action caused by gauge wheel 501 acting on gauge wheel air bags 557. The degree of this lever action will be determined, at least in part, by the distance of the gauge wheel air bags 557 from the gauge wheel pivot axis X3 (FIG. 6A) and the distance of the contact point of gauge wheel 501 with the ground surface from axis X3.

Accommodation can be made for any weight imbalance on the left side/right side of main frame 100 by fore/aft and/or right/left side air bag position adjustments of any or all cutter bar float air bags 124/124', frame air suspension bags 457 and gauge wheel air bags 557 to increase/decrease the spring rate in the bags to achieve a nominally level attitude of main frame 100. Multiple wheel air bag mounting position/pattern of holes may be provided at different fore/aft locations and different right/left locations.

In other embodiments, pneumatic system may be configured such that the cutter bar float air bags 124, frame air suspension bags 457 and gauge wheel air bags 557, are not all pressurized to the same pressure level, at the initial commencement of a rigid or flex mode of operation. In some embodiments, it may be possible for the pneumatic system to initially pressurize all of the cutter bar float air bags 124, all of the frame air suspension bags 457 and all gauge wheel air bags 557 to an initial setup pressure. Thereafter on each side, the frame air suspension bags 457 and all gauge wheel air bags 557, can be isolated from the cutter bar float air bags 124/124' and then the cutter bar float air bags 124/124' across the entire width of the cutter bar may have their internal pressures adjusted independently of all the frame air suspension bags 457 and all the gauge wheel air bags 557 (eg. the cutter bar float air bags 124/124' may have their internal pressures adjusted downwards) during the initial commencement state.

Other components recited herein may be made from suitable materials.

In use, when the cutter bar 122 is operating in rigid mode as described above, with both left and right side header frame air suspension bags 457*a*, 457*b* and their respective pair of left and right side, gauge wheel bags 557*a*, 557*b* will being in respective direct pneumatic communication with each other, but otherwise being isolated from the rest of pneumatic system 901, during operation across level ground, the weight of main frame 100, cutter bar 122 and other components secured to main frame 100 such as the draper decks 118*a*-118*c*, will be carried mostly by sub-frame 140. In rigid mode of header 12, a significant (eg. majority) proportion of the weight will typically be carried by main frame 100, sub-frame 140, adapter plate 142, and be transferred to front portion 66 of the feeder house 60 and on to propulsion unit 14. Typically, a smaller minority proportion of that weight will be carried by stabilizer apparatuses 500 located towards opposite transverse ends of header 12 typically somewhere between the outside edge of sub-frame 140 and the end of the main frame 100. The stabilizer apparatuses 500 will be configured such that gauge wheel air bags 557 are acting like a stiff spring and provide some amount of support of the weight of header 12. Typically, it is desirable that stabilizer apparatuses 500, on both sides in each side provide support no more than the lesser of (i) 10% of the weight of main frame 100 and the components supported thereon and (ii) about 1000 lbs. It should be noted that if a gauge wheel air bag 557 is fully compressed, the sub-frame 140 may be in contact with the ground surface, which would not be appropriate for operation in either rigid mode or flex mode. Therefore, it is important to ensure that in normal operation on level ground, the gauge wheels are not carrying too much of the weight of the main frame 100, the components mounted thereon and that the gauge wheel air bags are not too compressed, and they have sufficient ability to respond with spring like action to a rise in the level of the ground surface, as discussed herein.

At least in rigid mode, upon one side (eg. the right side) gauge wheel 501 encountering a rise in terrain, this will normally result in a generally upward force being imparted onto that gauge wheel 501 (assuming the gauge wheel is able to respond by moving upwards on the rising terrain). This generally upwardly directed force will cause the pair of gauge wheel air bags 557 on that right side of header 12 to be compressed as trailing wheel leg member 505 pivots about gauge wheel pivot axis X3 on pivot pin 513. This pivoting action of right wheel leg member 505 causes lower plate 514 to also pivot upwards relative to upper support plate 507a, which results in compression of both right-side gauge wheel air bags 557.

The compression of right-side gauge wheel air bags 557 will then cause an increase in air pressure within right side gauge wheel air bags 557a, and this increase in air pressure is communicated to right side frame air suspension bag 457a through hose 903, increasing the air pressure in right frame air suspension bag 457a on the right side of header 12. The increase in air pressure in right frame air suspension bag 457a and the corresponding expansion of that right frame air suspension bag 457a transmits an upward acting lifting force on pivot arm side plates 453a, 453b, upper base plate 462 along with lift horn member 454, on that side of header 12 to force them to pivot about axis X2 relative to lower air bag support members 450a, 450b of sub-frame 140 on that side of header 12. The movement upwards of lift horn member 454 on the right side of header 12 will then result in the upwards lifting movement of main frame 100 and cutter bar 122 on the right side of the header relative to sub-frame 140. The three-point pivotal connection 400A, 400B, 400C (FIG. 5C) can enable the right side of header 12 to be lifted upwards without the left side frame air suspension bag 457 being compressed. That is typically because when moving across a typical ground surface in a crop field, if the right side of the header (and its associated stabilizer apparatus 500) encounters rising terrain, the opposite left side of the header 12 will encounter falling terrain. Thus, the opposite left side of the header will be able to tilt downwards along with stabilizer device 500, thus avoiding the left side stabilizer apparatus 500 and associated gauge wheel airbags 557b responding to increase the pressure in the left side frame air suspension bag 457b. However, if when moving across the ground surface in a crop field, if the right side of the header (and its associated stabilizer apparatus 500) encounters rising terrain, and the opposite left side of the header 12 does not encounter falling terrain, the header height control system 10 referenced above may respond to provide for lifting of both sub-frame 140 and main frame 100, to compensate for the lower left side of the header being too low, as determined by header height sensors. Thus, the header height control system 10 may operate co-operatively with the gauge wheel air bag/frame air suspension bag system to provide for a relatively smooth movement over uneven terrain.

The air pressure level in the right side frame air suspension bag 457a will have increased above the air pressure level in the opposite left side frame air suspension bag 457b. This will then result an upward tilt on the right side of header 12, of the main frame 100 and other components of header 12 attached to the main frame, such as cutter bar 122 and draper decks 118a-118c. Thus, the increasing of the air pressure in the right side frame air suspension bag 457b on one side of the header is functionally linked to, and caused by the increase in air pressure in the pneumatically linked gauge wheel air bags 557b on that side of the header. And the increase in air pressure in the gauge wheel air bags 557a on that right side of the header is caused by an increased upward mechanical force being applied to a gauge wheel on the right side of the header.

The foregoing description of the right gauge wheel 501 encountering rising terrain relative to the left gauge wheel 501, would apply in the opposite manner if instead the left side gauge wheel 501 encountered rising terrain relative to the right gauge wheel 501, with the left side gauge wheel 501 providing pressurized air to left side frame air suspension bag 457, resulting in a lifting force to assist in tilting upwards the left side of header 12 upwards.

If both the right gauge wheel 501 and the left side gauge wheel 501 both encountered rising terrain at the same time relative to central area of main frame 100 and sub-frame 140, then both of the following would occur: (a) the left side gauge wheel 501 provides pressurized air to left side frame air suspension bag 457b, resulting in a lifting force to on the left side of header 12 and (b) the right side gauge wheel 501 provides pressurized air to right side frame air suspension bag 457a, resulting in a lifting force to on the right side of header 12. The combined result is that lifting forces on both the right and left sides of header main frame 100 will assist in lifting main frame 100 upwards, generally level, thus cushioning the forces associated with the rising terrain on both the left and right sides of header 12. Additionally, header height sensors in the header height control system 10 may also provide signals to the header height controller, which would cause the header height positioning system to lift the entire sub-frame 140 and main frame 100 relative to propulsion unit 14. However, it is notable that the gauge wheel air bag/frame air suspension bag combinations on both sides of main frame 100, are typically able to transmit a lifting force to the main frame 100 more quickly than the header height control system 10 can cause a lifting force to be implemented on sub-frame 140 and main frame 100 (typically through the hydraulic lift cylinders). The pneumatic system 901 with its direct communication of pressurized air, may implement a level lifting force more quickly than header height control system 10 with its hydraulic lift cylinders. This same feature may also be applicable with respect to lateral tilting of header 12 when only one side encounters rising terrain and it is desirable to assist in tilting the header in response to the rising terrain on one side. The header height control system 10 may be equipped with the ability to laterally tilt the sub-frame 140 and main frame 100 relative to propulsion unit 14. Header height sensors in the header height control system may also provide signals to the header height controller indicating that the header height is too low on one side, which would cause the header height positioning system to tilt the entire sub-frame 140 and main frame 100 relative to propulsion unit 14 to raise that one side with the rising terrain. However, the gauge wheel air bags/ frame air suspension bag(s) combination on that side of main frame 100, will be typically able to transmit a lifting tilting force to the main frame 100 relative to sub-frame 140 (as described above) more quickly than the header height control system 10 can cause a tilting force to be implemented on sub-frame 140 and main frame 100 (typically through the hydraulic lift cylinders). The pneumatic system 901 with its direct communication of pressurized air, may implement a tilting force more quickly than header height control system 10 with its hydraulic lift cylinders.

A mechanical advantage may also be provided by having the gauge wheels 501 and associated gauge wheel air bags 557 located transversely outside of the air suspension bag 557 on header 12, on each left and right sides. For example, for a header 12 having a total transverse width of 40 ft, the gauge wheels 501 may be located approximately 15 ft from the center axis Y1. For a sub-frame 140 that is 6 ft wide, the header frame air suspension bag 457 may be positioned about 3 ft from the axis Y1 on the same side of header 12. The result is that if there is an increase in air pressure within gauge wheel air bags 557 resulting in a compression of these gauge wheel air bags 557 during the impact of gauge wheels 501 on the ground surface, there will be a corresponding increase in pressure in header frame air suspension bag 457 which will cause an expansion of frame air suspension bag 457 on that side of the frame 100. Since air suspension bag 457 is closer to the tilt axis of main frame 100 relative to sub-frame 140, a change in the volume of air suspension bag 457 may have a relatively larger impact and cause a relatively large lift force effect on main frame 100.

It may also be appreciated, that the further outboard a gauge wheel is located on the main frame, the less may be the effect of the lift force generated at the frame air suspension bag 457. This is because, the further outboard the gauge wheel 501 is located, when the gauge wheel encounters rising terrain, less force will be required to transmitted to main frame 100, in order to create the lever action required to tilt the main frame upwards (i.e., the longer the lever arm, the less the upward force required to create the tilting movement). If less force is required to create a tilt, then the gauge wheel air bag will be pressurized to a relatively lower extent (compared to if a greater tilting force is required— due a smaller lever arm—if the gauge wheel is located closer to the center line). Therefore, a selection can be made to choose a location for the gauge wheels that is suitable/ desirable both for static conditions (eg. the header moving over a level ground surface) and for dynamic conditions when one gauge wheel moves over rising ground surface), and this will depend upon a variety of variables including weight and weight distribution of the main frame and components mounted thereon, and the overall width of the main frame.

Furthermore, if each single stabilizer apparatus 500 on each side is located very close transversely to the sub-frame 140 on each side, then if the gauge wheel 501 on one side encounters a rise in terrain of N inches (eg. 12 inches) on that side, this will impart a relatively large tilt angle on the main frame 100 which may not be desirable. If, by contrast, the stabilizer apparatuses 500 are located very close to the outside end of the main frame 100, then if the gauge wheel 501 on one side encounters a rise in terrain of the same N inches (eg. 12 inches) on that side, this will impart a relatively much lower tilt angle on the main frame 100. This may possibly, also not be desirable, at least in some situations. It may therefore be advisable to select a location of the stabilizer apparatus where the tilt angle created by such a rise in terrain, is moderate, such as for example about half-way between the centerline and the end of the header. In many situations, in part due to physical and other constraints, the gauge wheel may be a small amount less than 50% of the distance from the centerline to the outside end of the main frame 100. The precise selection of the transverse position of the stabilizer apparatuses on each side may also be affected by various design constraints, such as the location of the vertical struts 114 to which the stabilizer apparatuses are mounted. It can be determined, in part by experimentation, on a case-by-case basis where is a suitable location for each stabilizer apparatus 500 which does not provide too much tilt angle, and which provides a suitable amount of lift assist to frame air suspension bags 457 as a result of the compression of the gauge wheel air bags 557 when encountering a typical/design amount of terrain rise.

It should be noted that header 12 as configured above is capable of tilting in either lateral direction by the combination of: (a) the mounting of front portion 66 of the feeder house 60 in a manner which allows for tilting together of header main frame 100, adapter plate 142, header sub-frame 140 and feeder house 60, relative to propulsion unit 14 under the control of header positioning system 22 (as described above) and (b) the tilting of main frame 100 relative to sub-frame 140, as a result of the 3 point pivotal connection 400A, 400B, and 400C (with the lifting force being assisted by the pneumatic connection between the gauge wheel air bags 557, and frame air suspension bags 457). The total range of titling motion is a result of the combination of these separate capabilities.

In the foregoing embodiments, it has been found that the combined effects of the header positioning system 22 and the gauge wheel air bag lifting assist system as described above, works extremely well and co-operate with each other in providing for a relatively smooth operation of agricultural apparatus over uneven terrain. The header height control system 10 will provide a significant level of height control for header 12, but due to the system relying upon and utilizing sensors which are processed by a controller which then operates devices (typically hydraulic cylinders) to adjust the height/tilt of the header, the response to changes in the height of the terrain may be somewhat delayed. The gauge wheel air bag lifting assist system as described above has a benefit in that changes in the height of the terrain (particularly upward height changes) immediately are translated mechanically into compression of the gauge wheel air bags 557, which then is directly translated into a mechanical/ pneumatic connection with frame air suspension bag 457, which quickly delivers pressurized air to the air suspension bag(s) 457 to create the lifting force on main frame 100 relative to sub-frame 140. In particular, it should be emphasized that a gas, such as air, can typically be transmitted and converted into a lift force, more quickly than hydraulic fluid passing through hydraulic lines and operating a hydraulic lift cylinder. Nevertheless, air bags have a limited range of height adjustment—relative to the ability of the hydraulic lift cylinders associated with the header height control system 10 associated with the propulsion unit 14 as described above. Therefore, the frame air suspension bag/ gauge wheel air bag system operates co-operatively with the header height control system 10 to deliver an enhanced main frame 100 height and tilt control during movement over uneven terrain.

In some embodiments, the gauge wheel air bag/frame air suspension bag lifting assist system as described above can operate effectively on an agricultural implement (such as a harvesting header) that does not have a separate automated header height control system whereby the height/tilt may also be automatically effected/controlled by components associated with the propulsion unit. So long as the gauge wheel air bag system has pressurized gas/air, it can function independently of any interaction with control components of the propulsion unit. So long as there is some kind of mechanism for supporting and driving the implement forward motion, the gauge wheel gas/air bag system can operate independently to assist the implement in moving across uneven terrain by providing a power assist to the frame gas/air suspension system. However, it is to be noted that with respect to at least a harvesting header, may typically still be necessary to have some kind of coarse header height control/tilt adjustment that could be manually operated by an individual operator. But even in this situation, gauge wheel air bag/frame air suspension bag lifting assist system may still assist a manual operator by providing a fast response to a rise in terrain, allowing the manual operator more time to respond manually with the manual header height control system.

In other embodiments, the gauge wheel air bags or other stabilizer component air bags may be part of a pneumatic system which includes a main header frame air suspension (such as for example, as is described above) but does not include a cutter bar pneumatic suspension that allows, at least in some modes of operation, for upward/downward movement of the cutter bar relative to the main header frame. In such systems, the cutter bar assembly may be permanently and rigidly fixed in upward/downward movement relative to the header main frame (i.e., it is always operating in a rigid type of mode). In other agricultural implements, there may be no cutter bar at all (eg. a sprayer implement). Some embodiments may, and some may not, include an air compressor and air pressure dump capability to vary the air pressure by application of such components. Instead in some embodiments, the gauge wheel air bags or other stabilizer component air bags may be part of a system that during operation is a closed pneumatic system which is, subject to appropriate air pressure valves, and only plumbed/ in air pressure communication with the components of the header frame air suspension (eg. the frame air suspension bags.

In some other possible embodiments, the header might possibly be designed such that the stabilizers (eg. gauge wheel devices) carry a significant (eg. more than a majority) amount of the total weight of main frame 100 and the components supported thereon, during movement across a ground surface, even on a level ground surface. Nevertheless, the same lifting force effect when the stabilizer component air bags are compressed, providing pressurized air that is delivered to one or more frame air suspension bags can be achieved. However, it is noted that in pneumatic system 901 depicted in FIG. 9, when the isolation valves 908a, 908b are closed, and during a rigid mode of operation with the gauge wheel air bags 557 and frame air suspension bags 457 pressurized to a high level (eg. 100 psi) as described above, then pneumatic system 901 is effectively configured and operating just the same as a header that does not have a flexible cutter bar system that is capable of operating in both rigid and flex modes.

In other embodiments, there may be more than one stabilizer apparatus 500 on each lateral side of header 12. For example, header 12 might have two stabilizer apparatuses on each of the right side and the left side of header 12. Each of the right-side stabilizer apparatuses may be spaced transversely from each other, and varied distances from the centerline axis Y1 and sub-frame 140. Each of the left-side stabilizer apparatuses may be spaced transversely from each other, and varied distances from the center axis Y1 and sub-frame 140. Pneumatic system 901 may be configured such that on each side of header 12, each of the plurality of stabilizer apparatuses 500 may include one or more air bags which may be in pneumatic communication to be able to selectively supply pressurized air (in a manner like that described above) to the same side frame air suspension bag 457, but not to any other air bags or pneumatic system components in pneumatic system 901, including not to the other air bag on the other stabilizer on the same side. On each side of the header, the plurality of laterally spaced stabilizer apparatuses and frame gas/air suspension bags may in at least in one mode of operation (eg. rigid mode) be selectively isolated from other components of the pneumatic system to ensure that an increase in pressure in the stabilizer gas/air bags is efficiently transferred to the frame air suspension bag(s).

The foregoing apparatuses provides a benefit in that the gauge wheel air bags and frame air suspension bags will, once appropriately pressurized to a suitable pressure, be able to operate without any adjustment, either manual or mechanical/electrical. The closed pneumatic circuit created when these bags are pneumatically isolated, will function without any further external adjustments or inputs, or modifications, but will work independently.

While the above has been described having regard to an agricultural combine harvester including a header, which acts as an agricultural implement, mounted to a propulsion and processing unit, in various embodiments, similar methods, systems and apparatuses to those described above may be used in connection with other agricultural implements, such as, for example, a spray boom on a power unit.

When introducing elements of the present invention or the embodiments thereof, the articles "a," "an," "the," and "said" are intended to mean that there are one or more of the elements.

The terms "comprising," "including," and "having" are intended to be inclusive and mean that there may be additional elements other than the listed elements.

The term "comprise", including any variation thereof, is intended to be open-ended and means "include, but not limited to," unless otherwise specifically indicated to the contrary.

When a set of possibilities or list of items is given herein with an "or" before the last item, any one of the listed items or any suitable combination of two or more of the listed items may be selected and used.

The above-described embodiments are intended to be illustrative only. Modifications are possible, such as modifications of form, arrangement of parts, details and order of operation. The examples detailed herein are not intended to be limiting of the invention. Rather, the invention is defined by the claims.

The invention claimed is:

1. An agricultural apparatus comprising:

a sub-frame;

a transversely extending main frame having a weight, said main frame being inter-connected to said sub-frame, a stabilizer apparatus inter-connected to said main frame and transversely spaced outwards from said sub-frame, said stabilizer apparatus operable to provide support for said main frame against downward acting forces acting upon said main frame in an operational mode;

wherein said sub-frame is operable to support a first portion of said weight of said main frame in said operational mode;

said stabilizer apparatus comprises a stabilizer gas actuator device, and wherein said stabilizer apparatus is operable to support a second portion of said weight of said main frame in said operational mode;

wherein said stabilizer gas actuator device is part of a pneumatic system, and wherein said pneumatic system further comprises a frame gas suspension mechanism, and wherein said frame gas suspension mechanism is operable to at least partly provide suspension of said main frame on said sub-frame.

2. An agricultural apparatus as claimed in claim 1 wherein said stabilizer gas actuator device is operable to provide a force spring rate dependent upon an initial set up gas pressure of said stabilizer gas actuator device.

3. An agricultural apparatus as claimed in claim 2 wherein the initial set up gas pressure of said stabilizer gas actuator device can be varied to vary the spring rate.

4. An agricultural apparatus as claimed in claim 2, wherein the initial set up gas pressure of said stabilizer gas actuator device can be varied to vary an initial resistance force.

5. An agricultural apparatus as claimed in claim 2, wherein an internal gas pressure of said stabilizer gas actuator device can be varied to vary the force spring rate between a first initial set up gas pressure of a first operational mode of the agricultural apparatus and a second initial set up gas pressure of a second operational mode of the agricultural apparatus.

6. An agricultural apparatus as claimed in claim 5, wherein the first operational mode of the agricultural apparatus is a rigid mode.

7. An agricultural apparatus as claimed in claim 6, wherein the second operational mode of the agricultural apparatus is a flex mode.

8. An agricultural apparatus as claimed in claim 1, wherein said stabilizer gas actuator device is also operable to provide isolation of vibrations between said stabilizer apparatus and said main frame.

9. An agricultural apparatus as claimed in claim 1, wherein said stabilizer apparatus further comprises a stabilizer ground contact device configured to contact a ground surface.

10. An agricultural apparatus as claimed in claim 9, wherein said stabilizer ground contact device comprises a gauge wheel.

11. An agricultural apparatus as claimed in claim 9, wherein said stabilizer apparatus is mounted to said main frame, and wherein said stabilizer ground contact device is operable in response to an upward rise in a level of the ground, to compress the stabilizer gas actuator device, to increase the pressure within the stabilizer gas actuator device.

12. An agricultural apparatus as claimed in claim 1, wherein:

said stabilizer apparatus is a first stabilizer apparatus mounted on a first side of said main frame and operable to provide support for said main frame to oppose downward acting forces acting upon said first side of said main frame;

a pneumatic system comprising:

at least one frame gas suspension bag operationally located between said sub-frame and said main frame on said first side of said main frame;

at least one stabilizer gas bag located proximate said first stabilizer apparatus in pneumatic communication for delivery of pressurized gas with said at least one frame gas suspension bag on said first side of said main frame;

wherein said agricultural apparatus comprises a second stabilizer apparatus mounted on said main frame and transversely spaced from said sub-frame and on an opposite second side of said sub-frame to said first stabilizer apparatus, said second stabilizer apparatus operable to provide support for said main frame to oppose downward acting forces acting upon said second side of said main frame;

wherein said pneumatic system further comprises:

at least one frame gas suspension bag operationally located between said sub-frame and said main frame on said second side of said main frame;

at least one stabilizer gas bag located proximate said second stabilizer apparatus; said at least one stabilizer gas bag that is proximate said second stabilizer apparatus being in pneumatic communication for delivery of pressurized gas with said at least one frame gas suspension bag on said second side of said main frame;

wherein during operation, when said at least one gas suspension bag on said second side of said frame is filled with a volume of a pressurized gas, and said second stabilizer apparatus is subjected to an upwardly directed force, said at least one stabilizer gas bag on said second side of said frame is compressed increasing a pressure of the pressurized gas within the at least one stabilizer gas bag on said second side of said frame, and wherein pressurized gas in said second stabilizer apparatus is communicated to said at least one frame gas suspension bag on said second side of said frame, to increase a gas pressure within said at least one frame gas suspension bag on said second side of side frame, which creates a lifting force to cause said main frame to tilt upwards in a second tilting direction, relative to said sub-frame, said second tilting direction being opposite to said first tilting direction.

13. An agricultural apparatus as claimed in claim 1, wherein said frame gas suspension mechanism comprises a frame gas suspension actuator device, and wherein said frame gas suspension actuator device is in pneumatic communication with said stabilizer gas actuator device.

14. An agricultural apparatus as claimed in claim 13, wherein said pneumatic system further comprises a gas compressor which is operable to simultaneously pressurize both said frame gas suspension actuator device and said stabilizer gas actuator device to the same initial set up gas pressure level.

15. An agricultural apparatus as claimed in claim 14, wherein said pneumatic system further comprises an isolation valve, said isolation valve operable in a first state in which said gas compressor can deliver pressurized gas to simultaneously pressurize both said frame gas suspension actuator device and said stabilizer gas actuator device to the same initial set up gas pressure level and a second state in which the frame suspension gas actuator device and said stabilizer gas actuator device are isolated from said gas compressor.

16. An agricultural apparatus as claimed in claim 15, wherein said pneumatic system further comprises a plurality of transversely spaced cutter bar gas actuator devices, and wherein when said isolation valve is in said first state said gas compressor can deliver pressurized gas to simultaneously pressurize said frame gas suspension actuator device, said stabilizer gas actuator device and said cutter bar gas actuator devices, and wherein when said isolation valve is in said second state in which the frame gas suspension actuator device and said stabilizer gas actuator device are isolated from said gas compressor and said cutter bar actuator devices.

17. An agricultural apparatus as claimed in claim 16, wherein when said isolation valve is in said first state said gas compressor can deliver pressurized gas to simultaneously pressurize said frame gas suspension actuator device, said stabilizer gas actuator device and said cutter bar gas actuator devices to the same initial set up gas pressure level.

18. An agricultural apparatus as claimed in claim 13, wherein:

said frame gas suspension actuator device is operationally located between said sub-frame and said main frame;

said stabilizer gas actuator device is located proximate said stabilizer apparatus; and said stabilizer gas actuator device is in pneumatic communication for delivery of pressurized gas to said frame gas suspension actuator device;

wherein during operation, when said stabilizer gas actuator device is filled with pressurized gas, and said stabilizer apparatus is subjected to an upwardly directed force, said stabilizer gas actuator device is compressed increasing the pressure of the pressurized gas within the stabilizer gas actuator device, and wherein the increase in pressure of the pressurized gas in said stabilizer gas actuator device is communicated towards said frame gas suspension actuator device, to increase the gas pressure within said frame gas suspension actuator device, and thereby create a lifting force on said main frame, to cause said main frame to lift upwards relative to said sub-frame.

19. An agricultural apparatus as claimed in claim 18, wherein when the increase in pressure of the pressurized gas in said stabilizer gas actuator device is communicated towards said frame gas suspension actuator device, to increase the gas pressure within said frame gas suspension actuator device, and thereby create a lifting force on said main frame, this causes said main frame to laterally tilt relative to said sub-frame.

20. An agricultural apparatus as claimed in claim 1, wherein said stabilizer gas actuator device is an air bag.

21. An agricultural apparatus as claimed in claim 13, wherein said frame gas suspension actuator device is an air bag.

22. An agricultural apparatus as claimed in claim 1, further comprising a cutter bar assembly mounted on said main frame.

23. An agricultural apparatus as claimed in claim 1, further comprising a draper deck assembly mounted on said main frame.

24. An agricultural apparatus as claimed in claim 1, further comprising a propulsion unit mounted and configured for supporting said sub-frame.

25. An agricultural apparatus as claimed in claim 24, wherein said propulsion unit comprises a header height control mechanism operable to adjust the height and tilt of the sub-frame and main frame relative to the propulsion unit.

26. An agricultural apparatus as claimed in claim 25, wherein said header height control mechanism comprises at least one hydraulic cylinder operable to adjust a position of the sub-frame and main frame relative to the propulsion unit.

27. An agricultural apparatus as claimed in claim 26, wherein said at least one hydraulic cylinder is operable to adjust the tilt of the sub-frame and main frame relative to the propulsion unit.

28. An agricultural apparatus as claimed in claim 1, wherein said main frame is pivotally mounted to said sub-frame to enable lateral tilting of said main frame relative to said sub-frame.

29. An agricultural apparatus as claimed in claim 1, wherein gas of the stabilizer gas actuator device is air.

30. An agricultural apparatus comprising:

a propulsion unit;

a transversely extending main frame having a weight;

a stabilizer apparatus comprising a stabilizer gas actuator device, said stabilizer apparatus being inter-connected to said main frame and transversely spaced outwards from a centerline of said main frame, said stabilizer apparatus operable to provide support for said main frame against downward acting forces acting upon said main frame in an operational mode;

wherein:

said propulsion unit is operable to support a first portion of said weight of said main frame in said operational mode;

said stabilizer apparatus is operable to support a second portion of said weight of said main frame in said operational mode;

said stabilizer gas actuator device is part of a pneumatic system, and wherein said pneumatic system further comprises a frame gas suspension mechanism, and wherein said frame gas suspension mechanism is operable to at least partly provide suspension of said main frame; and said frame gas suspension mechanism comprises a frame gas suspension actuator device, and wherein said frame gas suspension actuator device is in pneumatic communication with said stabilizer gas actuator device.

31. An agricultural apparatus as claimed in claim 30, wherein when an increase in pressure of the pressurized gas in said stabilizer gas actuator device is communicated towards said frame gas suspension actuator device, to increase the gas pressure within said frame gas suspension actuator device, and thereby create a lifting force on said main frame, this causes said main frame to laterally tilt.

32. An agricultural apparatus as claimed in claim 30, wherein said pneumatic system further comprises a gas compressor which is operable to simultaneously pressurize both said frame gas suspension actuator device and said stabilizer gas actuator device to the same initial set up gas pressure level.

33. An agricultural apparatus as claimed in claim 32, wherein said pneumatic system further comprises an isolation valve, said isolation valve operable in a first state in which said gas compressor can deliver pressurized gas to simultaneously pressurize both said frame gas suspension actuator device and said stabilizer gas actuator device to the same initial set up gas pressure level and a second state in which the frame gas suspension actuator device and said stabilizer gas actuator device are isolated from said gas compressor.

34. An agricultural apparatus as claimed in claim 33, wherein said pneumatic system further comprises a plurality of cutter bar gas actuator devices, and wherein when said isolation valve is in said first state said gas compressor can deliver pressurized gas to simultaneously pressurize said frame gas suspension actuator device, said stabilizer gas actuator device and said cutter bar gas actuator devices to the same initial set up gas pressure level, and wherein when said isolation valve is in said second state in which the frame gas suspension actuator device and said stabilizer gas actuator device are isolated from said gas compressor and said cutter bar actuator devices.

35. An agricultural apparatus comprising:
a sub-frame;
a transversely extending main frame inter-connected to said sub-frame, said main frame having a centerline and a first side on one side of the centerline and a second side on an opposite side of the centerline, said main frame being configured to be able to lift upwards on said first side relative to said sub-frame when subjected to a lifting force on said first side of the main frame and being configured to be able to lift upwards on said second side relative to said sub-frame when subjected to a lifting force on said second side of the main frame;
a first stabilizer apparatus inter-connected to said main frame on said first side and transversely spaced outwards from said sub-frame, said first stabilizer apparatus operable to provide support for said main frame against downward acting forces acting upon said main frame;
a second stabilizer apparatus inter-connected to said main frame on said second side and transversely spaced outwards from said sub-frame, said second stabilizer apparatus operable to provide support for said main frame against downward acting forces acting upon said main frame;
a pneumatic system comprising:
at least one frame gas suspension bag on said first side and operationally located between said sub-frame and said main frame;
at least one frame gas suspension bag on said second side and operationally located between said sub-frame and said main frame;
at least one stabilizer gas bag on said first side located proximate said first stabilizer apparatus; said at least one stabilizer gas bag on said first side being in pneumatic communication for delivery of pressurized gas to said at least one frame gas suspension bag on said first side;
at least one stabilizer gas bag on said second side located proximate said second stabilizer apparatus; said at least one stabilizer gas bag on said second side being in pneumatic communication for delivery of pressurized gas to said at least one frame gas suspension bag on said second side;
wherein during operation:
when said at least one gas suspension bag on said first side is filled with pressurized gas, and said first stabilizer apparatus is subjected to an upwardly directed force, said at least one stabilizer gas bag on said first side is compressed increasing a pressure of the pressurized gas within the at least one stabilizer gas bag on said first side and wherein pressurized gas in said at least one stabilizer gas bag on said first side is communicated towards said at least one frame gas suspension bag on said first side, to increase the gas pressure within said at least one frame gas suspension bag on said first side, which creates a lifting force on said first side, to cause said main frame to lift upwards on said first side relative to said sub-frame;
when said at least one gas suspension bag on said second side is filled with a volume of a pressurized gas, and said second stabilizer apparatus is subjected to an upwardly directed force, said at least one stabilizer gas bag on said second side is compressed increasing a pressure of the pressurized gas within the at least one stabilizer gas bag on said second side and wherein pressurized gas in said at least one stabilizer gas bag on said second side is communicated towards said at least one frame gas suspension bag on said second side, to increase a gas pressure within said at least one frame gas suspension bag on said second side, which creates a lifting force on said second side, to cause said main frame to lift upwards on said second side relative to said sub-frame.

36. An agricultural apparatus comprising:
a sub-frame;
a transversely extending main frame inter-connected to said sub-frame, said main frame being configured to be able to tilt upwards on a first side relative to said sub-frame when subjected to a lifting force on said first side of said main frame,
a stabilizer apparatus inter-connected to said main frame and transversely spaced outwards from said sub-frame, said stabilizer apparatus operable to provide support for said main frame against downward acting forces acting upon said main frame;
pneumatic system comprising:
at least one frame gas suspension bag and operable to at least partially suspend said main frame on said sub-frame,
at least one stabilizer gas bag being operatively connected to said stabilizer apparatus, and said at least one stabilizer gas bag being in pneumatic communication of pressurized gas to said at least one frame gas suspension bag;
wherein during operation, when said at least one gas suspension bag is filled with a pressurized gas, and said stabilizer apparatus is subjected to an upwardly directed force, said at least one stabilizer gas bag is compressed increasing a pressure of the pressurized gas within the at least one stabilizer gas bag, and wherein pressurized gas in said stabilizer gas bag is communicated towards said at least one frame gas suspension bag, to increase a gas pressure of pressurized gas within said at least one frame gas suspension bag, which creates a lifting force to cause said main frame to tilt upwards in a first transverse tilting direction relative to said sub-frame.

37. An agricultural apparatus comprising:
a sub-frame;
a transversely extending main frame inter-connected to said sub-frame, said main frame being configured to be able to move upwards on a transverse first side relative to said sub-frame when subjected to a lifting force on said first side of the main frame;
a stabilizer apparatus inter-connected to said main frame and transversely spaced outwards from said sub-frame, said stabilizer apparatus operable to provide support for said main frame against downward acting forces acting upon said main frame;
a pneumatic system comprising:
at least one frame gas suspension bag operationally located between said sub-frame and said main frame;
at least one stabilizer gas bag located proximate said stabilizer apparatus; said at least one stabilizer gas bag being in pneumatic communication for transmission of pressurized gas to said at least one frame gas suspension bag;
wherein during operation, when said at least one frame gas suspension bag is filled with a pressurized gas, and said stabilizer apparatus is subjected to an upwardly directed force, said at least one stabilizer gas bag is compressed increasing a pressure of the pressurized gas within the at least one stabilizer gas bag, and wherein pressurized gas in said stabilizer gas bag is communicated towards said at least one frame gas suspension bag, to increase a gas pressure within said at least one frame gas suspension bag, which creates a lifting force on the first side of said main frame, to cause said main frame to lift upwards relative to said sub-frame.

38. An agricultural apparatus as claimed in claim 37 wherein, said lifting force on said first side of said main frame causes said main frame to tilt upwards relative to said sub-frame on said first side of said main frame.

39. An agricultural apparatus as claimed in claim 37, wherein during operation, said at least one frame gas suspension bag and said at least one stabilizer gas bag contain pressurized air.

40. An agricultural apparatus as claimed in claim 37, wherein said at least one stabilizer gas bag is located on a part of said stabilizer apparatus.

41. An agricultural apparatus as claimed in claim 40 wherein said at least one stabilizer gas bag is mounted between said stabilizer apparatus and a component of said main frame.

42. An agricultural apparatus as claimed in claim 37, wherein said stabilizer apparatus is a gauge wheel assembly and said at least one stabilizer gas bag comprises at least one gauge wheel gas bag.

43. An agricultural apparatus as claimed in claim 42 wherein said gauge wheel assembly comprises: a gauge wheel mounted for rotation on a wheel hub assembly to provide support for said agricultural apparatus in moving across a ground surface in a rigid mode of operation; a pivot mechanism comprising a pivot arm interconnected to said wheel hub assembly and mounted for pivotal movement to said main frame; wherein said at least one gauge wheel gas bag is mounted between said pivot arm and a component of said main frame, wherein during operation when said at gauge wheel is subjected to an upwardly directed force, said pivot arm pivots upward compressing said at least one gauge wheel gas bag to thereby increase the pressure of the pressurized gas within the at least one gauge wheel gas bag.

44. An agricultural apparatus as claimed in claim 37, further comprising a transversely extending cutter bar mounted to said main frame operable to cut crop material.

45. An agricultural apparatus as claimed in claim 44, wherein said pneumatic system further comprises a plurality of cutter bar float gas bags spaced transversely along the cutter bar, and wherein said agricultural apparatus further comprises a plurality of pivoting paddle devices each with a pivot mechanism comprising a pivot arm mounted for pivotal movement relative to said main frame; wherein each said cutter bar float gas bag is mounted between said paddle device and a component of said main frame, wherein during a flex mode of operation said plurality of cutter bar float air bags are pressurized to a first pressure such when said cutter bar subjected to an upwardly directed force, said pivot arm pivots upward compressing said cutter bar float gas bag to compress said cutter bar gas bag thereby permitting flexing of said cutter bar in at least a region relative to said main frame.

46. An agricultural apparatus as claimed in claim 45, wherein during a rigid mode of operation said plurality of cutter bar float air bags are pressurized by said pneumatic system to a second pressure that is substantially greater than said first pressure such when said cutter bar subjected to an upwardly directed force, said pivot arm is substantially prevented from pivoting upward thereby substantially preventing flexing of said cutter bar relative to said main frame.

47. An agricultural apparatus as claimed in claim 46, wherein said plurality of cutter bar float air bags are pneumatically isolated from said at least one frame gas suspension bag and said at least one stabilizer gas bag located when operating in said rigid mode of operation.

48. An agricultural apparatus as claimed in claim 37, wherein said pneumatic system further comprises a gas compressor and a working air storage tank which are operable to provide pressurized air to said at least one frame gas suspension bag and said at least one stabilizer gas bag.

49. An agricultural apparatus as claimed in claim 47, wherein said pneumatic system further comprises a gas compressor and a working air storage tank which are operable to provide pressurized air to said plurality of cutter bar float gas bags, said at least one frame gas suspension bag and said at least one stabilizer gas bag.

50. An agricultural apparatus as claimed in claim 49, further comprising a dump valve device operable to selectively expel air from said at least one frame gas suspension bag and said at least one stabilizer gas bag.

51. An agricultural apparatus as claimed in claim 48 further comprising a dump valve device operable to selectively expel air from said plurality of cutter bar float gas bags, said at least one frame gas suspension bag and said at least one stabilizer gas bag.

52. An agricultural apparatus as claimed in claim 45, further comprising an isolation valve wherein said plurality of cutter bar float air bags may be selectively pneumatically isolated by said isolation valve from said at least one frame gas suspension bag and said at least one stabilizer gas bag located when operating in said rigid mode of operation.

53. An agricultural apparatus as claimed in claim 37, further comprising a propulsion unit, and wherein said sub-frame in interconnected to said propulsion unit, and wherein during a rigid mode of operation, said sub-frame and said main frame are at least partially supported by said propulsion unit.

54. An agricultural apparatus as claimed in claim 53, further comprising a header height control system that comprises a plurality of height sensors, said header height control system operable to raise and lower said sub-frame and said main frame in response to signals provided by said height sensors.

55. An agricultural apparatus as claimed in claim 54 wherein said header height control system is operable to transversely tilt said sub-frame and said main frame relative to said propulsion unit in response to signals provided by said height sensors.

56. An agricultural apparatus comprising:

a sub-frame;

a transversely extending main frame having a weight, said main frame being inter-connected to said sub-frame, a stabilizer apparatus inter-connected to said main frame and transversely spaced outwards from said sub-frame, said stabilizer apparatus operable to provide support for said main frame against downward acting forces acting upon said main frame in an operational mode;

wherein said sub-frame is operable to support a first portion of said weight of said main frame in said operational mode;

said stabilizer apparatus comprises a stabilizer gas actuator device, and wherein said stabilizer apparatus is operable to support a second portion of said weight of said main frame in said operational mode;

wherein said main frame is pivotally mounted to said sub-frame to enable lateral tilting of said main frame relative to said sub-frame.

57. An agricultural apparatus comprising:

a sub-frame;

a transversely extending main frame having a weight, said main frame being inter-connected to said sub-frame, a stabilizer apparatus inter-connected to said main frame and transversely spaced outwards from said sub-frame, said stabilizer apparatus operable to provide support for said main frame against downward acting forces acting upon said main frame in an operational mode;

wherein said sub-frame is operable to support a first portion of said weight of said main frame in said operational mode;

said stabilizer apparatus comprises a stabilizer gas actuator device, and wherein said stabilizer apparatus is operable to support a second portion of said weight of said main frame in said operational mode;

wherein:

said stabilizer apparatus is a first stabilizer apparatus mounted on a first side of said main frame and operable to provide support for said main frame to oppose downward acting forces acting upon said first side of said main frame;

a pneumatic system comprising:

at least one frame gas suspension bag operationally located between said sub-frame and said main frame on said first side of said main frame;

at least one stabilizer gas bag located proximate said first stabilizer apparatus in pneumatic communication for delivery of pressurized gas with said at least one frame gas suspension bag on said first side of said main frame;

wherein said agricultural apparatus comprises a second stabilizer apparatus mounted on said main frame and transversely spaced from said sub-frame and on an opposite second side of said sub-frame to said first stabilizer apparatus, said second stabilizer apparatus operable to provide support for said main frame to oppose downward acting forces acting upon said second side of said main frame;

wherein said pneumatic system further comprises:

at least one frame gas suspension bag operationally located between said sub-frame and said main frame on said second side of said main frame;

at least one stabilizer gas bag located proximate said second stabilizer apparatus; said at least one stabilizer gas bag that is proximate said second stabilizer apparatus being in pneumatic communication for delivery of pressurized gas with said at least one frame gas suspension bag on said second side of said main frame;

wherein during operation, when said at least one gas suspension bag on said second side of said frame is filled with a volume of a pressurized gas, and said second stabilizer apparatus is subjected to an upwardly directed force, said at least one stabilizer gas bag on said second side of said frame is compressed increasing a pressure of the pressurized gas within the at least one stabilizer gas bag on said second side of said frame, and wherein pressurized gas in said second stabilizer apparatus is communicated to said at least one frame gas suspension bag on said second side of said frame, to increase a gas pressure within said at least one frame gas suspension bag on said second side of side frame, which creates a lifting force to cause said main frame to tilt upwards in a second tilting direction, relative to said sub-frame, said second tilting direction being opposite to said first tilting direction.

58. An agricultural apparatus comprising:

a sub-frame;

a transversely extending main frame having a weight, said main frame being inter-connected to said sub-frame, a stabilizer apparatus inter-connected to said main frame and transversely spaced outwards from said sub-frame, said stabilizer apparatus operable to provide support for said main frame against downward acting forces acting upon said main frame in an operational mode;

wherein said sub-frame is operable to support a first portion of said weight of said main frame in said operational mode;

said stabilizer apparatus comprises a stabilizer gas actuator device, and wherein said stabilizer apparatus is operable to support a second portion of said weight of said main frame in said operational mode;

wherein the agricultural apparatus further comprises a propulsion unit mounted and configured for supporting said sub-frame, wherein said propulsion unit comprises a header height control mechanism operable to adjust the height and tilt of the sub-frame and main frame relative to the propulsion unit.

59. An agricultural apparatus as claimed in claim 58, wherein said header height control mechanism comprises at least one hydraulic cylinder operable to adjust a position of the sub-frame and main frame relative to the propulsion unit.

60. An agricultural apparatus as claimed in claim 59, wherein said at least one hydraulic cylinder is operable to adjust the tilt of the sub-frame and main frame relative to the propulsion unit.

* * * * *